United States Patent
Mukai et al.

(10) Patent No.: US 10,411,528 B2
(45) Date of Patent: Sep. 10, 2019

(54) MOTOR AND MOTOR CONTROL CIRCUIT

(71) Applicant: SAMSUNG ELECTRONICS CO., LTD., Suwon-si, Gyeonggi-do (KR)

(72) Inventors: Katsuhisa Mukai, Yokohama (JP); Toshiki Tatsuya, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 379 days.

(21) Appl. No.: 15/298,377

(22) Filed: Oct. 20, 2016

(65) Prior Publication Data

US 2017/0117759 A1   Apr. 27, 2017

(30) Foreign Application Priority Data

| Oct. 22, 2015 | (JP) | ................................. 2015-208411 |
| Dec. 22, 2015 | (JP) | ................................. 2015-249980 |
| Dec. 22, 2015 | (JP) | ................................. 2015-250005 |
| Mar. 8, 2016 | (JP) | ................................. 2015-044863 |
| Aug. 23, 2016 | (KR) | ....................... 10-2016-0106702 |
| Aug. 31, 2016 | (JP) | ................................. 2016-168884 |
| Oct. 13, 2016 | (JP) | ................................. 2016-202117 |

(51) Int. Cl.
    *H02K 1/14*     (2006.01)
    *H02K 3/28*     (2006.01)
    *H02K 1/22*     (2006.01)

(52) U.S. Cl.
    CPC ............... *H02K 1/145* (2013.01); *H02K 1/22* (2013.01); *H02K 3/28* (2013.01)

(58) Field of Classification Search
    CPC .......... H02K 1/145; H02K 3/28; H02K 3/525; H02K 16/00; H02K 16/04

(Continued)

(56) References Cited

U.S. PATENT DOCUMENTS

| 6,765,321 B2 * | 7/2004 | Sakamoto | .............. | H02K 37/14 |
| | | | | 310/257 |
| 9,083,216 B2 * | 7/2015 | Takemoto | .............. | H02K 1/243 |

(Continued)

FOREIGN PATENT DOCUMENTS

| CN | 2831598 | 10/2006 |
| CN | 202931045 | 5/2013 |

(Continued)

OTHER PUBLICATIONS

English Translation of JP 2009-005421, accessed Jan. 18, 2019, <https://www4.j-platpat.inpit.go.jp/cgi-bin/tran_web_cgi_ejje?u=http://www4.j-platpat.inpit.go.jp/eng/translation/201901180603048502137898833578357407FD2C439356A593C776B174D7CDBCE>.*

(Continued)

*Primary Examiner* — Jeremy A Luks
(74) *Attorney, Agent, or Firm* — Staas & Halsey LLP

(57) ABSTRACT

A motor is formed by stacking a plurality of stator elements and does not need an insulator between the stator elements. A stator includes the plurality of stator elements. The stator element includes a plurality of claw poles formed along a circumferential direction of the stator element and a coil wound in the circumferential direction. The coils of mutually adjacent stator elements are wound in different directions. In the mutually adjacent stator elements, the claw poles of one of the stator elements and the claw poles of the other of the stator elements are opposite to each other and are arranged to have the same polarity.

18 Claims, 48 Drawing Sheets

(58) Field of Classification Search
USPC .......................................................... 310/257
See application file for complete search history.

(56) References Cited

U.S. PATENT DOCUMENTS

| | | | | |
|---|---|---|---|---|
| 9,584,060 | B2* | 2/2017 | Takemoto | ............... H02P 29/00 |
| 9,647,498 | B2* | 5/2017 | Dreher | .................. H02K 1/145 |
| 2007/0145854 | A1* | 6/2007 | Enomoto | ................. H02K 3/04 |
| | | | | 310/257 |
| 2007/0152522 | A1* | 7/2007 | Enomoto | ............... H02K 1/145 |
| | | | | 310/80 |
| 2009/0001843 | A1* | 1/2009 | Enomoto | ............... H02K 1/145 |
| | | | | 310/257 |
| 2009/0102314 | A1* | 4/2009 | Miyata | .................. H02K 1/145 |
| | | | | 310/257 |
| 2013/0234540 | A1* | 9/2013 | Tsutsui | ..................... H02K 1/02 |
| | | | | 310/44 |
| 2015/0048708 | A1* | 2/2015 | Nord | .................... H02K 21/145 |
| | | | | 310/156.56 |
| 2015/0084466 | A1 | 3/2015 | Tsuchiya et al. | |

FOREIGN PATENT DOCUMENTS

| | | |
|---|---|---|
| EP | 1271753 | 1/2003 |
| EP | 2 053 721 | 4/2009 |
| JP | 7-75302 | 3/1995 |
| JP | 2005-117745 | 4/2005 |
| JP | 2009-5421 | 1/2009 |
| JP | 2010-166647 | 7/2010 |
| JP | 2013-201811 | 10/2013 |

OTHER PUBLICATIONS

International Search Report dated Jan. 19, 2017 from International Patent Application No. PCT/KR2016/011830, 3 pages.
Extended European Search Report dated Jun. 5, 2018 in European Patent Application No. 16857790.6.
European Communication dated May 2, 2019 in European Patent Application No. 16857790.6.
Chinese Office Action dated Apr. 3, 2019 in Chinese Patent Application No. 201680054353.7.

* cited by examiner

MOTOR AND MOTOR CONTROL CIRCUIT

CROSS-REFERENCE TO RELATED APPLICATIONS

This application claims the priority benefit of: Japan Patent Application No. 2015-208411 filed on Oct. 22, 2015, Japan Patent Application No. 2015-249980 filed on Dec. 22, 2015, Japan Patent Application No. 2015-250005 filed on Dec. 22, 2015, Japan Patent Application No. 2016-044863 filed on Mar. 8, 2016, Japan Patent Application No. 2016-168884 filed on Aug. 31, 2016 and Japan Patent Application No. 2016-202117 filed on Oct. 13, 2016, in the Japan Patent Office, and of Korean Patent Application No. 10-2016-0106702, filed on Aug. 23, 2016 in the Korean Intellectual Property Office, the disclosures of each of which are incorporated herein by reference in their entirety.

BACKGROUND

1. Field

Embodiments of the disclosure relate to a motor such as a single-phase claw pole motor or the like and a motor control circuit.

2. Description of the Related Art

A general single-phase claw pole motor, as shown in Japanese Patent Publication No. 2013-104442, includes a stator and a rotor rotatably installed in the stator. The stator includes an upper core including a plurality of downward claw poles formed along a circumferential direction, a lower core including a plurality of upward claw pole formed along the circumferential direction, and a coil wound in the circumferential direction.

In more detail, the cores and the coil are configured to alternately arrange the upward claw poles and the downward claw poles in the circumferential direction and to insert the coil into the cores.

However, for example, in a case in which a skew angle is formed in an axial direction at the stator, the stator may be formed by stacking stator elements formed by combining the cores and coil described above in the axial direction.

In this case, referring to an upper view of FIG. 7 as an example, when one side of a contact surface between an upper stator element and a lower stator element is a north pole and the other side is a south pole, a short circuit occurs between these stator elements.

From this, referring to a lower view of FIG. 7 as an example, the stator elements are stacked by interposing an insulator between the stator elements.

However, in the configuration described above, the insulator interposed between the stator elements may be an obstacle to miniaturizing the motor or manufacturing costs may be increased due to the insulator.

SUMMARY

Therefore, it is an aspect of the disclosure to provide a motor including a plurality of stator elements stacked in an axial direction without an insulator between the stator elements.

Additional aspects of the disclosure will be set forth in part in the description which follows and, in part, will be apparent from the description, or may be learned by practice of the disclosure.

In accordance with an aspect of the disclosure, a motor includes a stator and a rotor. The stator includes a plurality of stacked stator elements. Each of the stator elements may include a plurality of claw poles formed along a circumferential direction of the stator element and a coil wound in the circumferential direction of the stator element, and the coils of mutually adjacent stator elements are wound in different directions. Also, in the mutually adjacent stator elements, the claw poles of one of the stator elements and the claw poles of the other of the stator elements are opposite to each other and arranged to have the same polarity.

In the motor configured as described above, since the coils of the mutually adjacent stator elements are wound in different directions, all contact surfaces of the stator elements may become an N polarity or an S polarity, a short circuit may be prevented without interposing an insulator between the stator elements, and additionally, the motor may be miniaturized in an axial direction thereof while reducing material costs more than a general motor.

Here, even when the coils of the mutually adjacent stator elements are wound in different directions as shown in FIG. 6, the mutually adjacent stator elements are arranged such that one of the opposite claw poles becomes the N polarity and the other one of the opposite claw poles becomes the S polarity, and directions of magnetic fluxes formed between the claw poles of each of the stator elements become opposite to each other. Due to this, the magnetic fluxes are mutually eliminated and an output of the motor is reduced.

Compared with this, in the motor configured as described above, since the mutually adjacent stator elements are configured such that the claw poles of one of the stator elements and the claw poles of the other of the stator elements are opposite to each other and have the same polarity, the directions of the magnetic fluxes formed between the claw poles of each of the stator elements become identical and a decrease in output of the motor may be prevented.

In the mutually adjacent stator elements, a certain skew angle may be formed between mutually opposite claw poles.

The rotor may be one of a surface permanent magnet type, an interior permanent magnet type, and a spoke type.

Also, there is an aspect stated below.

A general claw pole motor, as described in Japanese Patent Publication No. 2009-005421, includes a plurality of claw poles formed along a circumferential direction and a coil disposed along the claw poles.

In the claw pole motor, when a heat dissipation member or a fan is installed to dissipate heat generated at the coil, a recent demand for reducing a size of the motor is not satisfied and material costs increase.

Among the described above, one or more of the inventors intensely and repeatedly considered a component which dissipated heat generated at a coil without installing an additional heat dissipation member.

The disclosure may provide a claw pole motor capable of dissipating heat generated at a coil without installing a heat dissipation member, a fan, or the like which is a result of intensely and repeatedly considering the above consideration.

That is, in accordance with an aspect of the disclosure, a claw pole motor may include a plurality of claw poles and a coil. The claw pole motor may include one pair of supporting members which support the claw poles and in which the coil is inserted and a connecting path formed between at least one of the one pair of supporting members. The connecting path connects a first opening formed at a part opposite to the coil with a second opening formed at a part not opposite to the coil.

According to the claw pole motor, since the supporting member includes the connecting path which connects the first opening formed at the part opposite to the coil with the second opening formed at the part not opposite to the coil, the coil may be cooled using air which flows in the connecting path. Also, since the connecting path is formed at the one pair of supporting members in which the coil is inserted, the coil may be cooled without additionally installing a heat dissipation member, a fan, or the like.

A concave groove or a slit formed throughout the part opposite to the coil and the part not opposite to the coil may be a detailed example of the connecting path.

To more certainly cool the coil, each of the supporting members may include a plurality of such concave grooves.

As an example in which the concave grooves are formed at the supporting member, each of the supporting members may be formed in an annular plate shape and the concave groove may have a shape which extends from the part opposite to the coil to the outside in a diametric direction.

Also, as another example in which heat generated at the coil is efficiently dissipated, a motor including a plurality of claw poles and a coil may include one pair of supporting members configured to support the claw poles and into which the coil is inserted. At least one of the supporting members may include a coil cooling through hole formed at the part opposite to the coil.

In the configuration described above, since the coil cooling through hole is formed at the part opposite to the coil of the supporting member, ambient air may come into direct contact with the coil through the coil cooling through hole and may efficiently cool the coil.

To provide mechanical strength of the supporting member with a large area of the coil in contact with air, the coil cooling through holes may be intermittently formed along the circumferential direction and a reinforcing portion configured to reinforce the mechanical strength of the supporting member may be formed between mutually adjacent coil cooling through holes.

To reduce core loss, each of the supporting members may be a nonmagnetic body.

Also, there is an aspect stated below.

It has been described that the general claw pole motor, as described in Japanese Patent Publication No. 2009-005421, includes a plurality of claw poles formed along a circumferential direction and a coil disposed along the claw poles, and each of the claw poles is formed by stacking a plurality of steel sheets in a u shape in the circumferential direction.

In more detail, since a magnetic flux amount gradually increases from a top end to a bottom end of the claw pole, the claw pole is configured such that a steel sheet in an approximate center in the circumferential direction is formed longer than steel sheets on both sides such that a cross section of the claw pole further increase from the top end toward the bottom end.

However, the cross section of the claw pole is configured to increase from the top end toward the bottom end only at a side of each of the claw poles next to the rotor. A side of each of the claw poles opposite to the rotor is configured to have a uniform sized cross section from the top end toward the bottom end. In the configuration described above, the magnetic flux more easily passes through the side opposite to the rotor than the side next to the rotor, and density of the magnetic flux of the side next to the rotor decreases in each of the claw poles, thereby actually decreasing efficiency of the motor.

Accordingly, to overcome the limitations described above, an aspect of the disclosure is to provide an improved shape of the claw pole to increase efficiency of the claw pole motor.

That is, in accordance with an aspect of the disclosure, a claw pole motor may include a stator including an upward claw pole and a downward claw pole alternately formed along the circumferential direction and a rotor disposed inside or outside the stator. Each of the claw poles may include a first magnetic pole element opposite to the rotor and a second magnetic pole element magnetically connected to the first magnetic pole element. The coil is inserted between the first magnetic pole element and the second magnetic pole element. The second magnetic pole element of each of the upward claw pole and the downward claw pole has a thickness which is thinner at a top end portion thereof than at a bottom end portion thereof.

In the claw pole motor, since the second magnetic pole element positioned opposite to the rotor is configured such that the thickness of the top end portion is thinner than the thickness of the bottom end portion, it is possible to concentrate greater magnetic flux on the first magnetic pole element than on the second magnetic pole element, and efficiency of the rotor may be further improved than a general motor when currents which flow through the coil are at the same level.

However, as described above, since a claw pole described in Japanese Patent Publication No. 2013-104442 has different lengths at an approximate center and both sides thereof in a circumferential direction, several types of steel sheets are necessary and a manufacturing process is complicated.

Accordingly, the upward claw pole may be formed by stacking steel sheets in the same shape, which forms a u shape when viewed in the circumferential direction of the stator element, in the circumferential direction and the downward claw pole may be formed by stacking steel sheets in the same shape, which forms an n shape when viewed in the circumferential direction of the stator element, in the circumferential direction.

Through the configuration described above, a manufacturing process may not be complicated and the thickness of the top end portion of the second magnetic pole element of each of the claw poles may be thinner than the thickness of the bottom end portion.

The first magnetic pole element and the second magnetic pole element may be formed as separate members, and each of the first magnetic pole element and the second magnetic pole element may be formed by stacking the steel sheets in the same shape in the circumferential direction of the stator element.

As described above, each of the magnetic pole elements are formed as a separate member, thereby increasing a yield rate of producing magnetic pole elements in comparison to a case in which magnetic pole elements are integrated.

To further increase the yield rate, each of the claw poles may further include a third magnetic pole element which is interposed between the bottom end portion of the first magnetic pole element and the bottom end portion of the second magnetic pole element to magnetically connect the magnetic bodies.

To facilitate assembling of the stator, one pair of supporting members which have the upward claw pole and the downward claw pole inserted therein and support the upward claw pole and the downward claw pole and in which the coil is inserted is further included. At each of the one pair of supporting members, a first position determining portion in which the bottom end portion of one of the upward claw pole and the downward claw pole is inserted and a second position determining portion in which the top end portion of the other one may be formed.

When each of the claw poles is formed as a separate magnetic pole element, the one pair of supporting members which have the upward claw pole and the downward claw pole inserted therein and support the upward claw pole and the downward claw pole and in which the coil is inserted is further included to facilitate the assembling of the stator. At each of the one pair of supporting members, a plurality of position determining portions in which a plurality of such magnetic pole elements which form the claw poles are inserted may be formed.

However, when the claw pole includes a first magnetic pole element disposed inside the coil and a second magnetic pole element disposed outside the coil such that the coil is inserted therebetween, since an outer circumference of the coil is greater than an inner circumference thereof, a gap is formed between the second magnetic pole elements of the claw poles adjacent to each other in the circumferential direction and magnetic flux leaks through the gap. Accordingly, although currents are increased to obtain torque, magnetic saturation is reached before necessary torque is reached and it is impossible to provide the necessary torque.

Accordingly, in accordance with an aspect of the disclosure, a motor which includes a coil formed by winding a leading wire and a plurality of claw poles formed along the circumferential direction further may include a magnetic body which forms a magnetic circuit between one and another of the claw poles to induce magnetic flux which passes through one of the claw poles arranged outside the coil and mutually adjacent to the other thereof in the circumferential direction.

In the motor configured as described above, since the magnetic body is installed between the claw poles adjacent to each other in the circumferential direction and the magnetic flux which passes through the one of the claw poles is induced to the other thereof, leakage of the magnetic flux may be suppressed to prevent magnetic saturation, thereby providing the necessary torque.

As an example, the magnetic body may have a cylindrical shape which surrounds an outside of the coil.

In this case, for example, since a steel sheet is wound in a cylindrical shape to provide a random thickness and the magnetic body in the cylindrical shape is installed outside the coil, it is possible to manufacture or attach the magnetic body without complication.

As another example, the magnetic body may include a plurality of divided magnetic bodies which surround the outside of the coil.

In this case, for example, the divided magnetic bodies may be formed and manufactured simply by stacking a plurality of electronic steel sheets in a diametric direction.

As described above, as a detailed example in which the magnetic body includes the plurality of divided magnetic bodies, there is provided a configuration in which each of the claw poles may include a first magnetic pole element disposed inwardly from the coil and a second magnetic pole element, wherein the coil is interposed therebetween, and the divided magnetic body is disposed between the second magnetic pole elements of claw poles adjacent to each other in a circumferential direction.

Even in this configuration, the leakage of the magnetic flux may be suppressed and necessary torque may be provided.

However, as described above, when the configuration in which the magnetic body is installed to suppress the leakage of the magnetic flux is applied to a single-phase motor, one or more of the inventors of the application analyzed an electromagnetic field of a configuration in which the claw pole includes a vertical magnetic pole element positioned between the coil and the rotor and a horizontal magnetic pole element which extends from an end portion of the vertical magnetic pole element and is positioned at a top or bottom of the coil, and the horizontal magnetic pole element and the magnetic body are in contact with each other.

According to the analysis, as shown in FIG. 34, cogging torque acts in a negative direction, and, accompanying this, conducting torque acts in the negative direction when the motor is maneuvered. As a result thereof, since synthetic torque acts in the negative direction in the above description, the rotor counter-rotates after the motor is maneuvered and stalls until the synthetic torque becomes zero to be stopped when a load on a motor is great.

Accordingly, as a result of the intense consideration of the one or more inventors of the application based on the result of the analysis described above, in the single-phase motor, the claw pole may include the vertical magnetic pole element positioned between the coil and the rotor and the horizontal magnetic pole element which extends from the end portion of the vertical magnetic pole element and is positioned at the top or bottom of the coil, and a gap may be formed between the horizontal magnetic pole element and the magnetic body to rotate the rotor forward by providing synthetic torque which acts in the positive direction when the motor is maneuvered.

When the gap is formed between the horizontal magnetic pole element and the magnetic body as described above, a phase of the cogging torque deviates, and the conducting torque and the synthetic torque act in the positive direction when the horizontal magnetic pole element and the magnetic body are in contact with each other as a result of analyzing the electromagnetic field. Accordingly, the rotor may be rotated forward after the motor is maneuvered and may be prevented from stopping. Meanwhile, a detailed result of the analysis of the electromagnetic field will be described below.

As a configuration for providing greater torque which acts in the positive direction when the motor is maneuvered, there is a configuration in which the claw pole is disposed to be inclined such that the gap increases along a rotation direction of the rotor or a configuration in which a gap formed between the horizontal magnetic pole element positioned at the top of the coil and the magnetic body has a size different from that of a gap formed between the horizontal magnetic pole element positioned at the bottom of the coil and the magnetic body. Meanwhile, the result of analyzing the electromagnetic field of the configuration will be described below.

Also, there is an aspect stated below.

There is a general motor control circuit configured to alternately turn on or off one of two pairs of transistors diagonally arranged using an H bridge circuit, for example, to convert a direct current (DC) voltage supplied from a power source into an alternating current (AC) voltage and apply the AC voltage to a motor.

In this configuration, since a through current may instantaneously flow and there is a possibility of transistors stalling when all of the two pairs of transistors are simultaneously turned on, a time in which all of the transistors are turned off (a so-called a dead time) is provided during a time from a state in which one pair of the two pairs of transistors are turned on to a state in which the other pair of the two pairs of transistors are turned on.

However, in the dead time described above, energy condensed at a coil of the motor flows through a parasitic diode of the transistor as a regenerative current, and a voltage increase of a power line occurs due to a so-called kick back, which has a bad influence on oscillation of the motor or a circuit device.

Accordingly, a motor control circuit described in Japanese Patent Publication No. 2004-135374 maintains a ground side transistor in an ON state for a longer time than a power source side transistor among one pair of transistors which are turned off to loop regenerative current at a ground side such that regenerative currents flow through a parasitic diode to be consumed.

It is an aspect of the disclosure which more certainly suppresses a voltage increase of a power line caused by kick back than a general motor control circuit is provided by the one or more inventors as a result of intense consideration.

That is, in accordance with an aspect of the disclosure, a motor control circuit may include four metal-oxide semi-conductor field-effect-transistors (MOSFETs), an H bridge circuit supplying power from a power source to a motor, and a driving circuit which outputs a driving signal to each of the MOSFETs and turns on or off two pairs of MOSFETs that are diagonally arranged one by one. When one pair of the MOSFETs are turned off, the control circuit turns off a ground side MOSFET, and then turns off power a source side MOSFET after a preset certain time passes.

In the motor control circuit described above, when one pair of the MOSFETs are turned off, since the ground side MOSFET is turned off, and then the power source side MOSFET is turned off after the preset certain time passes, a loop which consumes regenerative currents may be formed at a power source side.

Accordingly, the regenerative currents may flow through not only the parasitic diode but also several circuit devices such as a condenser or the like installed at the power source side, regenerative power may be more efficiently consumed than in a general motor control circuit, and a voltage increase of a power source line caused by kick back may be more certainly suppressed.

Also, in accordance with an aspect of the disclosure, a motor control circuit may include four MOSFETs, an H bridge circuit supplying power from a power source to a motor, and a driving circuit which turns on/off two pairs of MOSFETs diagonally arranged one by one by outputting a driving signal to each of the MOSFETs. Also, one pair of regenerative current consuming MOSFETs installed in parallel with two power source side MOSFETs corresponding to power source side MOSFETs are further included. The driving circuit turns on a regenerative current consuming MOSFET corresponding to a power source side MOSFET turned off when one pair of the MOSFETs are turned off.

In a case of the motor control circuit, a loop which consumes regenerative currents may be formed at the power source by turning on the regenerative current consuming MOSFET corresponding to the power source side MOSFET that is turned off, and effects similar to those of the configuration described above may be obtained.

Also, in accordance with an aspect of the disclosure, a motor control circuit may include four MOSFETs, an H bridge circuit supplying power from a power source to a motor, and a driving circuit which outputs a driving signal to each of the MOSFETs and turns on or off two pairs of MOSFETs diagonally arranged one by one in a non-conducting state in which the four MOSFETs are turned off. In the motor control circuit described above, when the two pairs of MOSFETs diagonally arranged are turned on or off one by one, the driving circuit turns off all four of the MOSFETs for a preset time to be in the non-conducting state while turning off a ground side MOSFET of one pair of the MOSFETs turned on before the one pair of the MOSFETs are in the non-conducting state and turning on a power source side MOSFET.

In case of the motor control circuit, since the ground side MOSFET of the one pair of the MOSFETs turned on before the one pair of the MOSFETs are in the non-conducting state is turned off and the power source side MOSFET is maintained to be on, the loop which consumes the regenerative currents may be formed at the power source side and effects similar to the configuration described above may be obtained.

The four MOSFETs may be N type MOSFETs.

In the configuration described above, compared with a case of using P type MOSFETs, since the N type MOSFETs have excellent frequency characteristics, heat generated at the MOSFETs when pulse width modulation (PWM) is performed may be suppressed.

Also, in accordance with an aspect of the disclosure, a motor includes a rotor and a stator including a plurality of stator elements. Each of the stator elements may include a plurality of claw poles formed along a circumferential direction of the stator element and a coil wound along the circumferential direction of the stator element. The claw pole may include a first magnetic pole element and a second magnetic pole element. At least one of the first magnetic pole element and the second magnetic pole element may include a resistor for changing a flow of magnetic flux.

Since density of magnetic flux at the rotor increases in each of the claw poles due to the change of the magnetic flux caused by the resistor, efficiency of the motor is increased.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
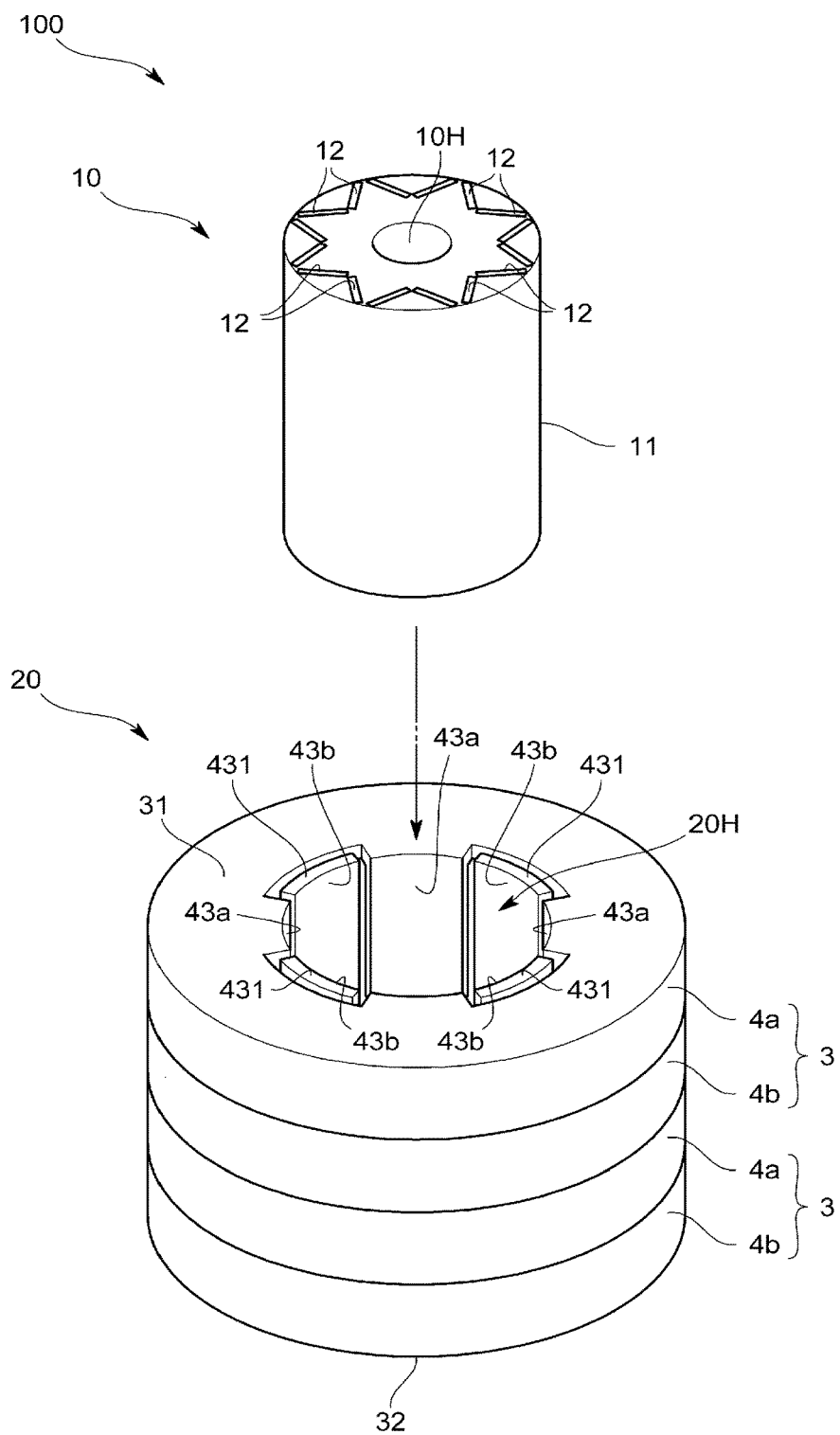
FIG. 1 is a view illustrating a whole configuration of a motor in accordance with an embodiment of the disclosure.

Reference will now be made in detail to example embodiments which are illustrated in the accompanying drawings, wherein like reference numerals refer to like elements throughout. The embodiments are described below to explain the disclosure by referring to the figures.

Hereinafter, a motor in accordance with one embodiment of the disclosure will be described with reference to the drawings.

A motor 100 in accordance with one embodiment of the disclosure is used as a compressor which forms, for example, a cooling cycle, and includes a stator 20 and a rotor 10 rotatably installed in the stator 20 as shown in FIG. 1.

First, the rotor 10 will be described.

The rotor 10 is a so-called interior permanent magnet (IPM) including a core 11 formed in a cylindrical shape in which a rotor shaft (not shown) that is a rotating shaft is attached to a through hole 10H which vertically passes therethrough, and including a plurality of magnet insertion holes formed along a circumferential portion and a plurality of permanent magnets 12 to be inserted into the plurality of magnet insertion holes.

The core 11 has a shape in which a plurality of electrical steel sheets are stacked.

The plurality of permanent magnets 12 are arranged in a V shape with a rotation center side as an apex and form magnetic poles. 8 magnets are formed in FIG. 1. Meanwhile, the number of magnetic poles may be appropriately changed.

Next, the stator 20 will be described.

The stator 20 is formed in a cylindrical shape in which the rotor 10 is rotatably installed in a through hole 20H which vertically passes therethrough. In FIG. 1, the stator 20 is formed by stacking a plurality of stator elements 3 in an axial direction.

Figure 2:
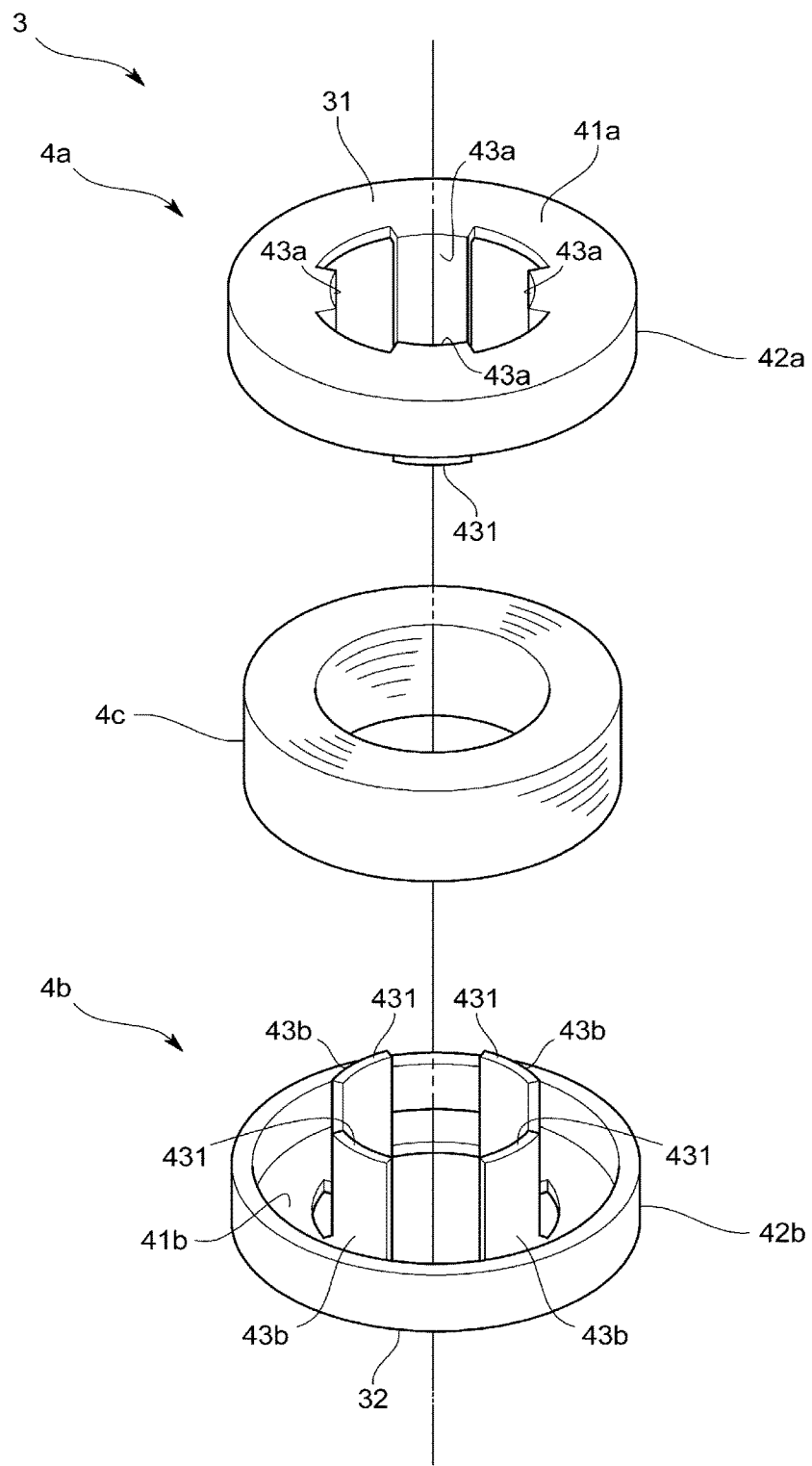
FIG. 2 is a view illustrating a configuration of a stator element in accordance with an embodiment of the disclosure.

As shown in FIG. 2, the stator element 3 may include an upper core 4a including a plurality of downward claw poles 43a along a circumferential direction of the stator element 3, a lower core 4b including a plurality of upward claw poles 43b along the circumferential direction of the stator element 3, and a coil 4c inserted into the upper core 4a and the lower core 4b and wound in the circumferential direction of the stator element 3.

In more detail, as shown in FIGS. 1 and 2, the upward claw poles 43b and the downward claw poles 43a are alternately arranged in the circumferential direction of the stator element 3 and combined such that the coil 4c may be inserted into the upper core 4a and the lower core 4b.

The upper core 4a may include a substrate portion 41a including a through hole in the center thereof, for example, in a cylindrical shape, a side panel portion 42a which extends downward from an outer edge portion of the substrate portion 41a in the axial direction, and the plurality of downward claw poles 43a which extend downward from an inner edge of the substrate portion 41a in the axial direction.

The downward claw poles 43a are formed to be equidistant along the circumferential direction of the stator element 3 and extend downward further than a cross section of the side panel portion 42a. All of the downward claw poles 43a may have the same shape, for example, an approximately rectangular shape.

The lower core 4b may include a substrate portion 41b including a through hole in the center thereof, for example, having a cylindrical shape, a side panel portion 42b which extends upward from an outer edge portion of the substrate portion 41b in the axial direction, and the plurality of upward claw poles 43b which extend upward from an inner edge of the substrate portion 41b in the axial direction. In one embodiment of the disclosure, the upper core 4a and the lower core 4b are configured to vertically oppose each other.

Accordingly, the upward claw poles 43b are formed to be equidistant along the circumferential direction of the stator element 3 and extend upward further than a cross section of the side panel portion 42b. All of the upward claw poles 43b may have the same shape, for example, an approximately rectangular shape.

Meanwhile, as shown in FIG. 1, in one embodiment of the disclosure, in a state in which the upper core 4a and the lower core 4b are combined, a linear cross section 431 of each of the upward claw poles 43b and a top surface 31 of the upper core 4a are arranged in the same plane and a linear cross section 431 of each of the downward claw poles 43a and a bottom surface 32 of the lower core 4b are arranged in the same plane.

The coil 4c is accommodated in a coil accommodating space formed by the substrate portions 41a and 41b and the side panel portions 42a and 42b by combining the upper core 4a and the lower core 4b. Here, the coil 4c has a cylindrical shape formed by winding an insulation coated wire in the circumferential direction.

As shown in FIG. 1, the stator 20 of the motor 100 in accordance with one embodiment of the disclosure is formed in a shape in which the two stator elements 3 described above are stacked in the axial direction.

In more detail, the bottom surface 32 of the stator element 3 on one side (a top side) is in contact with the top surface 31 of the stator element 3 on the other side (a bottom side) such that the stator elements 3 are stacked on the same axis.

Figure 3:
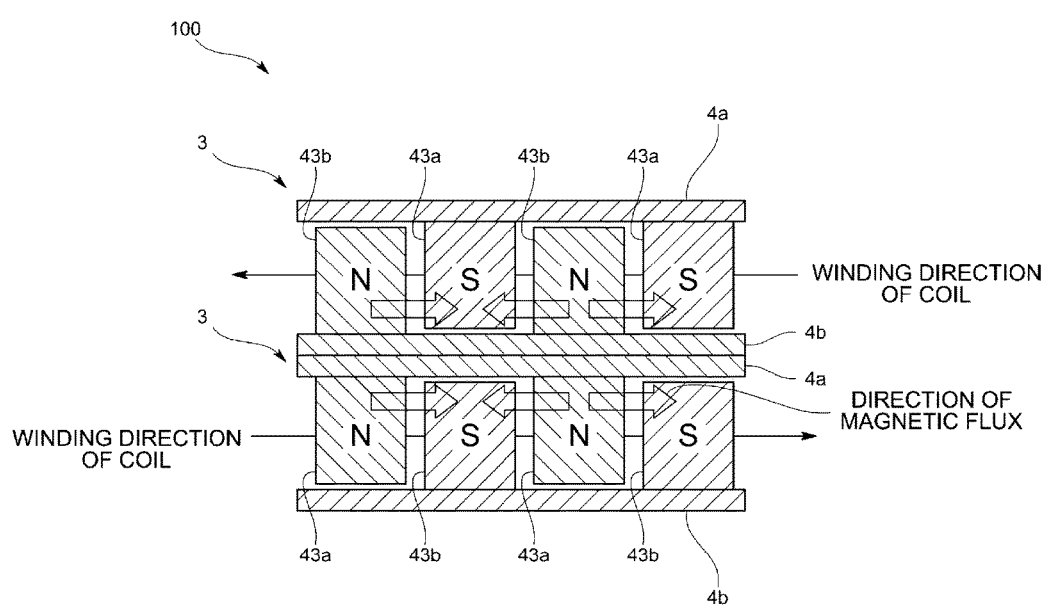
FIG. 3 is a view illustrating a side configuration of the stator element in accordance with an embodiment of the disclosure.

Also, as shown in FIG. 3, in one embodiment of the disclosure, the coils 4c of the stator elements 3 on the top side and the bottom side are wound in mutually opposite directions, arranged such that the downward claw poles 43a at the top side and the upward claw poles 43b at the bottom side overlap each other when viewed in the axial direction, and arranged such that the upward claw poles 43b at the top side and the downward claw poles 43a at the bottom side overlap each other when viewed in the axial direction.

In more detail, the stator element 3 on the one side and the stator element 3 on the other side overlap each other and are vertically opposite to each other, and the coils 4c of the stator elements 3 are wound in mutually opposite directions.

In this state, the stator element 3 on the one side is rotated an odd number (1) of claw poles from the stator element 3 on the other side around a rotating shaft. That is, the stator element 3 on the one side is disposed to have an angular difference of 180 electrical degrees with the stator element 3 on the other side.

Accordingly, the downward claw poles 43a at the top side face the front of the upward claw poles 43b at the bottom side and the upward claw poles 43b at the top side and the downward claw poles 43a at the bottom side face in opposite directions.

According to the motor 100 in accordance with one embodiment of the disclosure configured as described above, since the coils 4c of adjacent stator elements 3 are wound in opposite directions as shown in FIG. 3, even though all contact surfaces of the stator element 3 are a north pole or a south pole, a short circuit may be prevented without interposing an insulator between the stator elements 3. Since an insulator is not interposed, it is possible to reduce manufacturing costs and to miniaturize the motor 100 in the axial direction in comparison to general motors.

Also, since the downward claw poles 43a at the top side and the upward claw poles 43b at the bottom side overlap each other when viewed in the axial direction and the upward claw poles 43b at the top side and the downward claw poles 43a at the bottom side overlap each other when viewed in the axial direction, all adjacent claw poles in the axial direction are a north pole or a south pole. Accordingly, since a direction of a magnetic field formed by the stator element 3 on the one side and a direction of a magnetic field formed by the stator element 3 on the other side become approximately identical directions and these magnetic fields do not eliminate each other, there is no expectation that output of the motor will be reduced.

Figure 4:
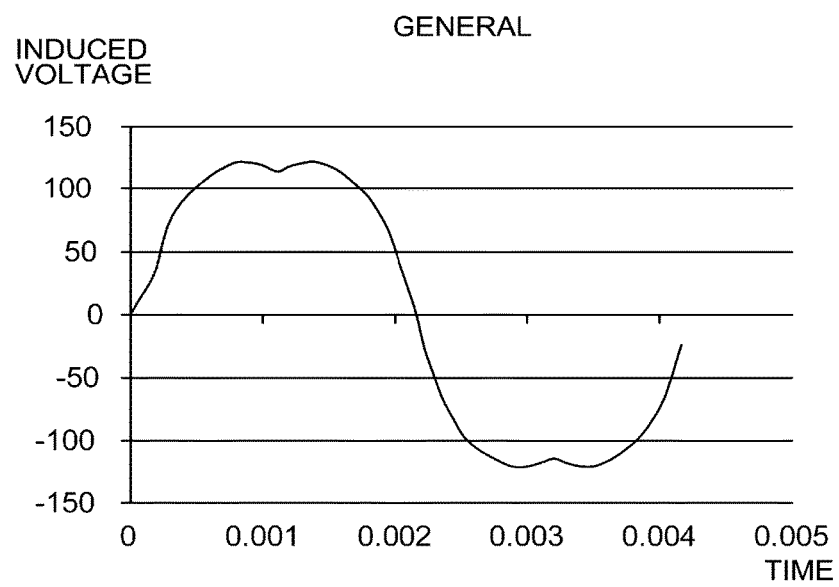
FIG. 4 illustrates an experimental result of an effect of the motor in accordance with an embodiment of the disclosure.
Figure 4:
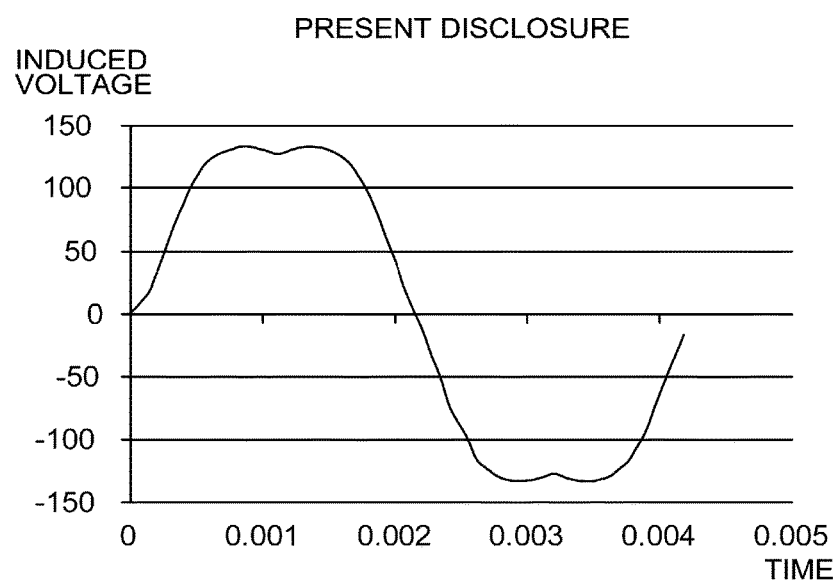

Experimental data illustrating the above is shown in FIG. 4.

The experimental data is a result of an experiment in which a general motor is compared with the motor 100 in accordance with one embodiment of the disclosure. As can be seen from the result of the experiment, the motor 100 in accordance with one embodiment of the disclosure has approximately the same induced voltage and outputs torque which is not reduced in comparison to the general motor.

Meanwhile, the disclosure is not limited to the embodiment described above.

Figure 5:
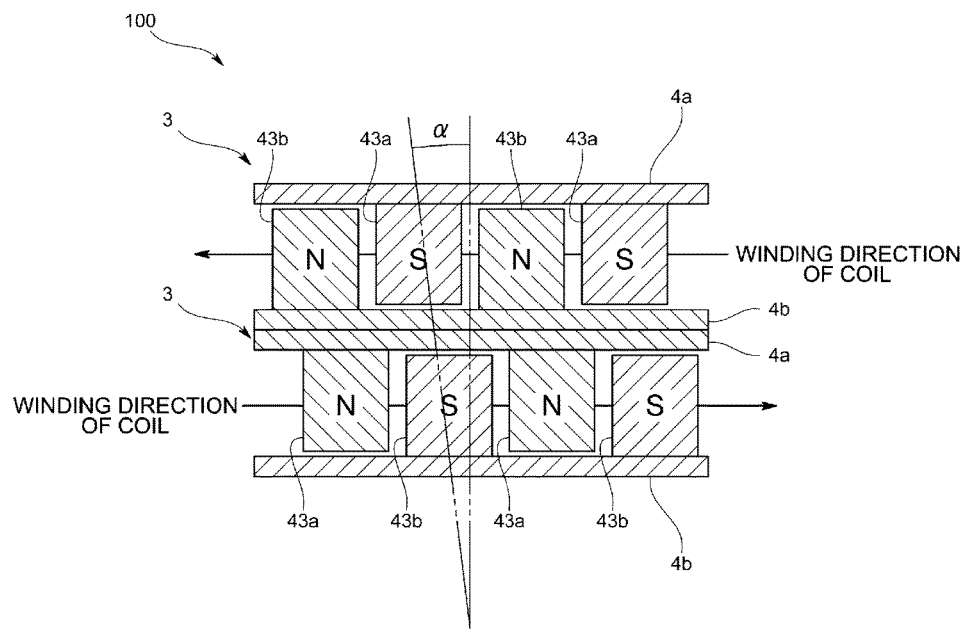
FIG. 5 is a view illustrating a side configuration of a motor in accordance with an embodiment of the disclosure.

For example, in the embodiment described above, the two stator elements 3 are arranged such that the downward claw poles 43a at the top side and the upward claw poles 43b at the bottom side face the front of each other and the upward claw poles 43*b* at the top side and the downward claw poles 43*a* at the bottom side oppose each other. However, as shown in FIG. 5, the two stator elements 3 may be arranged to form a certain skew angle α at the claw poles 43*a* and 43*b* with respect to the axial direction.

In more detail, the downward claw poles 43*a* at the top side and the upward claw poles 43*b* at the bottom side may least partially overlap each other when viewed in the axial direction. Also, the upward claw poles 43*b* at the top side and the downward claw poles 43*a* at the bottom side may at least partially overlap each other when viewed in the axial direction.

Also, the upward claw poles 43*b* and the downward claw poles 43*a* which overlap when viewed in the axial direction are alternately arranged along the circumferential direction with respect to the axial direction, thereby forming the certain skew angle α between these claw poles 43*a* and 43*b*.

Figure 6:
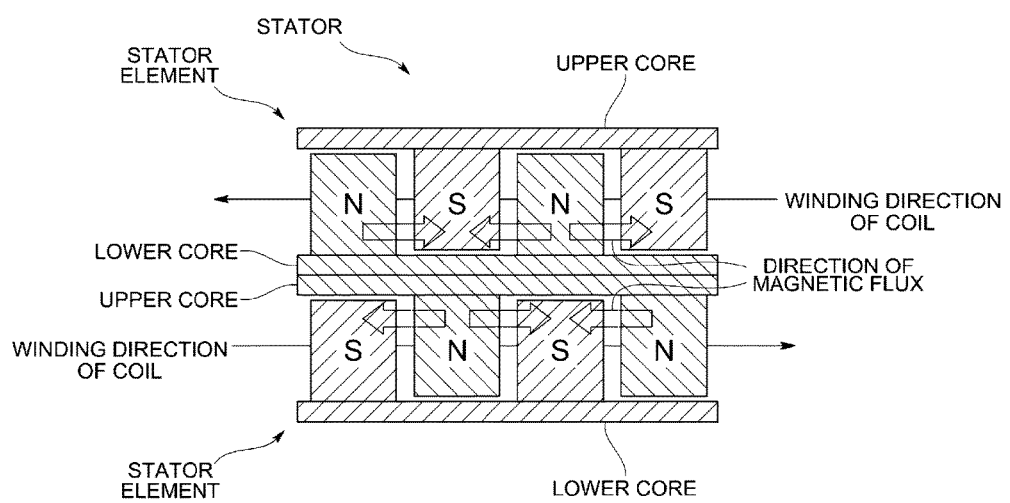
FIG. 6 is a view illustrating a direction of a magnetic pole formed between claw poles of a motor.
Figure 7:
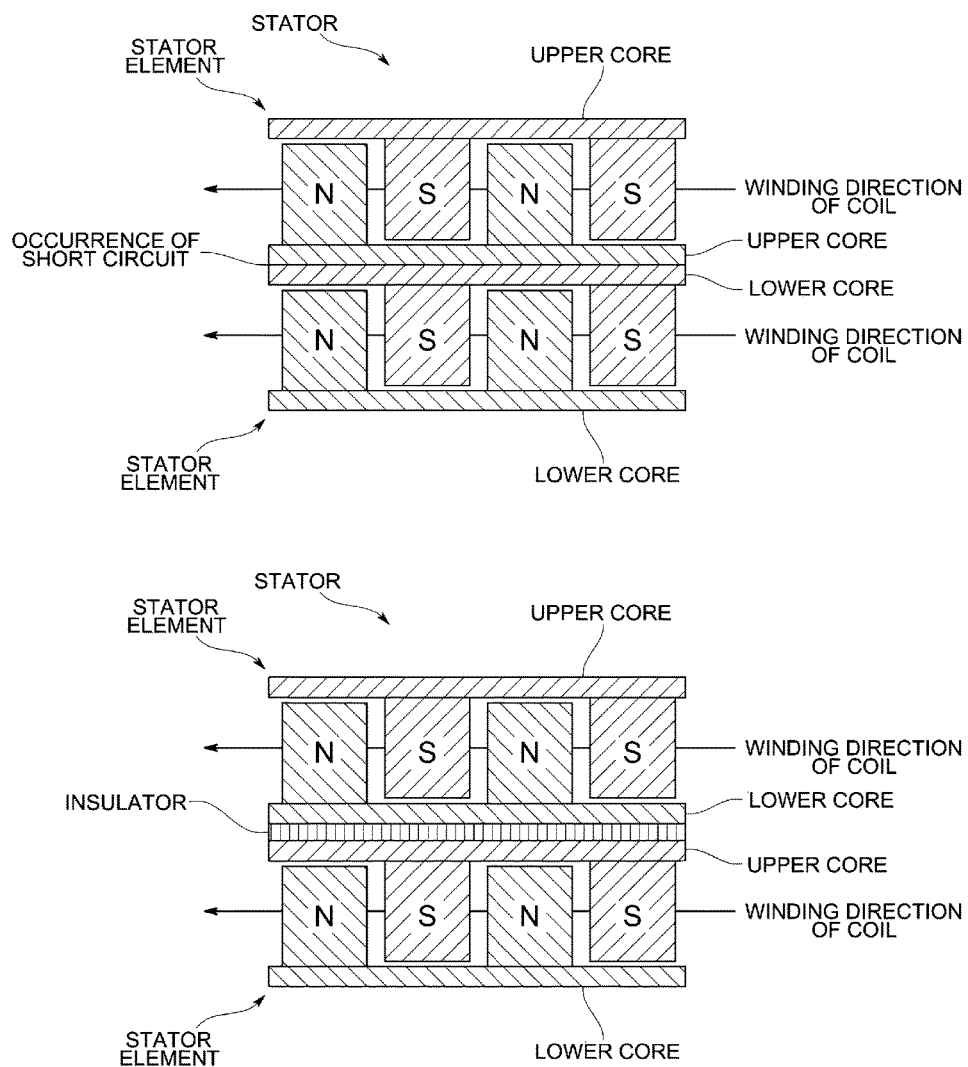
FIG. 7 is a schematic diagram illustrating a configuration of a general motor.

As shown in FIG. 6, according to the motor 100 configured as described above, it is possible to form the skew angle α at the stator 20 and to reduce cogging torque without forming an insulator between the stator elements 3.

Also, although the stator in accordance with the embodiment is formed by stacking two stator elements, the number of stator elements is not limited to the embodiment and may be three or more.

Also, the rotor in one embodiment is the IPM type but may be a surface permanent magnet (SPM) type or a spoke type.

Also, in the case of the motor in the embodiment, the rotor is an inner rotor type positioned inside the stator but may be an outer rotor type positioned outside the stator.

Next, a claw pole motor in accordance with one embodiment of the disclosure will be described based on one stator element.

Figure 8:
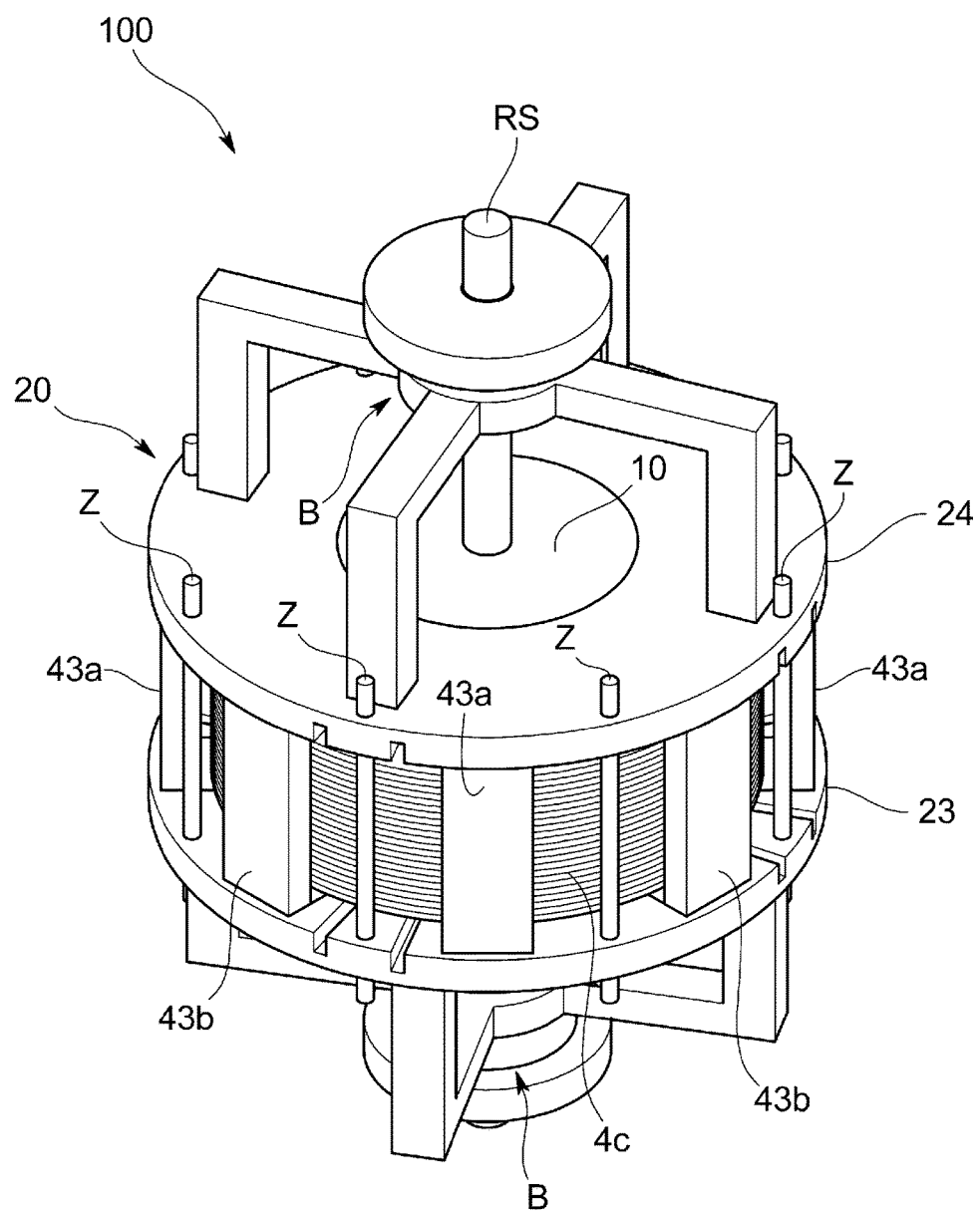
FIG. 8 is a view illustrating a whole configuration of a motor in accordance with an embodiment of the disclosure.

As shown in FIG. 8, the motor 100 in accordance with one embodiment of the disclosure may include the rotor 10, the coil 4*c*, and the stator 20, and is, for example, a motor used as a compressor which forms a cooling cycle.

Figure 9:
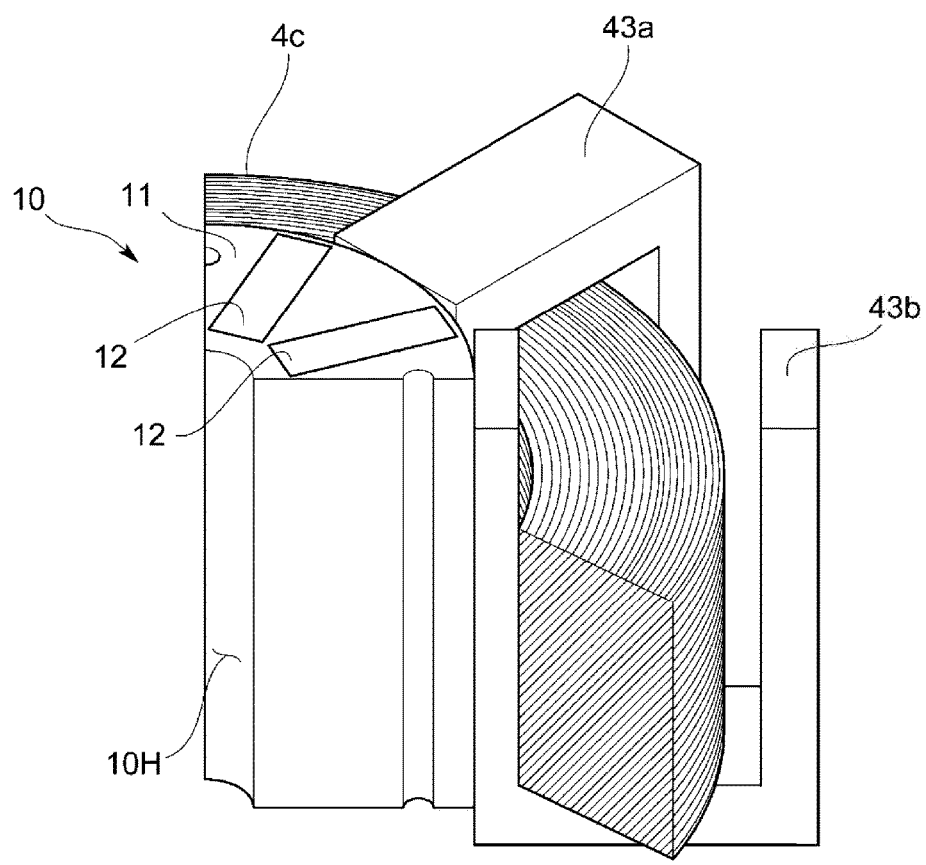
FIG. 9 is a perspective view mimetically illustrating a part of a rotor of the motor in accordance with an embodiment of the disclosure.

As shown in FIGS. 8 and 9, the rotor 10 is a so-called IPM including the core 11 formed in a cylindrical shape in which a rotor shaft RS that is a rotating shaft is attached to the through hole 10H which vertically passes therethrough, and including the plurality of magnet insertion holes formed along the circumferential portion and the plurality of permanent magnets 12 to be inserted into the plurality of magnet insertion holes.

The rotor 10 and the rotor shaft RS are rotatably supported by a bearing B at the stator 20.

Figure 10:
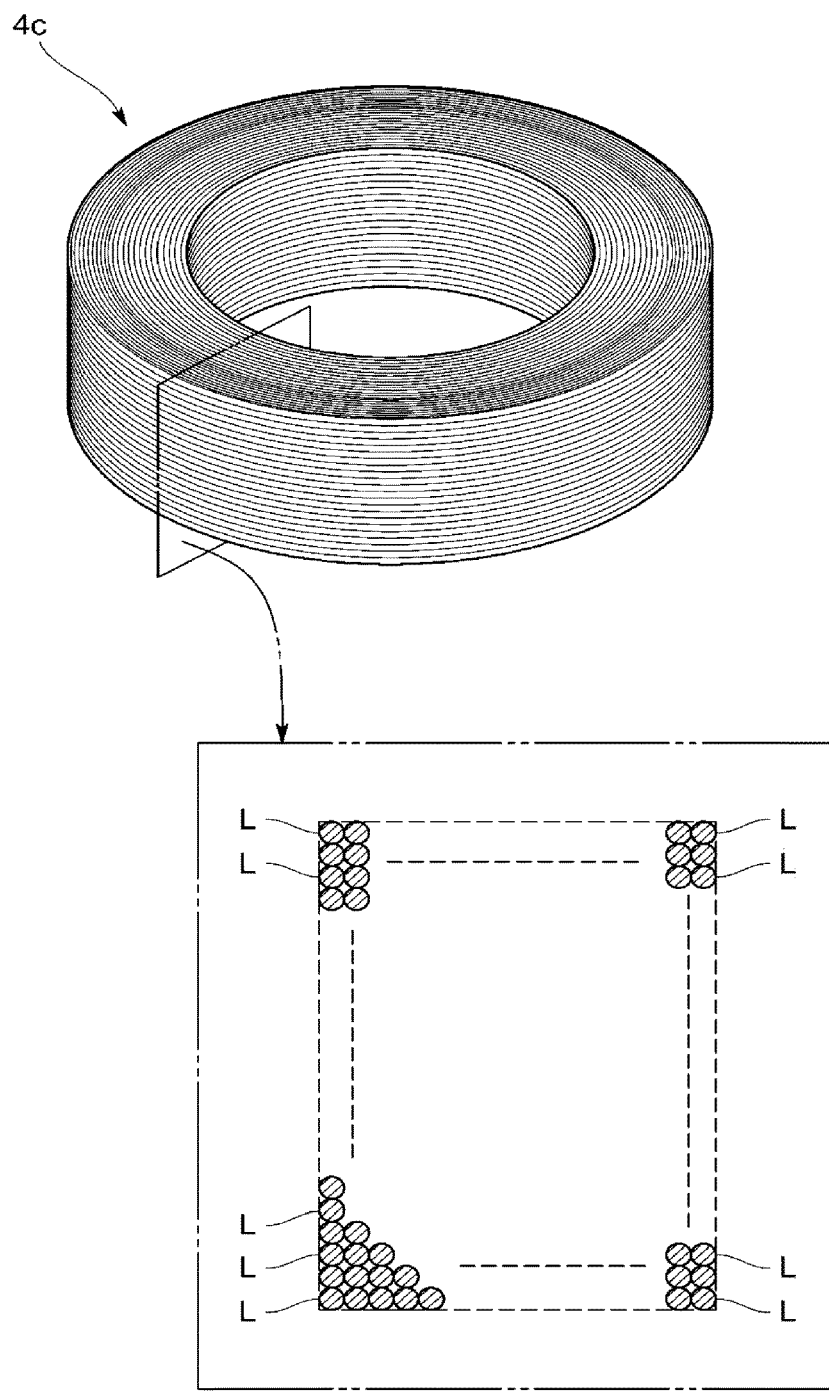
FIG. 10 is a perspective view mimetically illustrating a coil of the motor in accordance with an embodiment of the disclosure.

As shown in FIGS. 9 and 10, the coil 4*c* has a cylindrical shape formed by winding a lead wire L, which has a material of a conductive wire, in the circumferential direction, and is disposed along an outer circumference of the rotor 10.

The coil 4*c* in accordance with one embodiment of the disclosure, as shown in FIG. 10, is formed by pre-winding the lead wire L with a certain circumferential length and a certain number of winding times to be at a certain height. In detail, the lead wire L is wound while being aligned using a jig or the like and an adhesive is impregnated or coated at a curing surface thereof.

Figure 11:
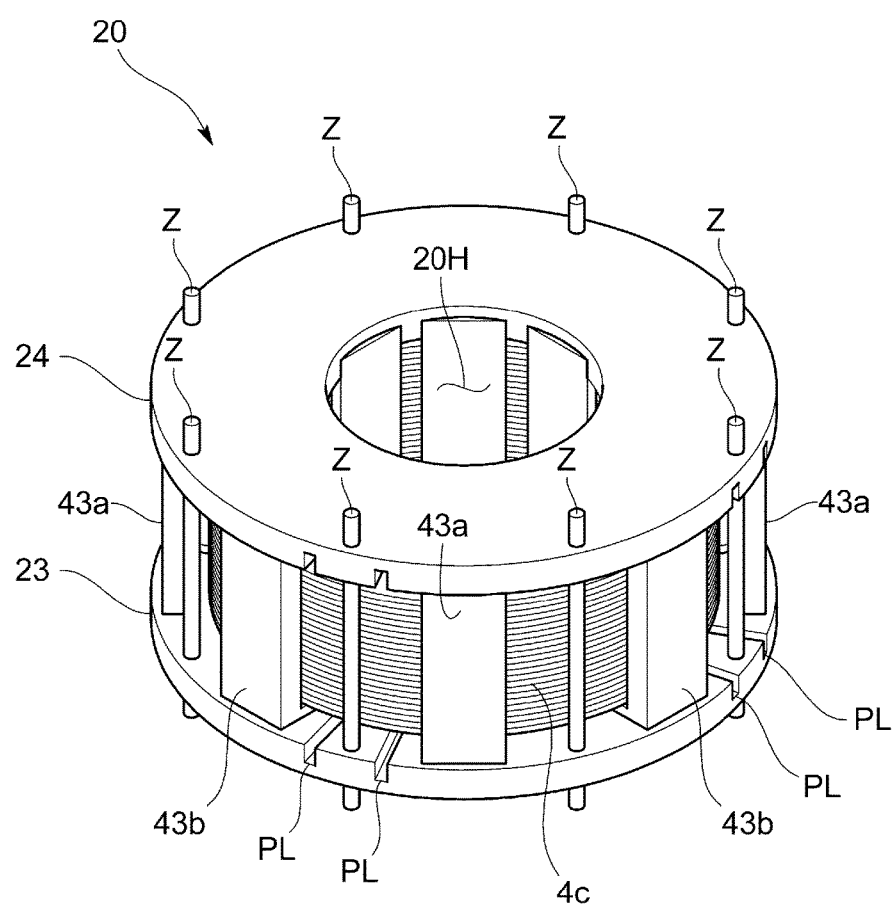
FIG. 11 is a perspective view mimetically illustrating a stator of the motor in accordance with one embodiment of the disclosure.

As shown in FIG. 11, the stator 20 may include the through hole 20H vertically passing therethrough in which the rotor 10 is rotatably installed, the plurality of upward claw poles 43*b*, the plurality of downward claw poles 43*a*, a pair of a lower supporting member 23 and a upper supporting member 24 which support the claw poles 43*b* and 43*a* and accommodate the coil 4*c*.

The upward claw poles 43*b* and the downward claw poles 43*a* are alternately and intermittently formed along the circumferential direction. In one embodiment, the upward claw poles 43*b* are formed to be equidistant along the circumferential direction and are formed in the same shape. Also, the downward claw poles 43*a* vertically oppose the upward claw poles 43*b*, are formed in the same shape, and are formed to be equidistant along the circumferential direction. In more detail, the upward claw poles 43*b* are formed in an u shape when viewed in the circumferential direction, and the downward claw poles 43*a* are formed in a n shape when viewed in the circumferential direction.

Figure 12:
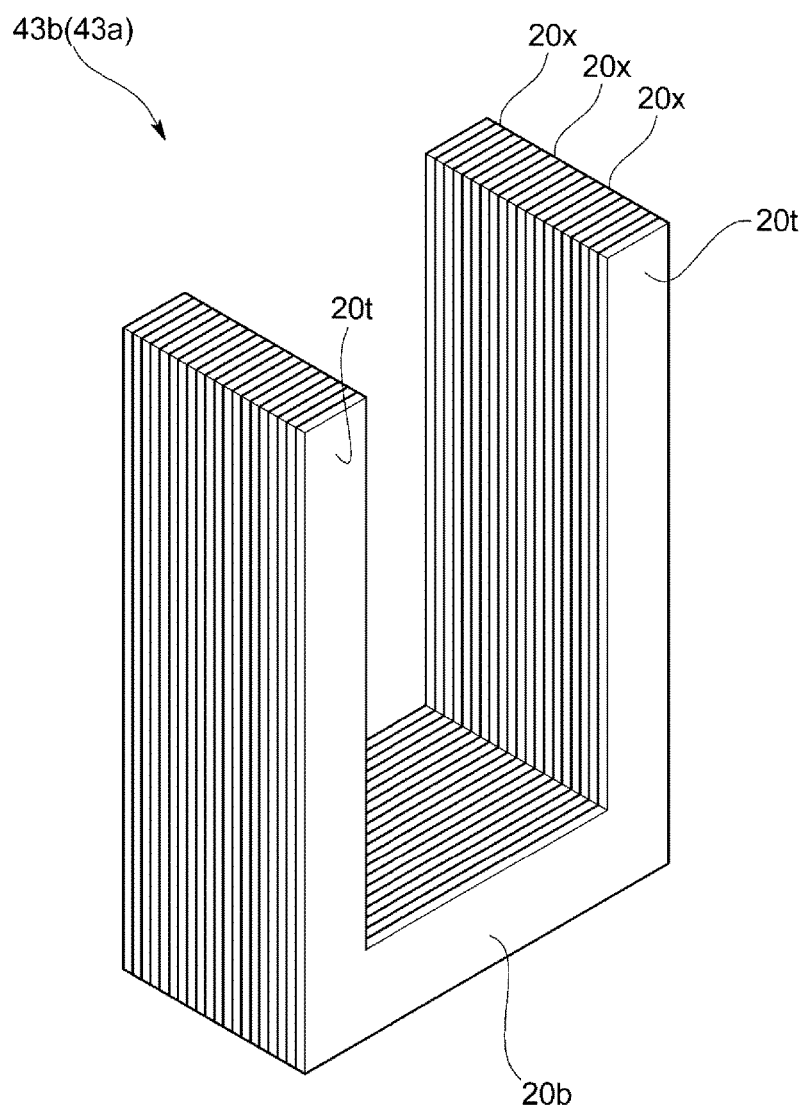
FIG. 12 is a perspective view mimetically illustrating a claw pole of the motor in accordance with an embodiment of the disclosure.

As shown in FIG. 12, the claw poles 43*b* and 43*a* are formed by stacking a plurality of steel sheets 20*x* in the circumferential direction. Here, the plurality of steel sheets 20*x* are stacked in a u shape when viewed from a plane which forms the same shape and are adhered using, for example, an adhesive, a varnish, etc.

Meanwhile, in one embodiment, a shape of the steel sheet 20*x* is one type, and is a left-and-right symmetrical shape.

In FIG. 12, parts indicated by reference numeral 20*t* are top end portions of the claw poles 43*b* and 43*a*, and parts indicated by reference numeral 20*b* are bottom end portions of the claw poles 43*b* and 43*a*.

Here, the lower supporting member 23 and the upper supporting member 24 which support the claw poles 43*b* and 43*a* are formed of an insulator which is a nonmagnetic material, for example, resin or the like.

Since the lower supporting member 23 and the upper supporting member 24 in accordance with one embodiment of the disclosure have the same shape, the lower supporting member 23 will be described below as a representative example.

Figure 13:
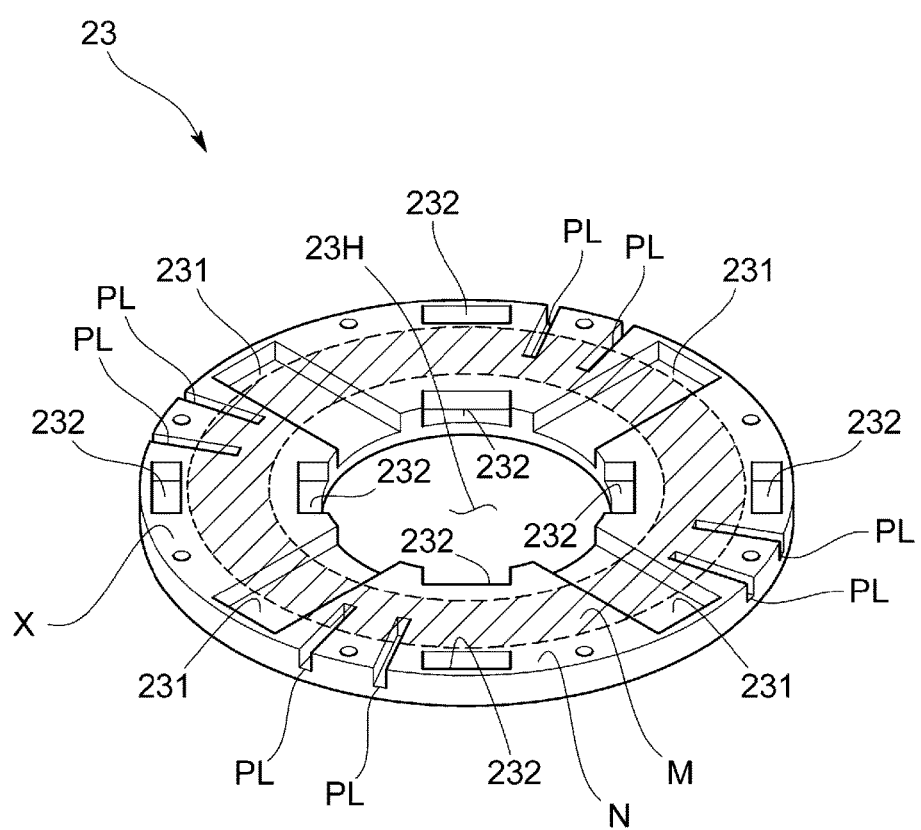
FIG. 13 is a perspective view mimetically illustrating a supporting member of the stator element of the motor in accordance with an embodiment of the disclosure.
Figure 14:
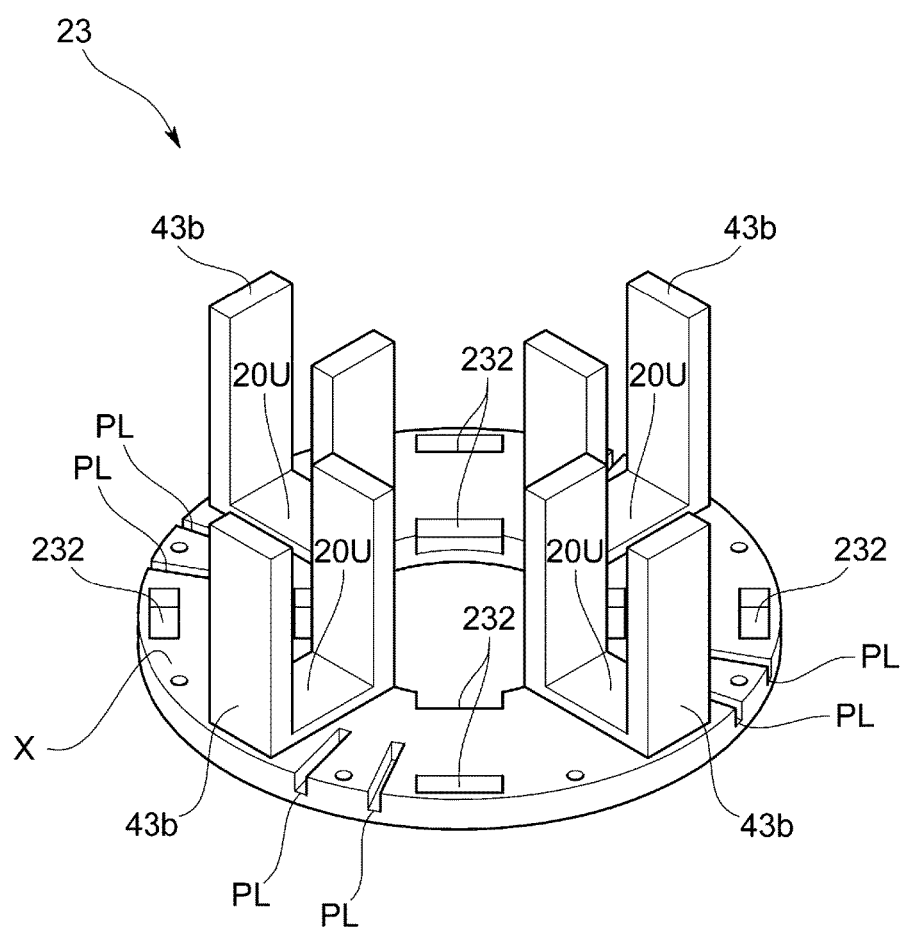
FIG. 14 is a perspective view mimetically illustrating a claw pole and a supporting member of the motor in accordance with an embodiment of the disclosure.

As shown in FIGS. 13 and 14, the lower supporting member 23 is formed in an annular plate shape including a through hole 23H formed in the center thereof such that the coil 4*c* is disposed to be coaxial therewith.

The lower supporting member 23 in accordance with one embodiment of the disclosure may include a plurality of position determining portions 231 and 232 which determine positions of the upward claw poles 43*b* and the downward claw poles 43*a*. In more detail, the lower supporting member 23 may include first position determining portions 231 into which the bottom end portions 20*b* of the upward claw poles 43*b* are inserted and which determine positions of the upward claw poles 43*b* and second position determining portions 232 into which the top end portions 20*t* of the downward claw poles 43*a* are inserted and which determine positions of the downward claw poles 43*a*. Meanwhile, in the upper supporting member 24, the bottom end portions 20*b* of the downward claw poles 43*a* are inserted into the first position determining portions 231 and the top end portions 20*t* of the upward claw poles 43*b* are inserted into the second position determining portions 232.

The first position determining portions 231 and the second position determining portions 232 are alternately and intermittently formed along the circumferential direction and concave portions formed at an opposite side X of the lower supporting member 23 to the upper supporting member 24.

In more detail, the first position determining portion 231 is a rectangular-shaped concave portion formed from an inner edge portion of the lower supporting member 23 toward an outer edge portion such that the bottom end portion 20*b* of the upward claw pole 43*b* is stably inserted therein. Also, the second position determining portions 232 are a pair of rectangular-shaped concave portions formed at an inner edge portion and an outer edge portion of the lower supporting member 23 such that the top end portions 20b on both sides of the downward claw pole 43a to are stably inserted therein.

As shown in FIG. 14, in an embodiment, a depth of the first position determining portion 231 is less than a height of the bottom end portion 20b (refer to FIG. 12) of the upward claw pole 43b. Accordingly, when the upward claw pole 43b is inserted in the first position determining portion 231, an upward side 20U of the bottom end portion 20b of the upward claw pole 43b is positioned above the opposite side X of the lower supporting member 23.

Figure 15:
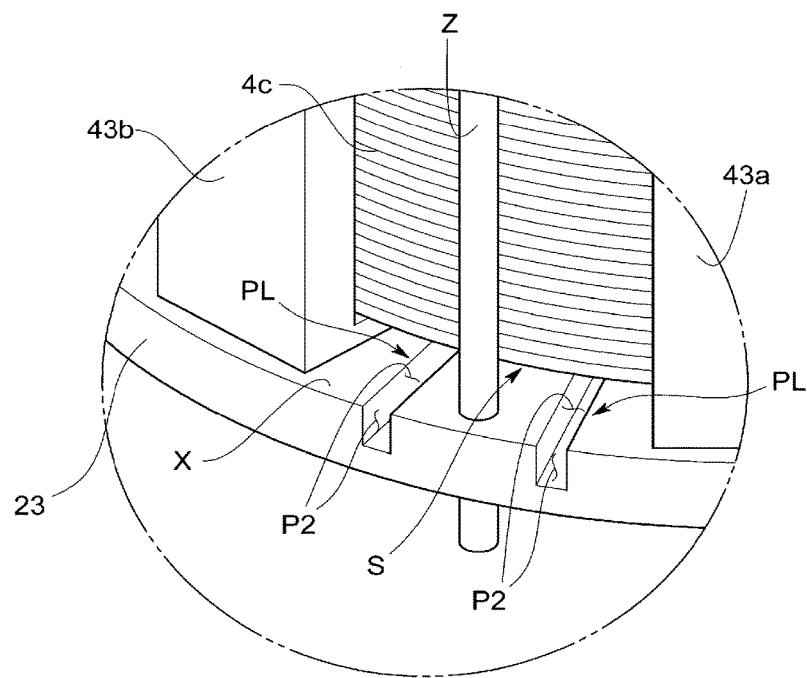
FIG. 15 is a perspective view mimetically illustrating a connecting path of the motor in accordance with an embodiment of the disclosure.
Figure 15:
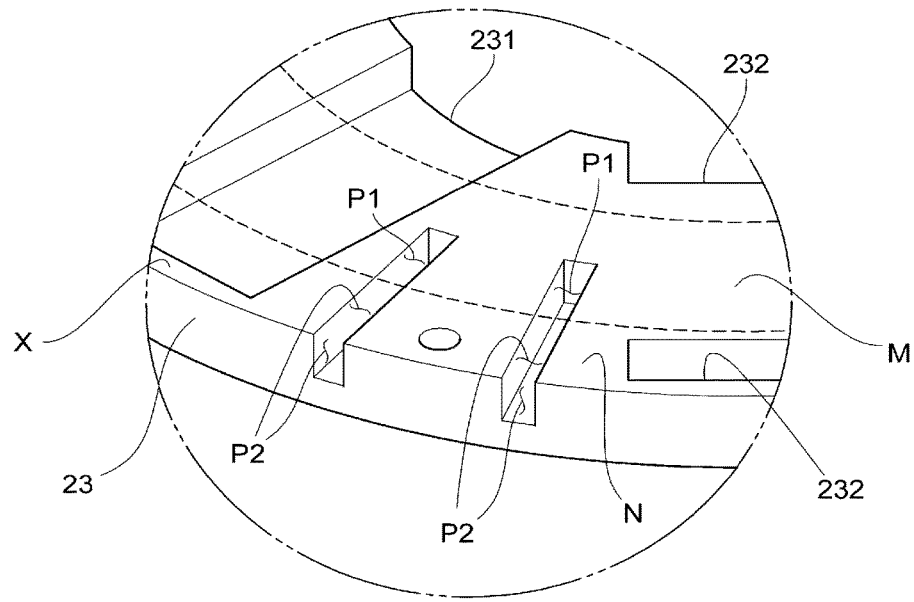

As shown in an upper portion of FIG. 15, due to the configuration described above, the coil 4c inserted between the lower supporting member 23 and the upper supporting member 24 (refer to FIG. 11) is in contact with the upward claw poles 43b and the downward claw poles 43a, and air layers S are formed between the coil 4c and the lower supporting member 23 and between the coil 4c and the upper supporting member 24.

However, as shown in FIG. 15, the lower supporting member 23 and the upper supporting member 24 in accordance with one embodiment of the disclosure include a first opening P1 formed at an opposite portion M (hereinafter, referred to as a coil opposite portion M) opposite to the coil 4c, a second opening P2 formed at a portion N (hereinafter, referred to as a coil non-opposite portion N) which is not opposite to the coil 4c, and a connecting path PL which connects the first opening P1 with the second opening P2.

As described above, the lower supporting member 23 and the upper supporting member 24 form the same shapes. Hereinafter, the connecting path PL and the like formed at the lower supporting member 23 will be described.

The first opening P1 is open toward the air layer S formed between the lower supporting member 23 and the coil 4c, and the second opening P2 is open toward a space different from the air layer S. That is, the connecting path PL connects the air layer S with a space separate from the air layer S.

Here, the connecting path PL is a concave groove formed from the coil opposite portion M toward the coil non-opposite portion N of the lower supporting member 23. The concave groove, which is the connecting path PL, extends from the coil opposite portion M toward an outside in a diametric direction to the outer edge of the lower supporting member 23. In one embodiment, a plurality of such connecting paths PL are radially formed.

As shown in the upper portion of FIG. 15, the second opening P2 in accordance with one embodiment of the disclosure is formed throughout an outside of the coil opposite portion M in the opposite side X of the lower supporting member 23 opposite to the upper supporting member 24 and a lateral circumferential surface of the lower supporting member 23.

Meanwhile, as shown in FIG. 13, in one embodiment of the disclosure, a plurality of connecting paths PL are formed alternately between the first position determining portion 231 and the second position determining portion 232 that are adjacent to each other. However, positions and number of the connecting paths PL may be adequately changed.

Figure 16:
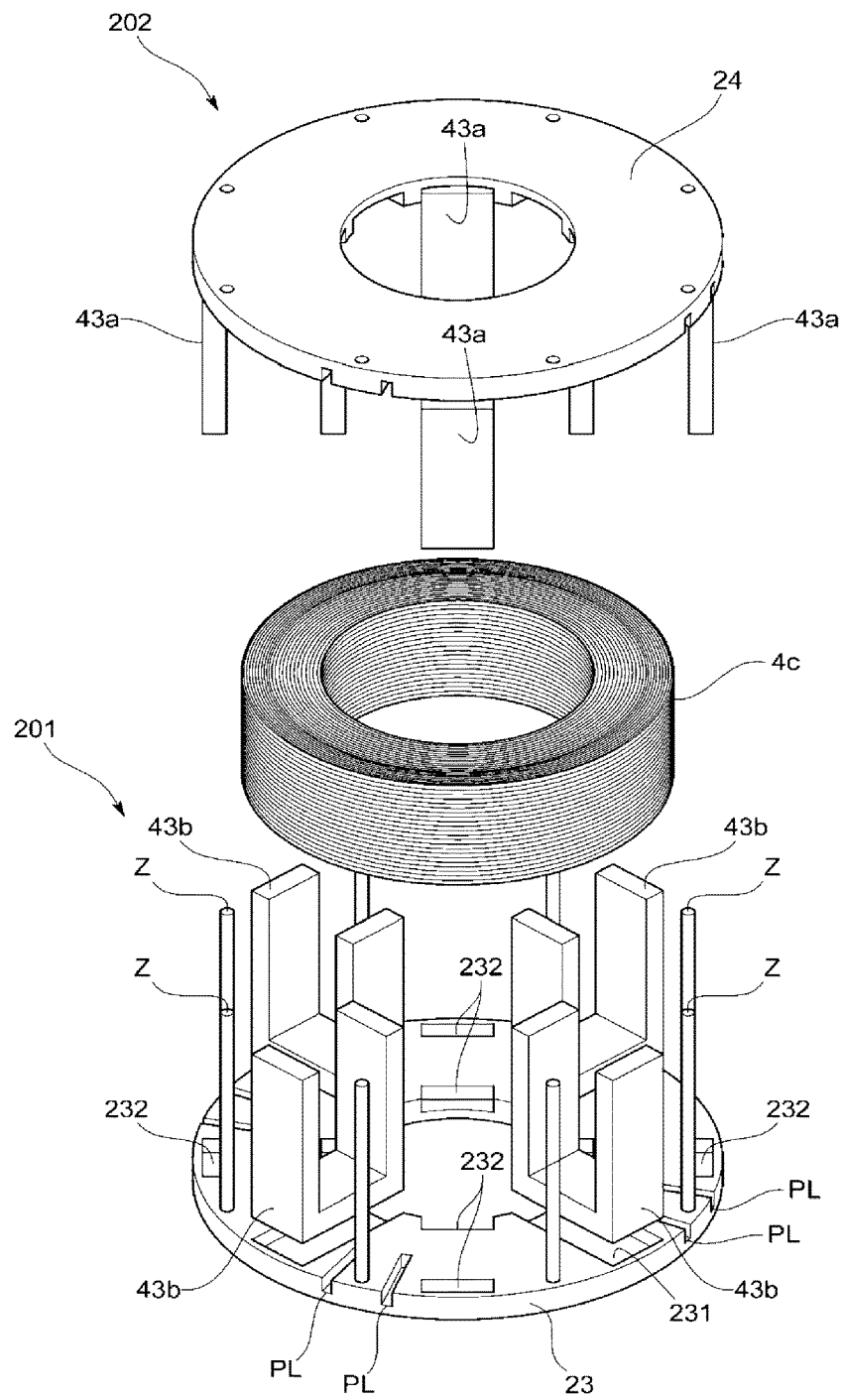
FIG. 16 is an exploded perspective view mimetically illustrating a stator of the motor in accordance with an embodiment of the disclosure.

Here, a method of assembling the motor 100 in accordance with one embodiment of the disclosure will be described briefly with reference to FIG. 16.

First, a lower stator element 201 is formed by inserting the plurality of upward claw poles 43b into the first position determining portions 231 of the lower supporting member 23, and an upper stator element 202 is formed by inserting the plurality of downward claw poles 43a into the first position determining portions 231 of the upper supporting member 24.

Next, the coil 4c is inserted into the lower stator element 201 and the upper stator element 202, and the top end portions 20t of the upward claw poles 43b are inserted into the second position determining portions 232 of the upper supporting member 24 such that the top end portions 20t of the downward claw poles 43a are inserted into the second position determining portions 232 of the lower supporting member 23.

Also, when the rotor 10 is disposed in the stator 20, the top and bottom of the stator 20 are fixed using fixing members Z such as bolts formed with, for example, a resin material which is an insulator. Meanwhile, the fixing members Z may be screws, nuts, washers, or the like formed with a resin material which is an insulator in addition to bolts.

According to the motor 100 in accordance with one embodiment of the disclosure configured as described above, since the lower supporting member 23 and the upper supporting member 24 include the plurality of connecting paths PL which extend from the coil opposite portion M to the coil non-opposite portion N, the coil 4c may be cooled using air which flows through the connecting paths PL.

Also, since heat of the coil 4c is dissipated in the air layers S formed between the coil 4c and the lower supporting member 23 and between the coil 4c and the upper supporting member 24 and the connecting paths PL are connected to the air layers S, an enough heat dissipating space of the coil 4c may be provided.

Also, since the concave grooves PL are formed at the lower supporting member 23 and the upper supporting member 24, it is possible for the coil 4c to be cooled without separately installing a heat dissipation member, a fan, increasing manufacturing costs, and increasing a size of the motor.

Also, since the lower supporting member 23, the upper supporting member 24, and the fixing members Z are formed as insulators, an amount of magnetic material for forming the motor 100 may be reduced. Accordingly, since a magnetic circuit is not formed at an insulator, core loss such as hysteresis loss, eddy current loss, or the like may be noticeably reduced, thereby providing high efficiency of the motor 100.

However, since the plurality of claw poles 43b and 43a and the supporting members 23 and 24 are separately configured, assembling the motor 100 may be considered to be difficult. However, since each of the supporting members 23 and 24 include the plurality of position determining portions 231 and 232 into which the plurality of claw poles 43b and 43a are inserted and which determine the positions of the claw poles 43b and 43a, the plurality of claw poles 43b and 43a may be simply attached to each of the supporting members 23 and 24.

Also, since the coil 4c has a shape formed by pre-adhering the lead wire L in a cylindrical shape, the coil 4c may be simply attached to the supporting members 23 and 24 to which the plurality of claw poles 43b and 43a are attached.

As described above, the motor 100 in accordance with one embodiment of the disclosure does not complicate a structure or decrease productivity.

Meanwhile, the disclosure is not limited to the embodiment described above.

Figure 17:
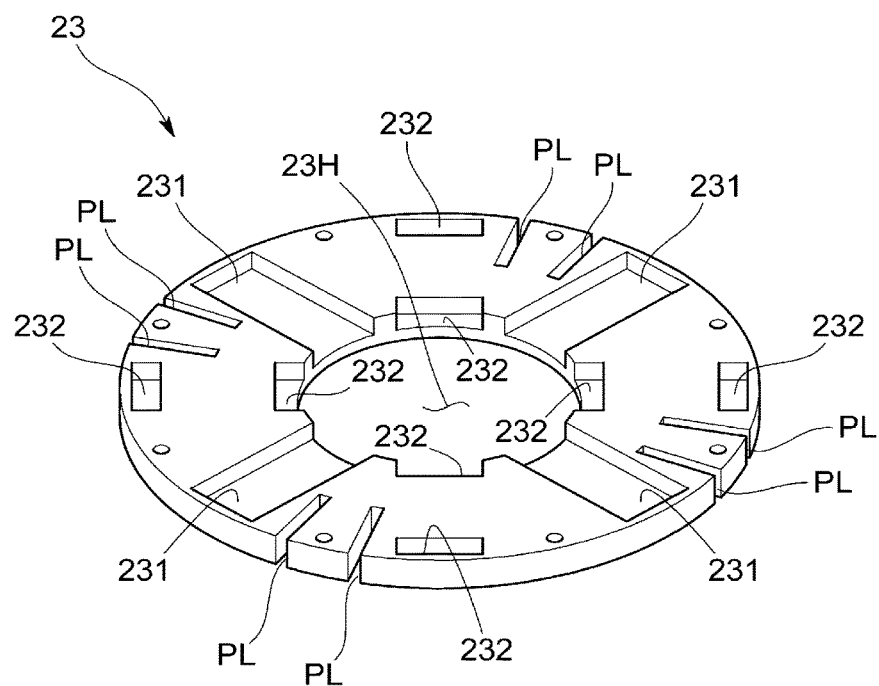
FIG. 17 is a perspective view mimetically illustrating the supporting member of the motor in accordance with an embodiment of the disclosure.
Figure 17:
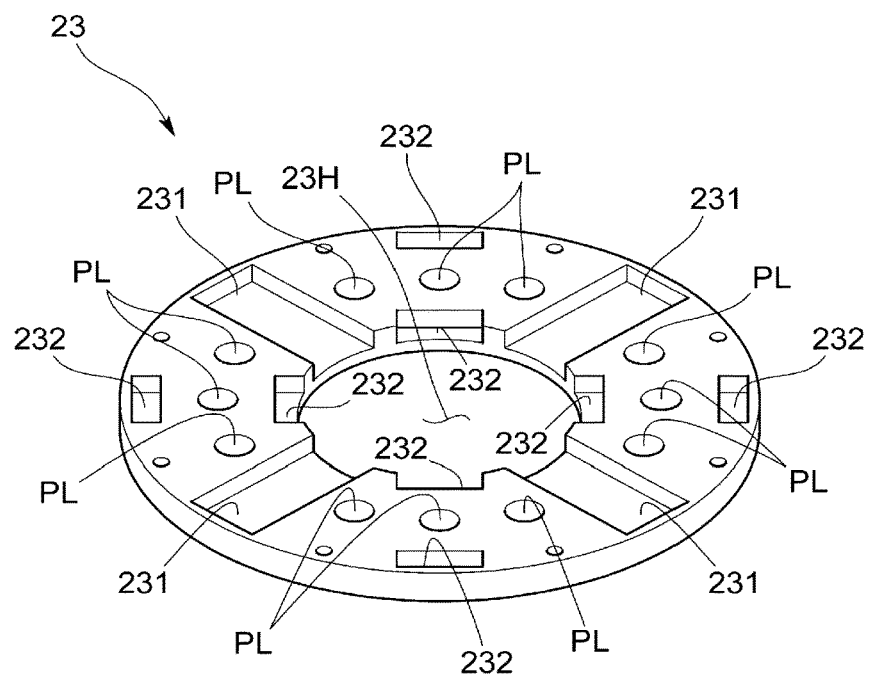

Although the connecting paths PL in accordance with the embodiment have a concave shape, the connecting path PL, for example, as shown in an upper portion of FIG. 17, may be a slit formed throughout an opposite portion of the upper supporting member 24 opposite to the coil 4c and a portion that is not opposite to the coil 4c.

Also, as shown in a lower portion of FIG. 17, the connecting path PL may be a through hole which passes through the opposite portion of the lower supporting member 23 (or the upper supporting member 24) opposite to the coil 4c in a thickness direction thereof.

Figure 18:
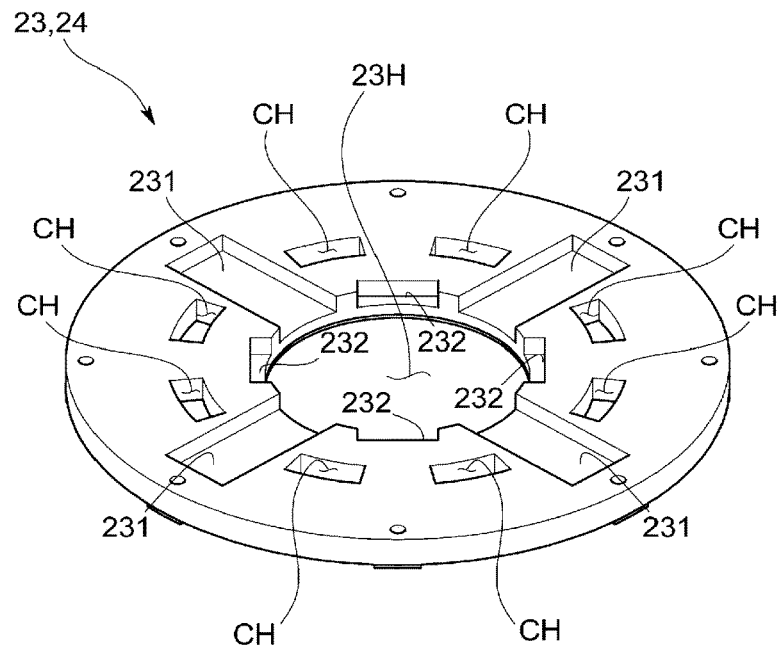
FIG. 18 is a perspective view mimetically illustrating a hole for cooling a coil in accordance with a modified example of a first embodiment.
Figure 18:
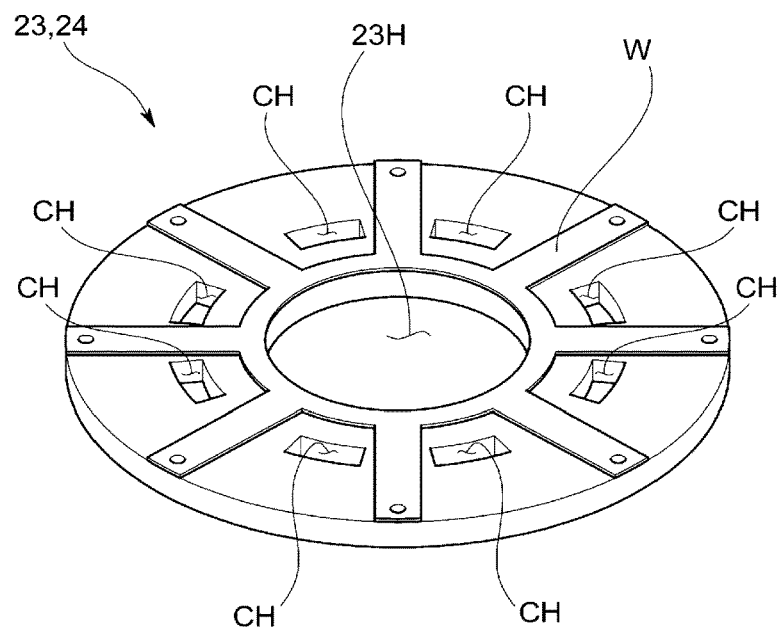

Also, as shown in an upper portion of FIG. 18, the lower supporting member 23 or the upper supporting member 24 may include coil cooling through holes CH formed at the opposite portion opposite to the coil 4c.

Compared with the connecting paths PL in accordance with the embodiment described above configured to connect the first opening P1 formed at the opposite portion M opposite the coil 4c and the second opening P2 formed at the non-opposite portion N not opposite to the coil 4c, all of the coil cooling through hole CH herein are formed at a portion opposite to the coil 4c.

Herein, to increase cooling efficiency of the coil 4c, a plurality of such coil cooling through holes CH are intermittently formed along the circumferential direction.

Meanwhile, as described above, mechanical strength of the lower supporting member 23 or the upper supporting member 24 decreasing due to the plurality of coil cooling through hole CH and being damaged while being assembled are concerns.

Accordingly, as shown in a lower portion of FIG. 18, reinforcing portions are formed at the lower supporting member 23 and the upper supporting member 24. A reinforcing portion W is formed between adjacent coil cooling through holes CH and is formed of a nonmagnetic material such as a resin or the like integrated with the lower supporting member 23 or the upper supporting member 24. Meanwhile, the reinforcing portion W may be a separate member from the lower supporting member 23 or the upper supporting member 24.

In the configuration described above, ambient air may come into direct contact with the coil 4c to cool the coil with high efficiency, and the reinforcing portion W may provide mechanical strength of the lower supporting member 23 or the upper supporting member 24.

Also, although both the lower supporting member 23 and the upper supporting member 24 have the connecting paths PL in the embodiment, the connecting paths PL may be formed at only one of the lower supporting member 23 and the upper supporting member 24.

Also, although the connecting paths PL in accordance with the embodiment extend from the portion opposite to the coil 4c to the outside in the diametric direction, the connecting paths PL may extend inward in the diametric direction or may not have a linear shape.

Also, since decreasing the mechanical strength of each of the supporting members 23 and 24 due to the connecting paths PL is a concern as compared with a case in which the connecting paths PL are not formed, the supporting members 23 and 24 may be formed of an insulating material with strength higher than a resin. For example, a strength increasing material such as glass fibers or the like may be added.

Next, a motor in accordance with another embodiment will be described.

Since a feature of the motor in accordance with this embodiment is claw poles and other components are identical to the embodiment described above, the claw poles corresponding to the feature will be described hereinafter in detail.

Like the embodiment described above, in this embodiment, the upward claw poles 43b are formed in the same shape and the downward claw poles 43a are formed in the same shape.

Hereinafter, the upward claw pole 43b will be described as a representative example.

Figure 19:
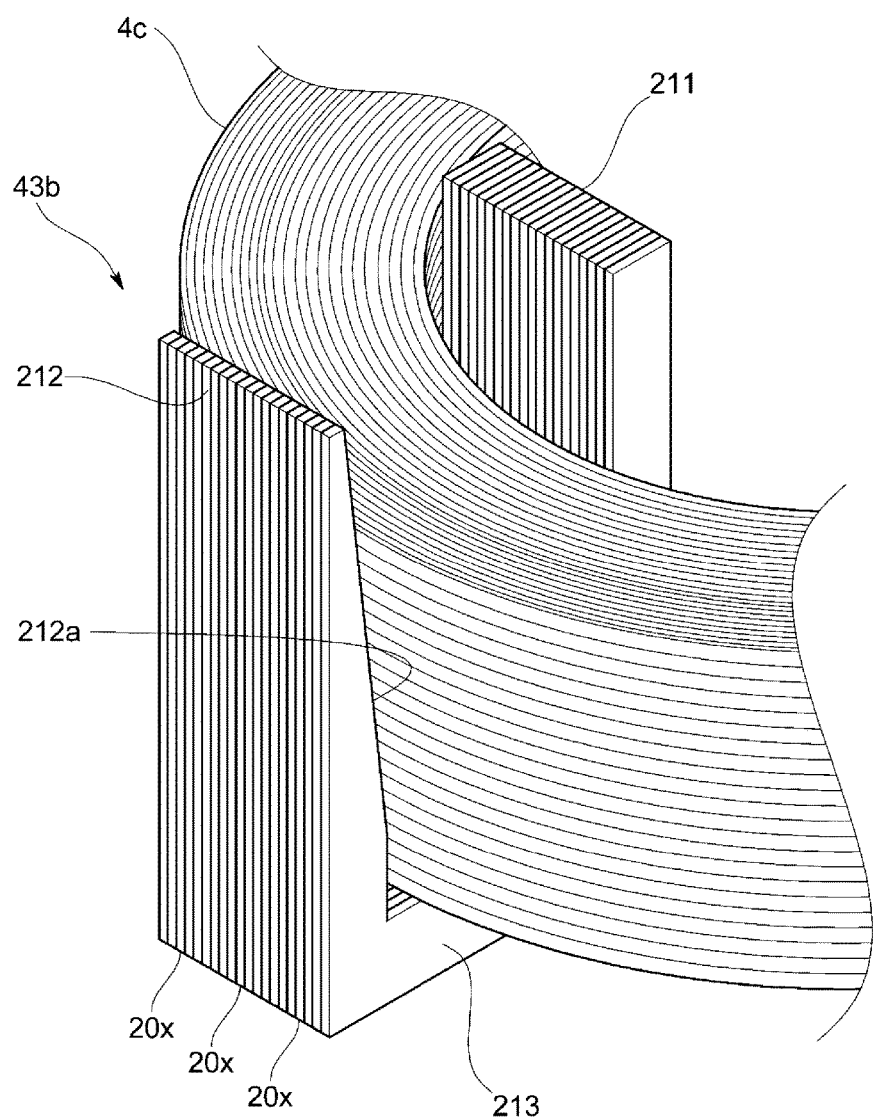
FIG. 19 is a perspective view mimetically illustrating a coil and the claw pole of the motor in accordance with an embodiment of the disclosure.
Figure 20:
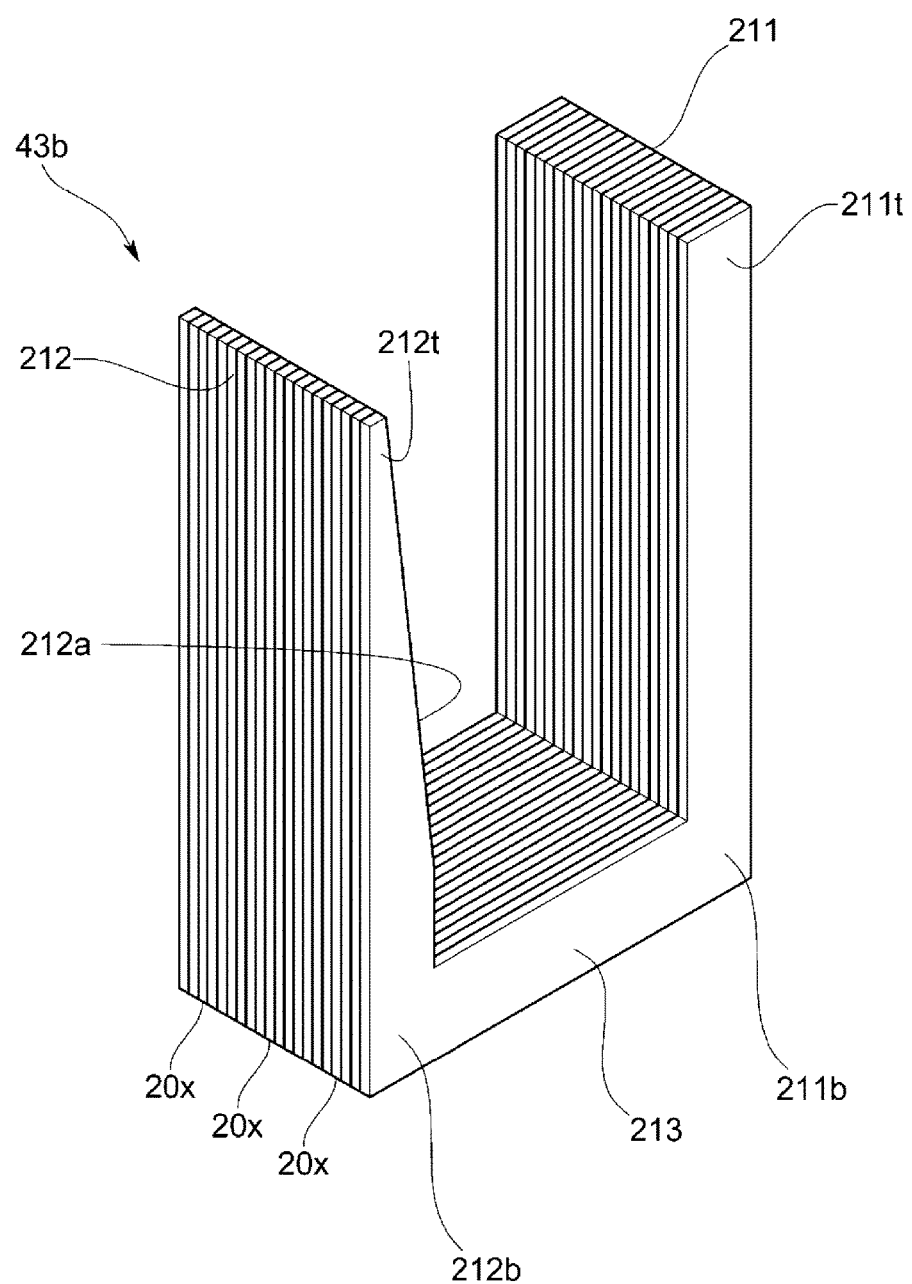
FIG. 20 is a perspective view mimetically illustrating the claw pole of the motor in accordance with an embodiment of the disclosure.

As shown in FIGS. 19 and 20, the upward claw pole 43b may include a first magnetic pole element 211 opposite to the rotor 10, a second magnetic pole element 212 which accommodates the coil 4c interposed between the second magnetic pole element 212 and the first magnetic pole element 211, and a third magnetic pole element 213 interposed between the first magnetic pole element 211 and the second magnetic pole element 212 and magnetically connected to the magnetic pole elements 211 and 212.

The upward claw pole 43b is formed by stacking the plurality of steel sheets 20x in the circumferential direction of the stator element 3. Herein, the steel sheet 20x is a single shape formed by integrating the first magnetic pole element 211, the second magnetic pole element 212, and the third magnetic pole element 213.

In more detail, the third magnetic pole element 213 is formed between a bottom end portion 211b of the first magnetic pole element 211 and a bottom end portion 212b of the second magnetic pole element 212, and the upward claw pole 43b in accordance with one embodiment is formed in a u shape when viewed in the circumferential direction of the stator element 3.

Also, the upward claw pole 43b in accordance with one embodiment is configured such that a top end portion 212t of the second magnetic pole element 212 is a resistor of magnetic flux and the magnetic flux is concentrated more on the bottom end portion 212b than the top end portion 212t. In the upward claw pole 43b, the second magnetic pole element 212 formed opposite to the rotor 10 is configured such that the top end portion 212t has a thickness thinner than that of the bottom end portion 212b. That is, a shape of the top end portion 212t of the second magnetic pole element 212 is embodied as a resistor at which resistance of magnetic flux increases, thereby further concentrating the magnetic flux. Meanwhile, since the embodiment concentrates the magnetic flux on the bottom end portion 212b more than on the top end portion 212t, the thickness of the top end portion 212t is smaller than the thickness of the bottom end portion 212b, in addition, for example, the top end portion 212t may be formed as a member that has more difficulty passing through the magnetic flux than the bottom end portion 212b or the number of steel sheets 20x of the top end portion 212t may be less than that of the bottom end portion 212b.

Meanwhile, the thickness stated herein is a length in the diametric direction when the motor 100 is assembled, that is, when the upward claw pole 43b is supported by the lower supporting member 23.

In detail, the second magnetic pole element 212 has a thickness which is uniform from a bottom thereof to a certain height and gradually narrows from the certain height to a top end surface, and the top end surface of the second magnetic pole element 212 is at the same level as that of the first magnetic pole element 211.

Here, the coil opposite side 212a of the second magnetic pole element 212 opposite to the coil 4c inclines to gradually recede from the coil 4c from the bottom end portion 212b toward the top end portion 212t. Due to this configuration, a space between the second magnetic pole element 212 and the coil 4c may increase and magnetic flux may be prevented from leaking from the second magnetic pole element 212 into the coil 4c.

Meanwhile, the first magnetic pole element 211 in accordance with one embodiment is configured to have a thickness which is approximately uniform throughout the bottom end portion 211b and the top end portion 211t.

Figure 21:
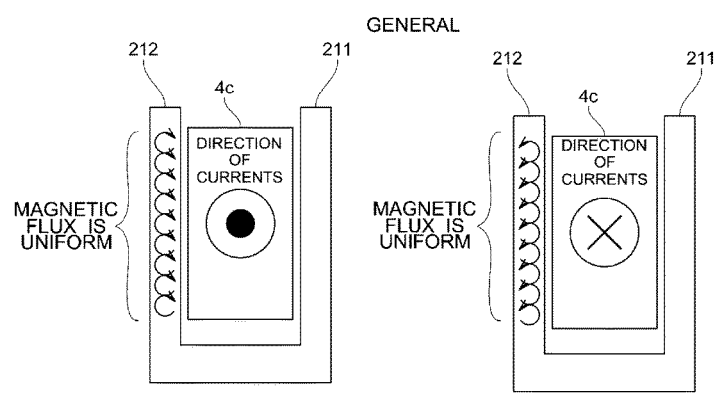
FIG. 21 is a mimetic view comparing the claw pole of the motor in accordance with an embodiment of the disclosure with a general claw pole.
Figure 21:
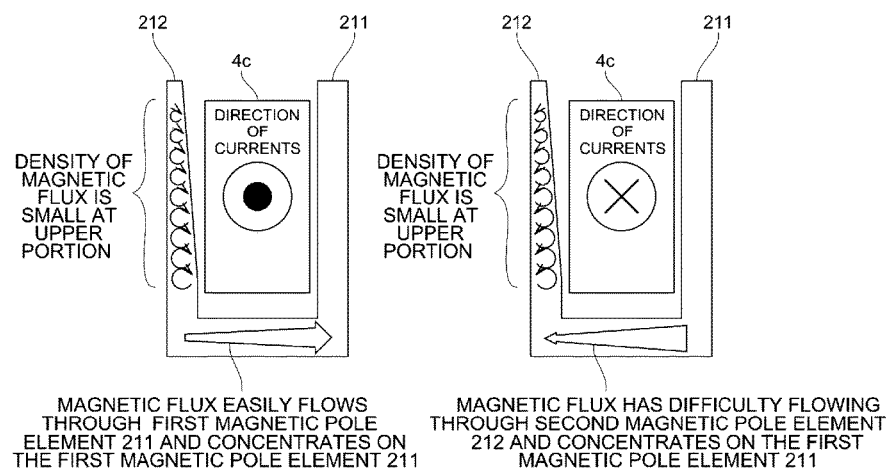

According to the motor 100 configured as described above, since the second magnetic pole element 212 positioned opposite to the rotor 10 is configured such that the thickness of the top end portion 212t is thinner than the thickness of the bottom end portion 212b, as shown in FIG. 21, the magnetic flux may be concentrated on the first magnetic pole element 211 more than on the second magnetic pole element 212, and efficiency of the motor may increase to be more than a general motor when currents which flow through the coil 4c are at the same level.

Also, since the thickness of the second magnetic pole element 212 is formed to be thinner at the top end portion 212t than the bottom end portion 212b, a magnetic flux amount of all second magnetic pole elements 212 is reduced in comparison to a case in which the thickness is uniform throughout the bottom end portion 212b and the top end portion 212t. Accordingly, since an attractive force which occurs between each of the claw poles 43a and 43b and the rotor 10 decreases, cogging torque may be reduced.

Also, since the upward claw pole 43b and the downward claw pole 43a have the same shape and each of the claw poles 43b and 43a is formed with the steel sheet 20x in a single shape, an assembling operation may be facilitated and a manufacturing process may be simplified.

Meanwhile, the disclosure is not limited to the embodiment described above.

For example, the upward claw pole 43b in accordance with the embodiment is formed by integrating the first magnetic pole element 211, the second magnetic pole element 212, and the third magnetic pole element 213, but may be configured as a plurality of separate magnetic pole elements.

Figure 22:
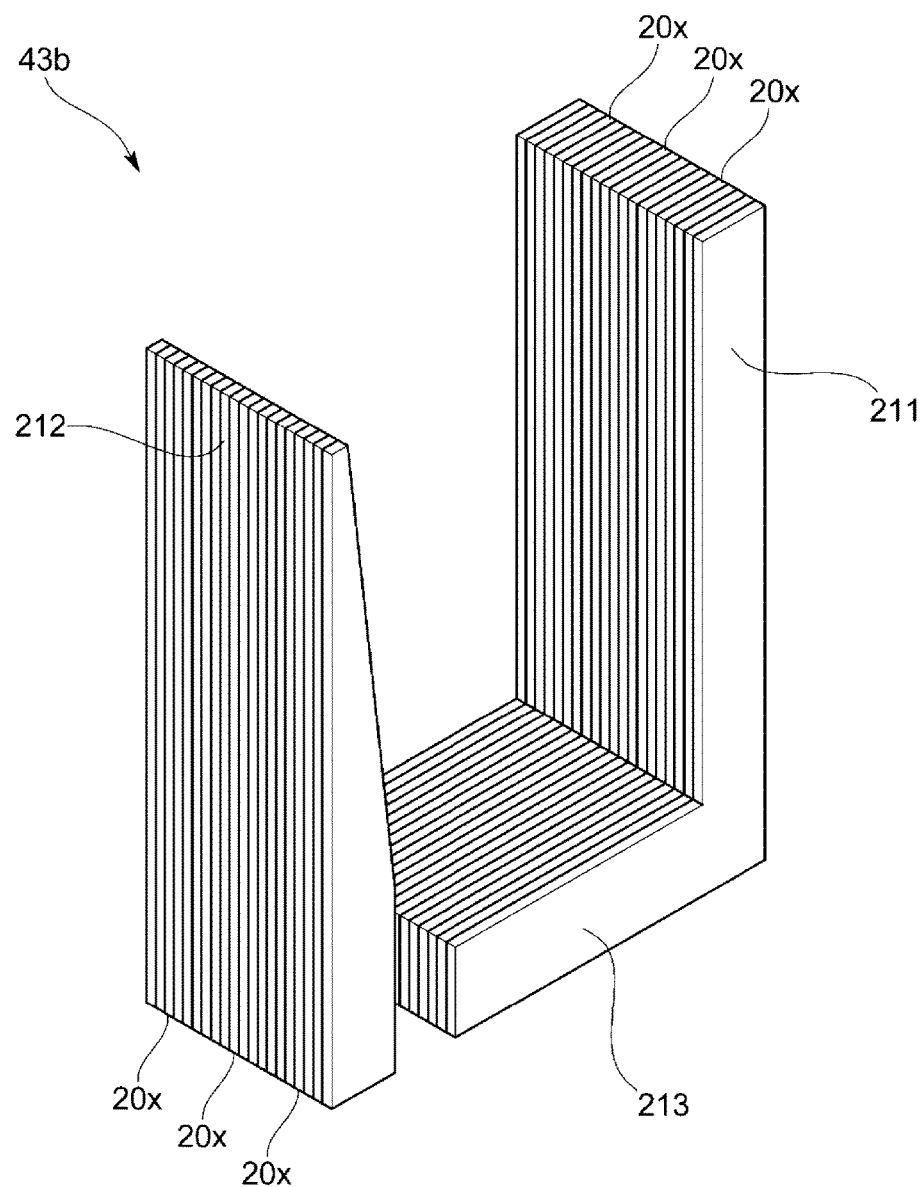
FIG. 22 is a perspective view illustrating the claw pole of the motor in accordance with an embodiment of the disclosure.

In detail, as shown in FIG. 22, the first magnetic pole element 211 may be formed by stacking the steel sheets 20x in an L shape (that is, by integrating the first magnetic pole element 211 and the third magnetic pole element 213) and the second magnetic pole element 212 may be formed by stacking the steel sheets 20x in a rectangular shape (a stripe-like shape). On the other hand, the first magnetic pole element 211 may be formed by stacking the steel sheets 20x in the rectangular shape (the stripe-like shape) and the second magnetic pole element 212 may be formed by stacking the steel sheets 20x in the L shape.

Figure 23:
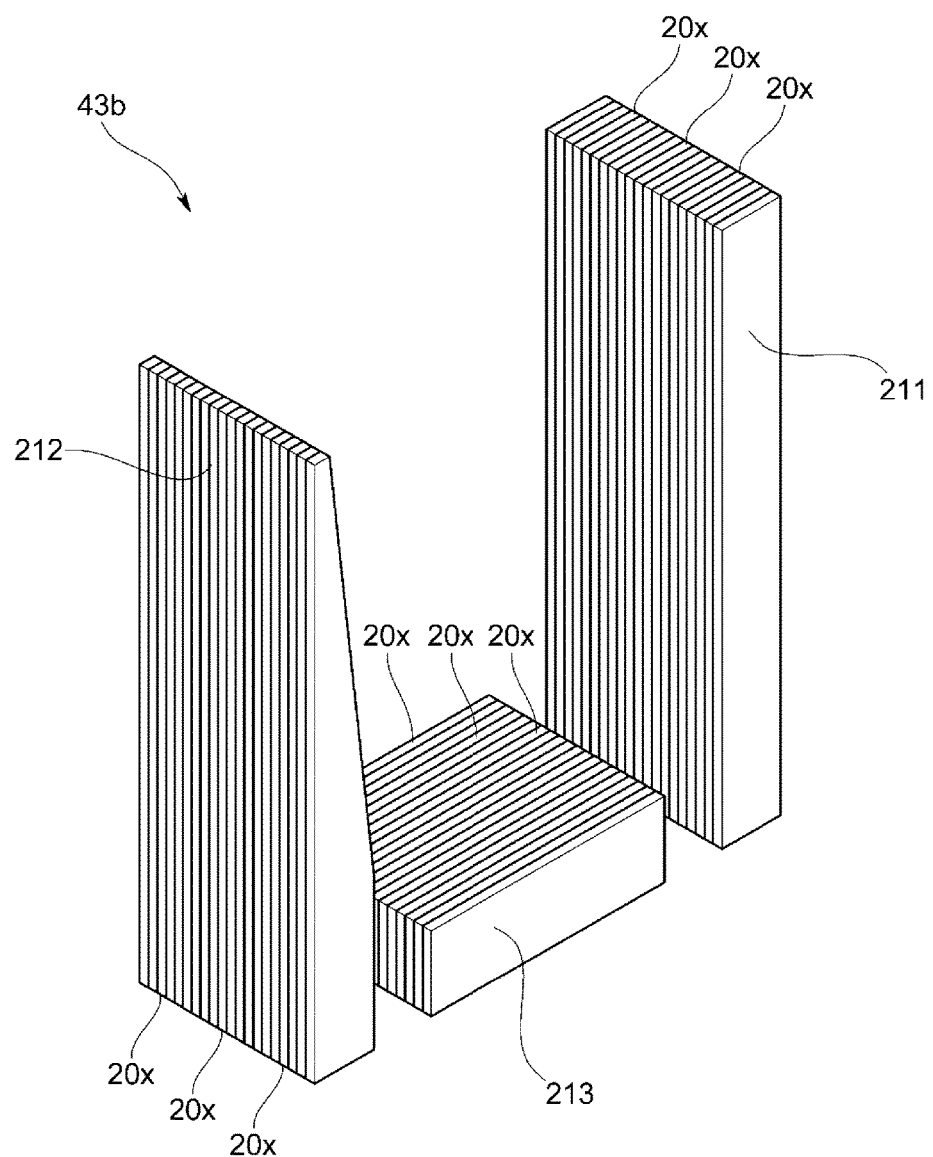
FIG. 23 is a perspective view illustrating the claw pole of the motor in accordance with an embodiment of the disclosure.

Also, as shown in FIG. 23, the first magnetic pole element 211, the second magnetic pole element 212, and the third magnetic pole element 213 may be separate members, and the first magnetic pole element 211 and the third magnetic pole element 213 may be formed by stacking the steel sheets 20x in the rectangular shape (the stripe-like shape).

In this configuration, a yield rate of manufacturing the claw poles 43b and 43a may be increased.

Figure 24:
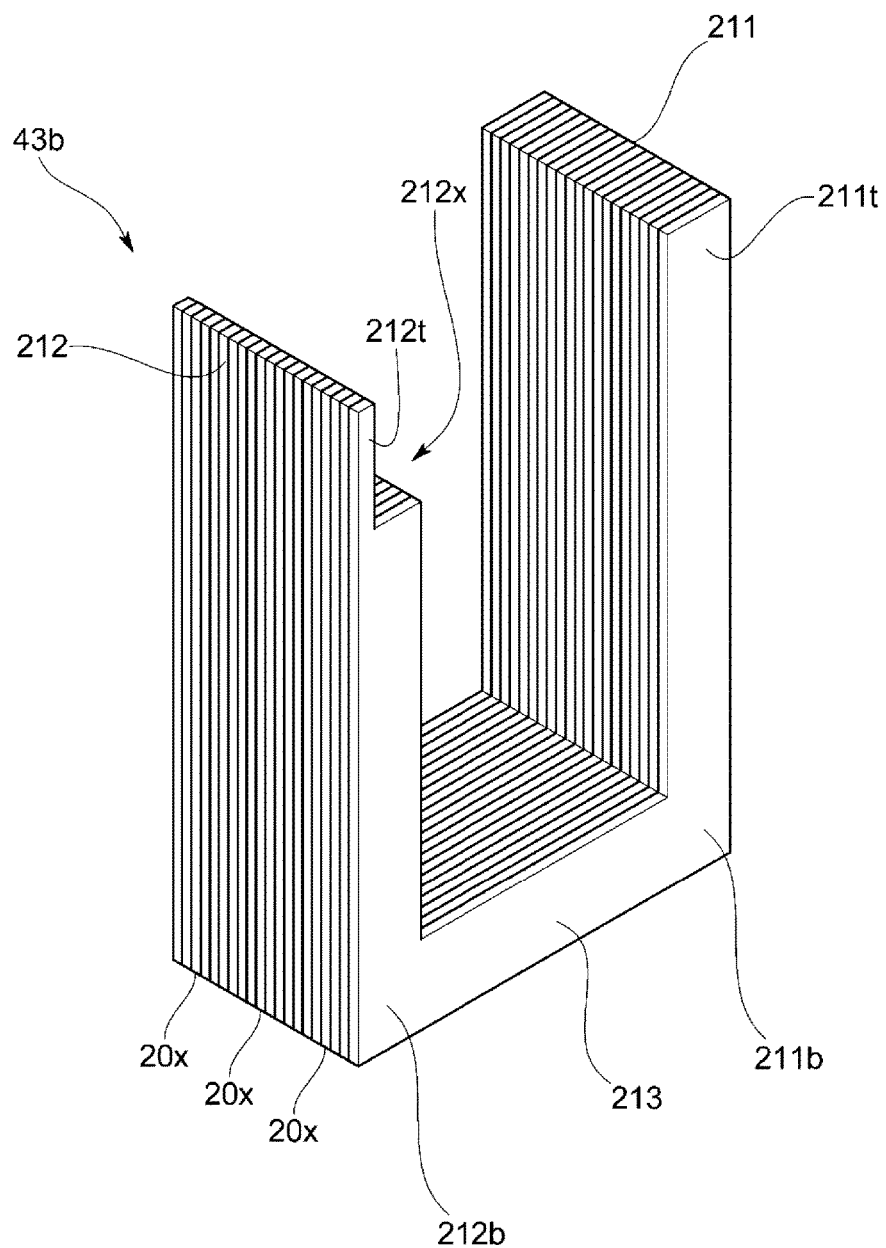
FIG. 24 is a perspective view illustrating the claw pole of the motor in accordance with an embodiment of the disclosure.

Also, in the embodiment, the second magnetic pole element 212 is configured to have a thickness which is uniform from a bottom surface thereof to a certain height and gradually narrows from the certain height to the top end surface. As shown in FIG. 24, the second magnetic pole element 212 may include a stepped portion 212x in a stepped shape formed at the top end portion 212t in a rectangular shape in a thickness direction thereof.

Figure 25:
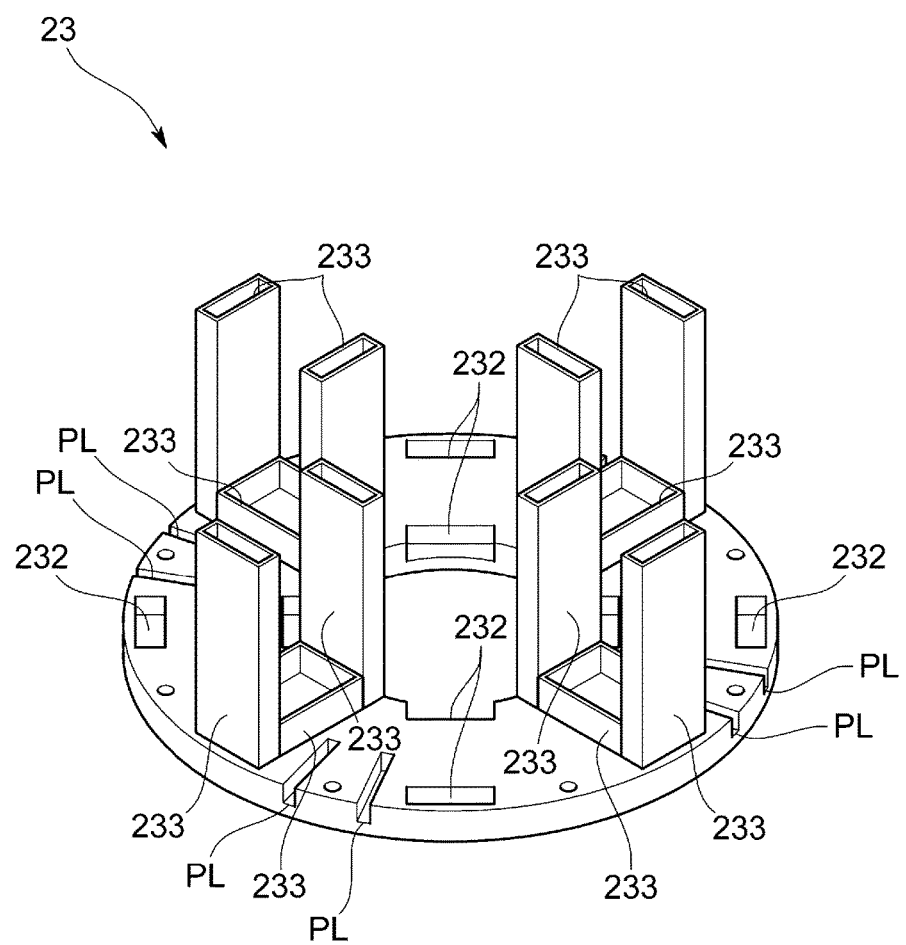
FIG. 25 is a perspective view illustrating the supporting member of the motor in accordance with an embodiment of the disclosure.

Also, as described above, when the claw poles 43b and 43a are formed as a plurality of separate magnetic pole elements as shown in FIG. 25, the supporting members 23 and 24 may include a plurality of position determining portions 233 in which the magnetic pole elements are inserted.

Also, the magnetic pole elements are pre-accommodated in the position determining portions 233 while being integrated therewith, thereby further simplifying assembling of the motor 100.

Also, in the embodiment, although the first magnetic pole element 211 is configured to have an approximately uniform thickness throughout the bottom end portion 211b and the top end portion 211t, the first magnetic pole element 211 may be configured to such that the thickness of the top end portion 211t is greater than the thickness of the bottom end portion 211b to further increase density of magnetic flux of the first magnetic pole element 211.

Next, a claw pole motor in accordance with the third embodiment of the disclosure will be described.

Meanwhile, members corresponding to the members described in a second embodiment will be referred to by the same reference numerals.

Figure 26:
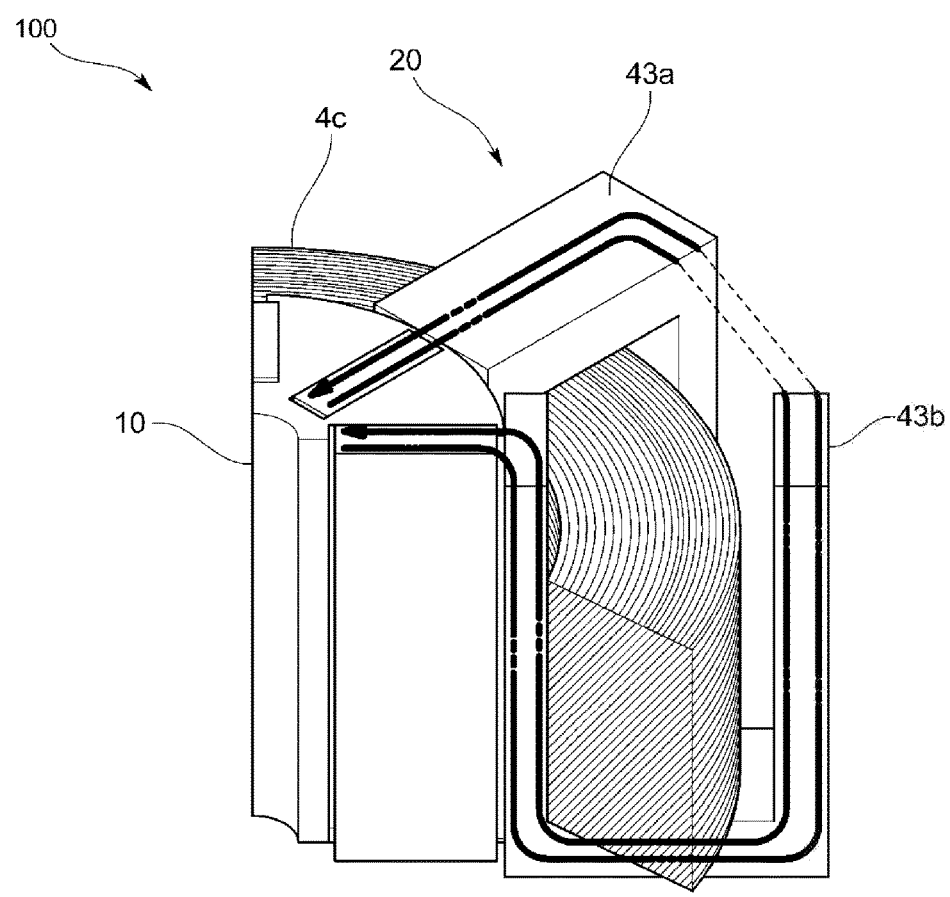
FIG. 26 is a mimetic diagram illustrating a flow of magnetic flux in a claw pole motor in accordance with a second embodiment.

Like the second embodiment, when a claw pole may include a first magnetic pole element disposed inside a coil and a second magnetic pole element disposed outside the coil such that the coil is inserted therebetween, since an outer circumference of the coil is larger than an inner circumference thereof, as shown in FIG. 26, a gap is formed between the second magnetic pole elements of adjacent claw poles along a circumferential direction. Accordingly, the gap leaks magnetic flux (a dotted line portion shown in FIG. 26).

The claw pole motor in accordance with the third embodiment is configured in consideration of the leakage of magnetic flux.

Figure 27:
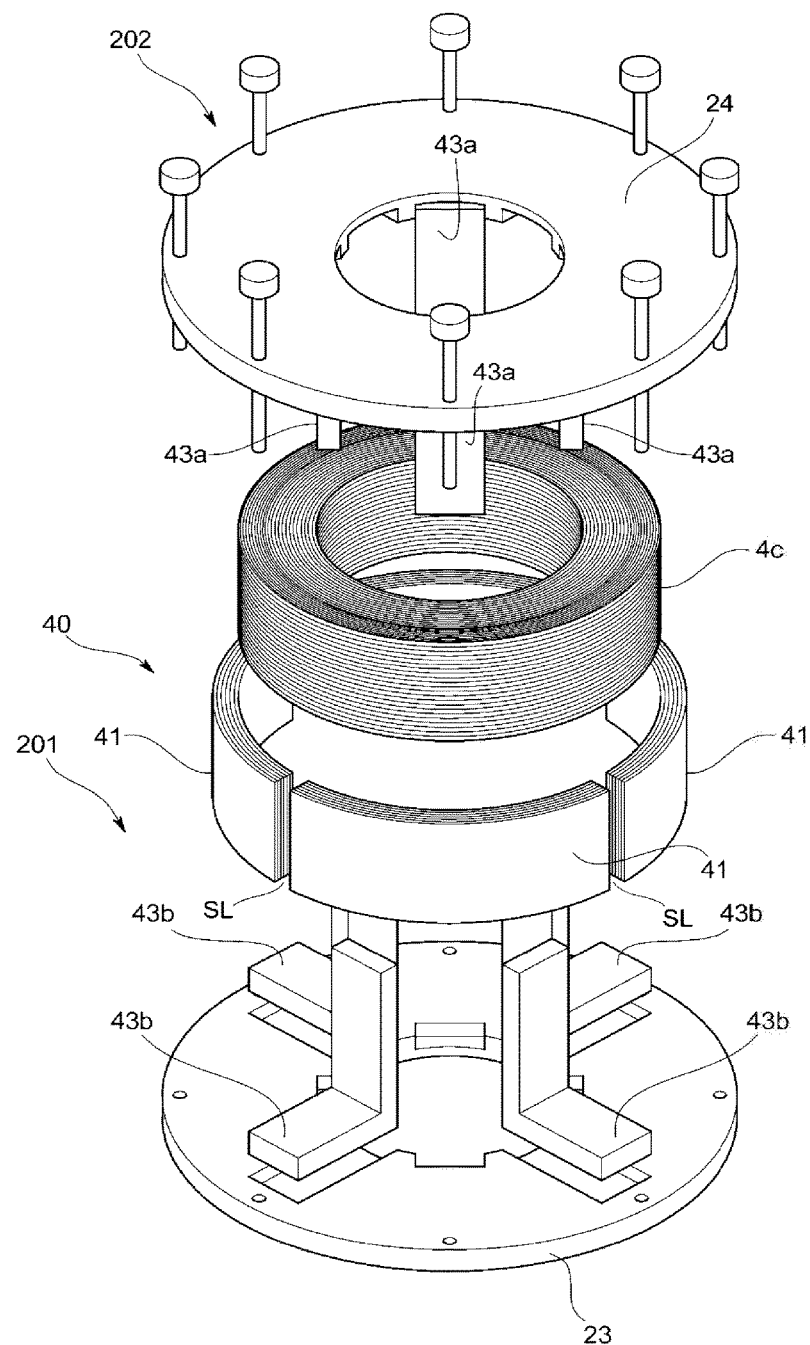
FIG. 27 is a perspective view of a claw pole motor in accordance with a third embodiment.
Figure 28:
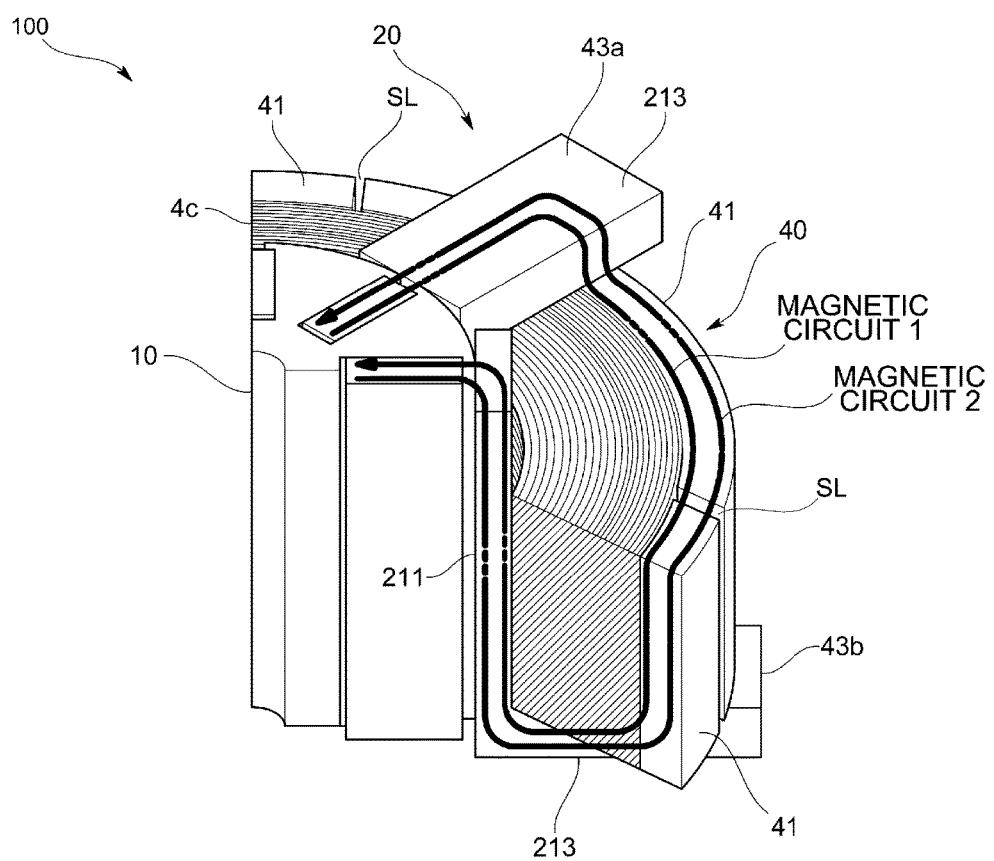
FIG. 28 is a perspective view mimetically illustrating a claw pole and a magnetic body in accordance with the third embodiment.

A claw pole motor 100 in accordance with the embodiment, for example, is used as a compressor which forms a cooling cycle, and as shown in FIGS. 27 and 28, may include a coil 4c, a stator 20 which may include a plurality of claw poles 43a and 43b formed along the circumferential direction, and a rotor 10 rotatably formed inside or outside the stator 20.

The stator 20, like the second embodiment, has a cylindrical shape in which the rotor 10 is rotatably formed in a through hole 20H vertically passing therethrough, and may include a plurality of downward claw poles 43a formed along the circumferential direction and a plurality of upward claw poles 43b formed along the circumferential direction.

In the embodiment, like the second embodiment, the upward claw poles 43b are formed in the same shape, the downward claw poles 43a are formed in the same shape, and the upward claw poles 43b and the downward claw poles 43a are symmetrical to each other.

Hereinafter, the upward claw poles 43b will be described as a representative example.

As shown in FIGS. 27 and 28, the upward claw pole 43b may include a first magnetic pole element 211 disposed inside the coil 4c and interposed between the rotor 10 and the coil 4c.

Although the upward claw pole 43b in accordance with the second embodiment is formed in a u shape when viewed in the circumferential direction, the upward claw pole 43b in accordance with the embodiment is formed in an L shape when viewed in the circumferential direction. That is, the upward claw pole 43b in accordance with the embodiment further may include a magnetic pole element magnetically connected to a bottom end portion of the first magnetic pole element 211 (hereinafter, referred to as a third magnetic pole element 213 to be matched with the second embodiment) and is disposed so as not to cover the outside of the coil 4c.

Meanwhile, the upward claw pole 43b, like the second embodiment, is formed by stacking a plurality of steel sheets in the circumferential direction, and may include the first magnetic pole element 211 and the third magnetic pole element 213 integrated using one type of shape at the steel sheets.

Also, as shown in FIGS. 27 and 28, the claw pole motor in accordance with the embodiment, further may include a magnetic body 40 which forms a magnetic circuit between the downward claw pole 43a and the upward claw pole 43b to induce magnetic flux which passes through one of the downward claw pole 43a and the upward claw pole 43b disposed outside the coil and adjacent in the circumferential direction to the other side.

Figure 29:
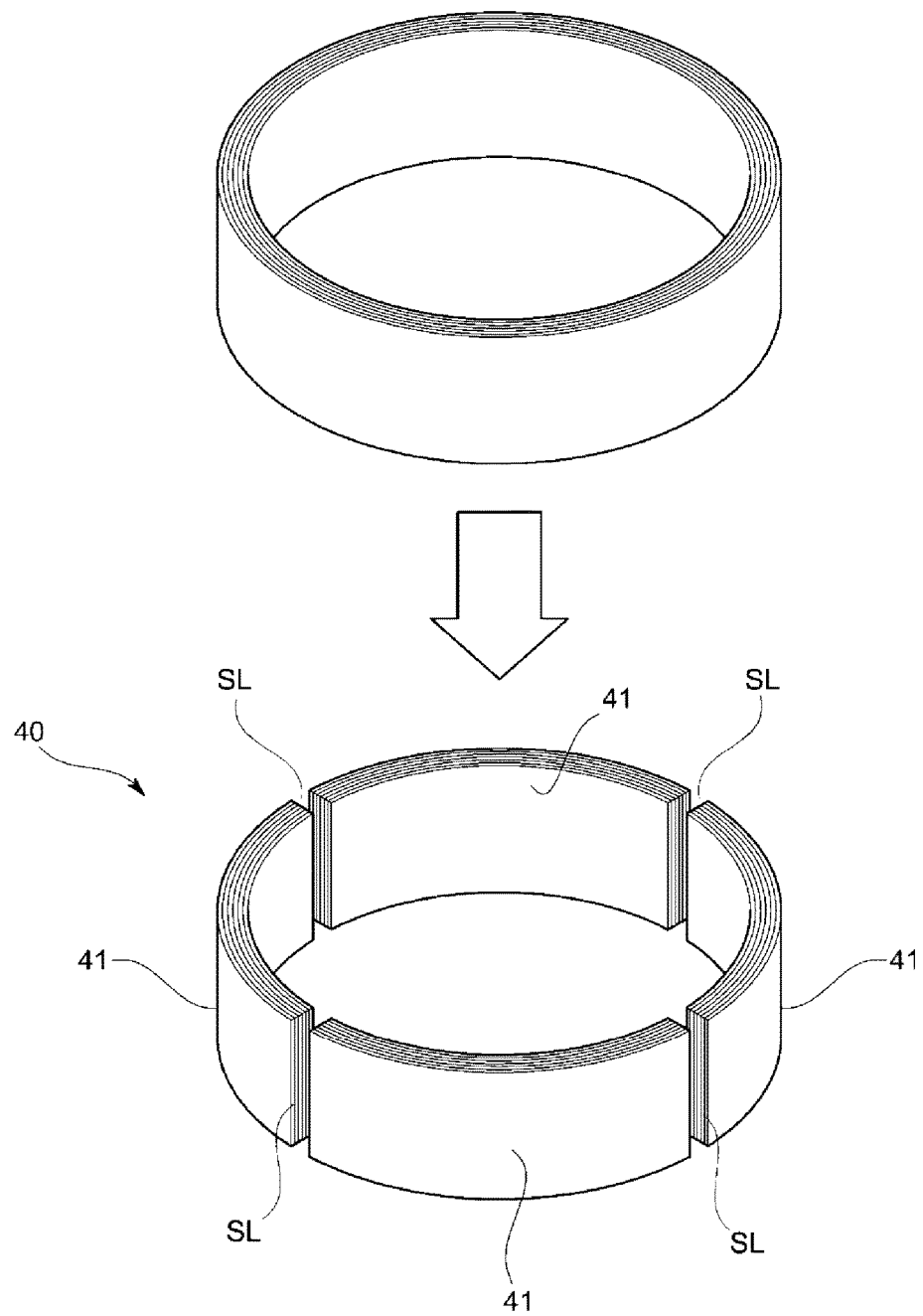
FIG. 29 is a perspective view mimetically illustrating the magnetic body in accordance with the third embodiment.

The magnetic body 40 is disposed to cover an outer circumferential surface of the coil 4c, and for example, may include steel sheets. In more detail, as shown in FIG. 29, the magnetic body 40 in accordance with the embodiment is formed, for example, by winding long electrical steel sheets and has a cylindrical shape with an internal diameter greater than an external diameter of the coil 4c. An initially wound portion and a finally wound portion are welded and treated using an annealing process for suppressing spring-back. Also, the electrical steel sheets are wound in a cylindrical shape and then treated with an impregnating process, thereby adhering gaps among the electrical steel sheets wound in the cylindrical shape. Also, as shown in FIG. 28, slits SL along an axial direction are formed at a plurality of random portions in the circumferential direction to reduce core loss caused by an eddy current. That is, the magnetic body 40 may include a plurality of divided magnetic bodies 41 divided along the circumferential direction.

In the embodiment, a height of the magnetic body 40 in the axial direction is greater than a height of the coil 4c in the axial direction. However, the height of the magnetic body 40 may be adequately changed.

According to the claw pole motor 100 configured as described above, since the magnetic body 40 is installed between the downward claw pole 43a and the upward claw pole 43b which are adjacent to each other along the circumferential direction and the magnetic flux passing through one of the claw poles 43a and 43b is induced to the other side, it is possible to suppress a leakage of the magnetic flux between the downward claw pole 43a and the upward claw pole 43b. Accordingly, even when necessary torque is relatively great, it is possible to prevent magnetic saturation and to provide the necessary torque.

In more detail, as shown in FIG. 28, a magnetic circuit 1 which passes through the rotor 10 in the order of the downward claw pole 43a, the magnetic body 40, and the upward claw pole 43b and then toward the rotor 10 again, and a magnetic circuit 2 which passes through the rotor 10 in reverse order of the upward claw pole 43b, the magnetic body 40, and the downward claw pole 43a and then toward the rotor 10 again are formed according to a direction of currents flowing through the coil 4c.

According to the claw pole motor 100 in accordance with the embodiment, since it is possible to suppress a leakage of magnetic flux in the magnetic circuit 1 and the magnetic circuit 2 in comparison to a case in which the claw pole motor 100 is configured without using the magnetic body 40 (for example, a configuration shown in FIG. 26), induced voltage may be increased by about 1.55 times and available torque may be increased by about 1.55 times.

Meanwhile, the disclosure is not limited to the embodiment.

Figure 30:
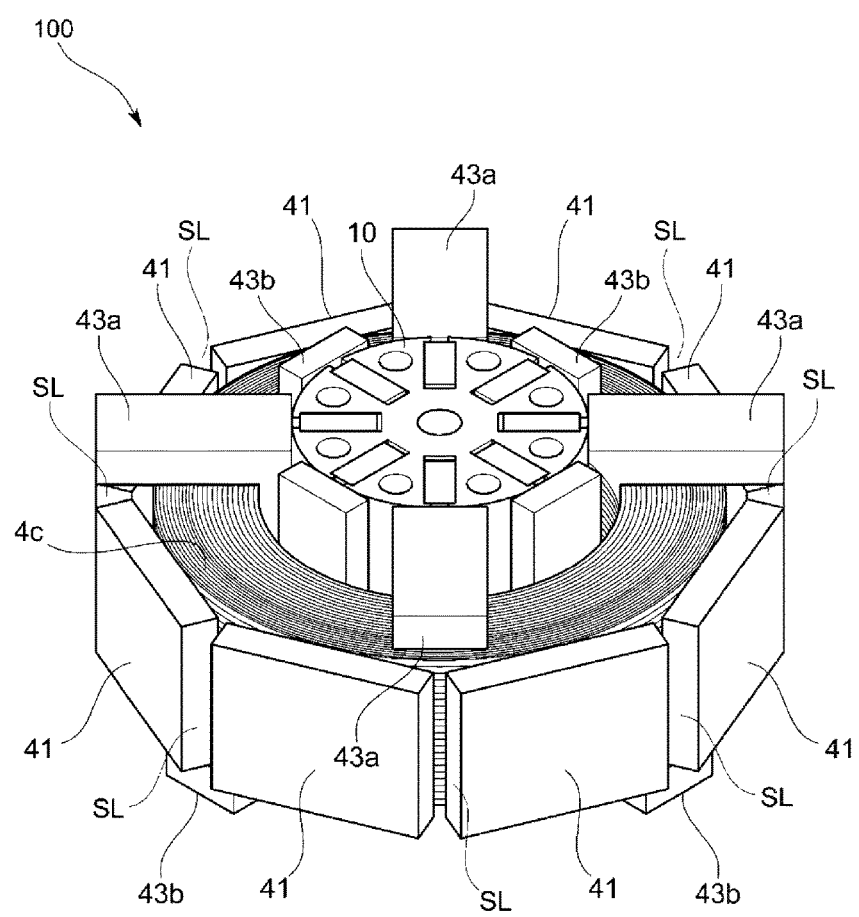
FIG. 30 is a perspective view of a claw pole motor in accordance with a modified example of the third embodiment.

For example, although the magnetic body 40 in accordance with the embodiment is formed by winding an electric steel sheet in a cylindrical shape as shown in FIG. 30, the plurality of divided magnetic bodies 41 which cover the outside of the coil 4c may be arranged in a polygonal shape.

Also, even though the divided magnetic bodies 41 in accordance with the embodiment are formed by dividing an electrical steel sheet wound in a cylindrical shape by forming slits SL therein in an axial direction thereof as shown in FIG. 30, the divided magnetic bodies 41 may have, for example, a rectangular parallelepiped shape formed by arranging the electrical steel sheets in a rectangular shape in a diametric direction. Meanwhile, the magnetic bodies 41 are not limited to the arranging of the electrical steel sheets in the rectangular shape, and may be block bodies. Also, the shape is not limited to the rectangular parallelepiped shape and may be any shape satisfying a magnetic circuit between adjacent claw poles along a circumferential direction.

Also, in the embodiment, the claw poles 43a and 43b are arranged without covering the outer circumference of the coil 4c and are formed in an L shape when viewed in the circumferential direction, but the claw poles 43a and 43b, like the second embodiment, may be formed in an n shape when viewed in the circumferential direction.

Figure 31:
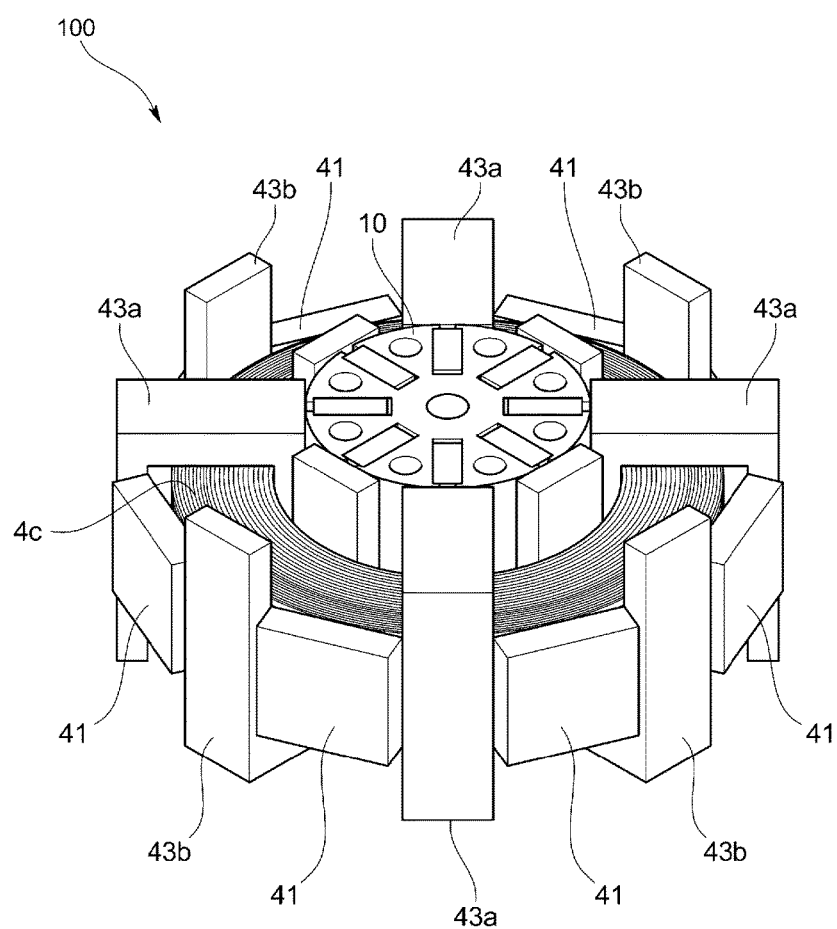
FIG. 31 is a perspective view of a claw pole motor in accordance with a modified example of the third embodiment.

In this case, as shown in FIG. 31, the divided magnetic bodies 41 may be disposed on the outside of the coil 4c between the downward claw pole 43a and the upward claw pole 43b adjacent to each other along the circumferential direction. In addition, the disclosure is not limited to the embodiment and may be modified into various forms without departing from the concept thereof.

Next, a claw pole motor in accordance with the fourth embodiment of the disclosure will be described.

Meanwhile, members corresponding to the members described in the third embodiment will be referred to by the same reference numerals.

Figure 32:
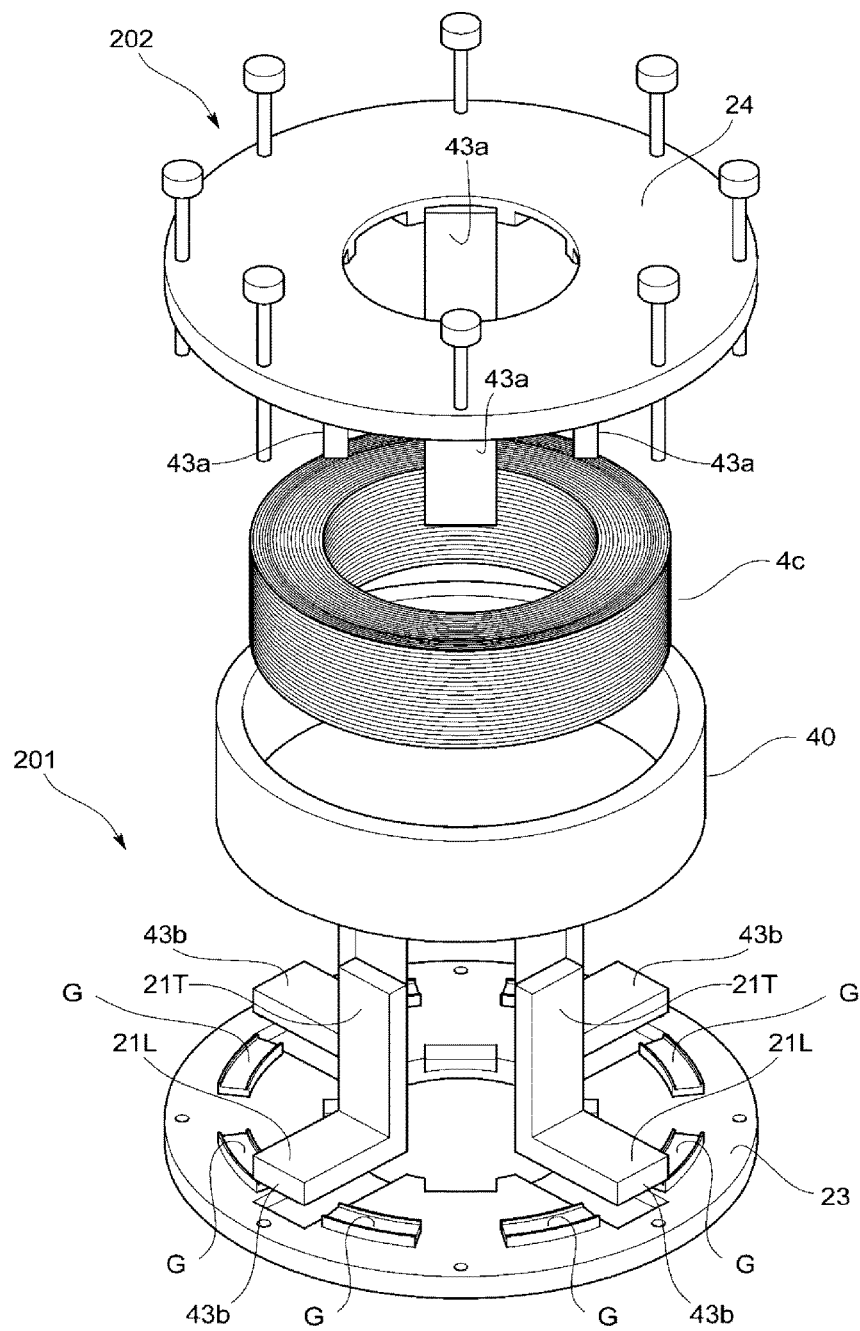
FIG. 32 is a perspective view of a claw pole motor in accordance with a fourth embodiment.
Figure 33:
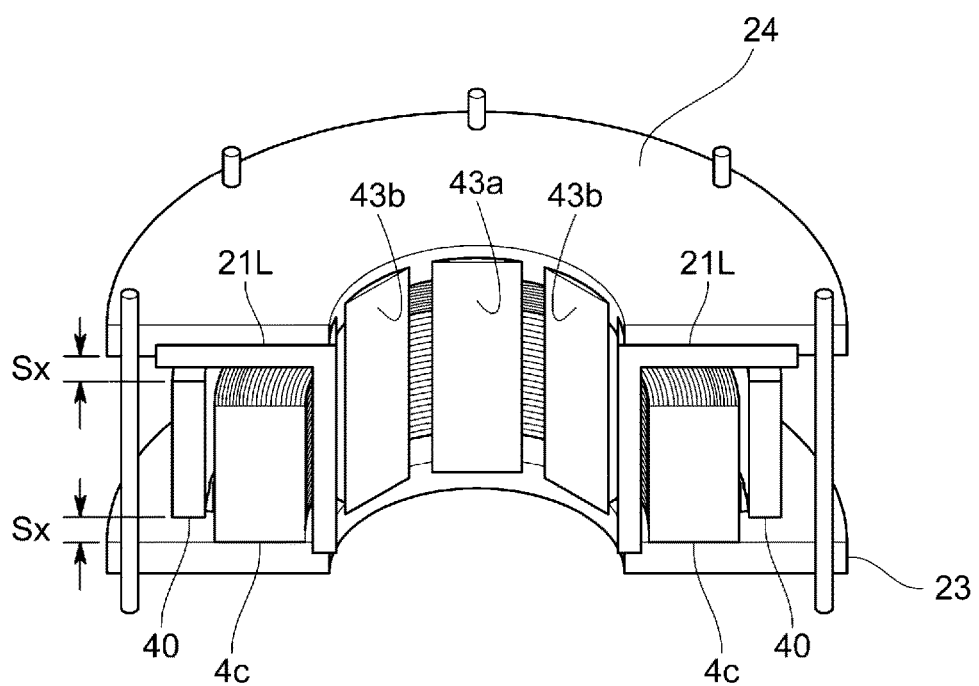
FIG. 33 is a perspective view of a gap of the claw pole motor in accordance with the fourth embodiment.

The claw pole motor in accordance with the embodiment is a single-phase claw pole motor and, as shown in FIGS. 32 and 33, like the third embodiment, in a detailed configuration, may include a downward claw pole 43a and an upward claw pole 43b formed in an L shape when viewed in a circumferential direction and a magnetic body 40 which forms a magnetic circuit between the downward claw pole 43a and the upward claw pole 43b.

The downward claw pole 43a and the upward claw pole 43b are positioned between a coil 4c and a rotor 10 and include vertical magnetic poles 21T (corresponding to the first magnetic pole element 211 in the third embodiment) which extend in an axial direction and horizontal magnetic pole elements 21L (corresponding to the third magnetic pole element 213 in the third embodiment) which extend from end portions of the vertical magnetic pole elements 21T in a diametric direction and are positioned at the bottom or top of the coil 4c.

The magnetic body 40 forms a magnetic circuit which induces magnetic flux which passes through one of the downward claw pole 43a and the upward claw pole 43b to the other side, and is formed in a cylindrical shape. At least a part of the magnetic body 40 is installed to overlap the horizontal magnetic pole elements 21L when viewed in the axial direction. Here, the horizontal magnetic pole elements 21L extend further to the outside than the magnetic body 40 in a diametric direction.

Also, in the embodiment, gaps Sx are formed between the magnetic body 40 and the horizontal magnetic pole elements 21L.

In more detail, guide portions G are formed on opposite surfaces of an upper supporting member 24 supporting the downward claw poles 43a and a lower supporting member 23 supporting the upward claw poles 43b, and the magnetic body 40 is installed on the guide portions G to form the gaps Sx with a size according to a height of bottom plates of the guide portions G.

Here, as shown in FIG. 33, the gaps Sx are formed between the horizontal magnetic pole element 21L of the downward claw pole 43a and the magnetic body 40 and between the horizontal magnetic pole element 21L of the upward claw pole 43b and the magnetic body 40. Here, the gaps Sx have approximately the same sizes. In other words, all distances of the gaps between the magnetic body 40 and the horizontal magnetic pole elements 21L are configured to have the same lengths.

Figure 34:
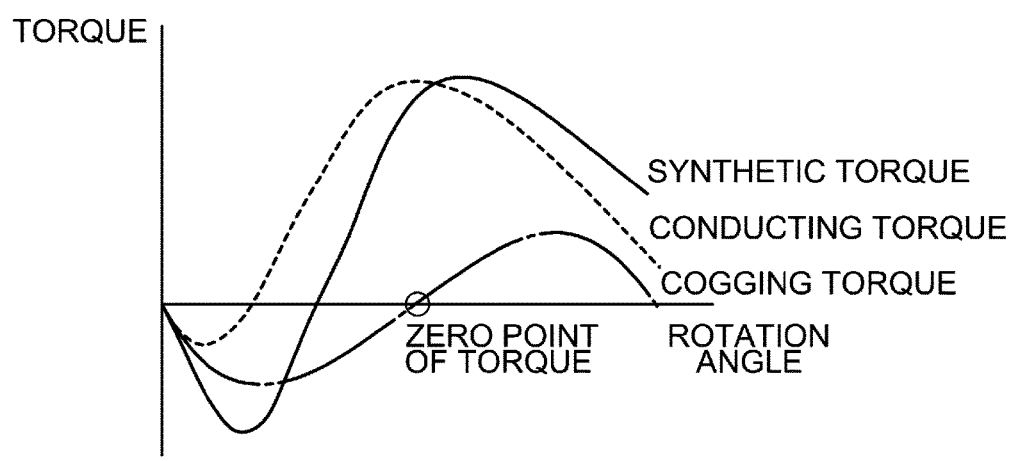
FIG. 34 is a graph illustrating torque with respect to a rotation angle of a general claw pole motor.

Here, a result of analyzing an electromagnetic field of a configuration in which the horizontal magnetic pole elements 21L and the magnetic body 40 are in contact with each other is shown in FIG. 34. As can be seen from the result, when the horizontal magnetic pole elements 21L and the magnetic body 40 are in contact with each other, cogging torque acts in a negative direction when the motor is maneuvered and conducting torque also acts in the negative direction accompanying the same. As a result thereof, since synthetic torque acts in the negative direction, in the above description, a problem in which the rotor 10 starts reversely rotating after being maneuvered and stalls until the synthetic torque is zero to be stopped when a load to a motor is great occurs.

Figure 35:
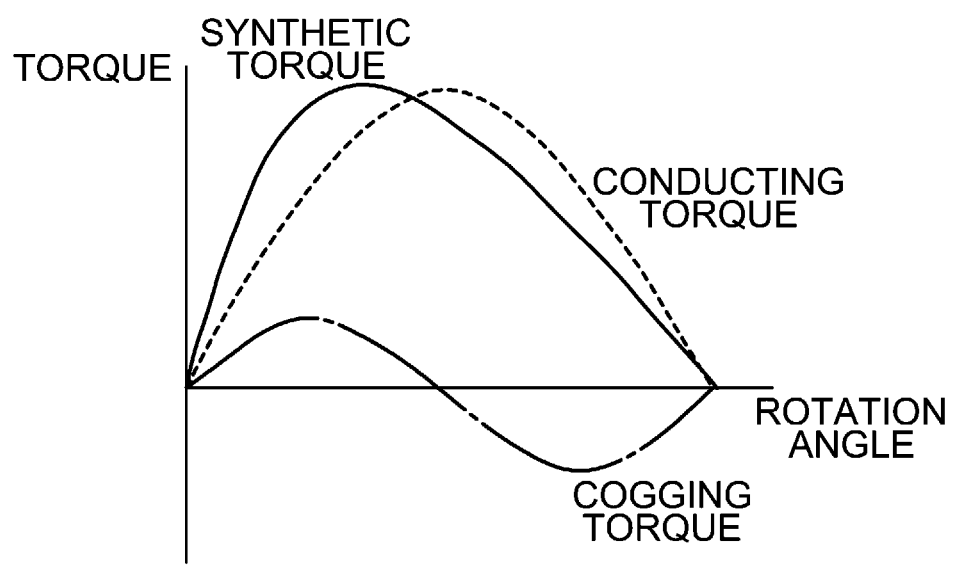
FIG. 35 is a graph illustrating torque with respect to a rotation angle of the claw pole motor in accordance with the fourth embodiment.

Compared with this, a result of analyzing an electromagnetic field of a configuration in which the gaps Sx are formed between the horizontal magnetic pole elements 21L and the magnetic body 40 is shown in FIG. 35. As can be seen from the result, since the gaps Sx are formed between the horizontal magnetic pole elements 21L and the magnetic body 40, a phase of cogging torque deviates by 90 degrees in comparison to a case in which the horizontal magnetic pole elements 21L are in contact with the magnetic body 40, and conducting torque and synthetic torque act in a positive direction when the motor is maneuvered. Accordingly, the rotor 10 may be rotated forward after being maneuvered and may be prevented from stopping.

Meanwhile, when the gaps Sx are formed between the horizontal magnetic pole elements 21L and the magnetic body 40, a delay of the magnetic field occurring and a delay of cogging torque with respect to conducting torque occurring when magnetic flux passes through the gap Sx are considered as a reason of the deviation of the phase of cogging torque by 90 degree.

Figure 36:
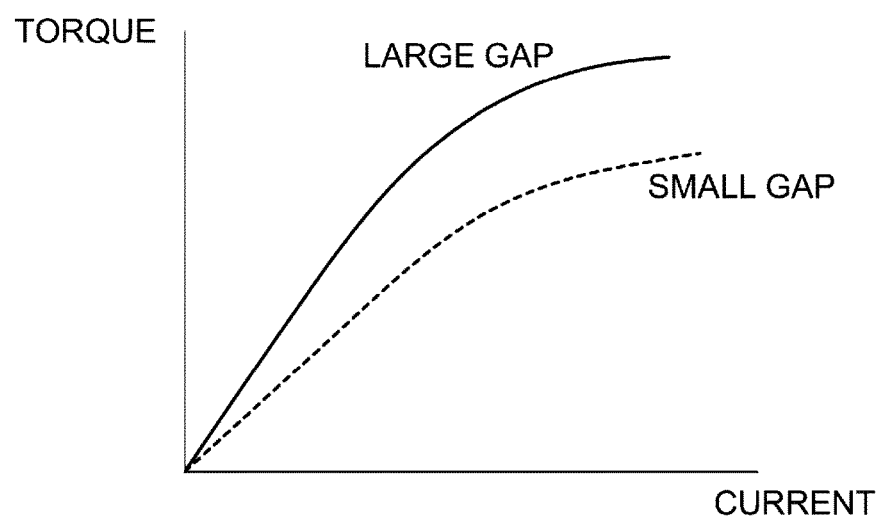
FIG. 36 is a graph illustrating a relationship between the torque and a size of the gap of the claw pole motor in accordance with the fourth embodiment.

However, as shown in FIG. 36, when compared with the same currents, density of magnetic flux decreases due to a leakage of the magnetic flux from the gap Sx and magnetic saturation is facilitated when the gap Sx is great. As a result, induced voltage decreases and torque also decreases. Accordingly, the gap Sx may be from about 0.5 mm to 0.6 mm in consideration of an aspect of manufacturing management and a result of analyzing an electromagnetic field.

Meanwhile, the disclosure is not limited to the embodiment.

Figure 37:
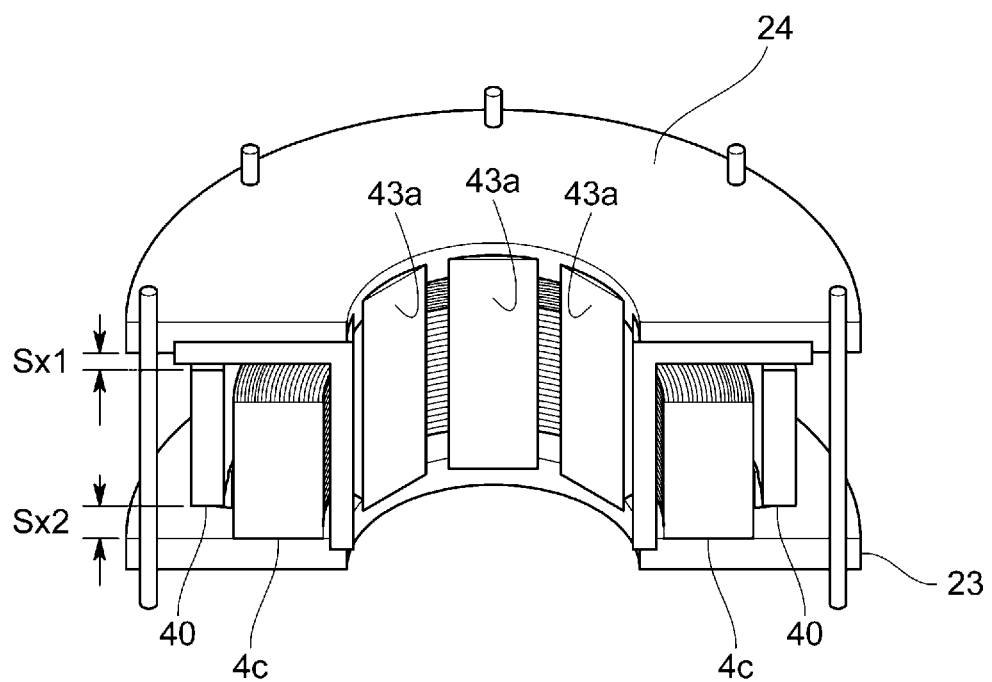
FIG. 37 is a perspective view of a gap of a claw pole motor in accordance with a modified example of the fourth embodiment.

In the embodiment, the gap Sx between the horizontal magnetic pole element 21L of the downward claw pole 43a and the magnetic body 40 (hereinafter, referred to as a first gap Sx1) and the gap Sx between the horizontal magnetic pole element 21L of the upward claw pole 43b and the magnetic body 40 (hereinafter, referred to as a second gap Sx2) have the same size. However, as shown in FIG. 37, the first gap Sx1 and the second gap Sx2 may have different sizes.

Figure 38:
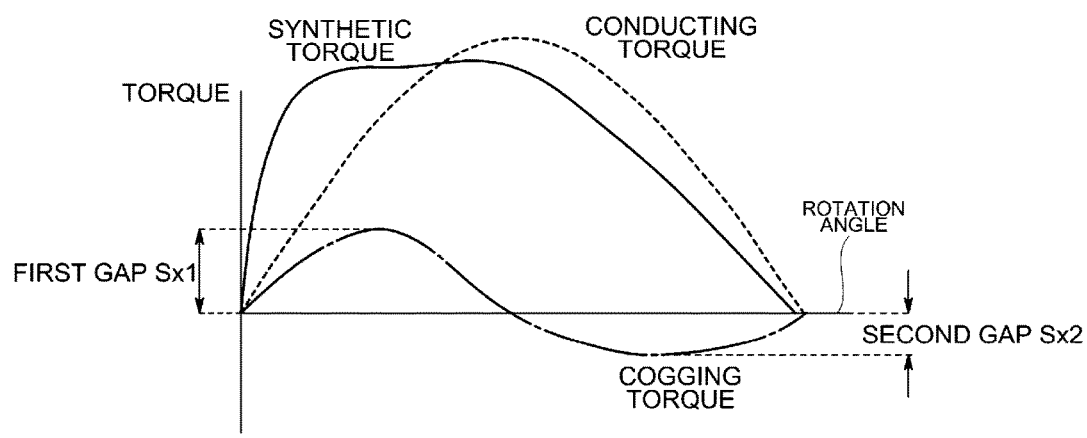
FIG. 38 is a graph illustrating torque with respect to a rotation angle of the claw pole motor in accordance with the modified example of the fourth embodiment.

In more detail, the first gap Sx1 may be formed to be smaller than the second gap Sx2 to provide great cogging torque when the motor is maneuvered as shown in FIG. 38.

Figure 39:
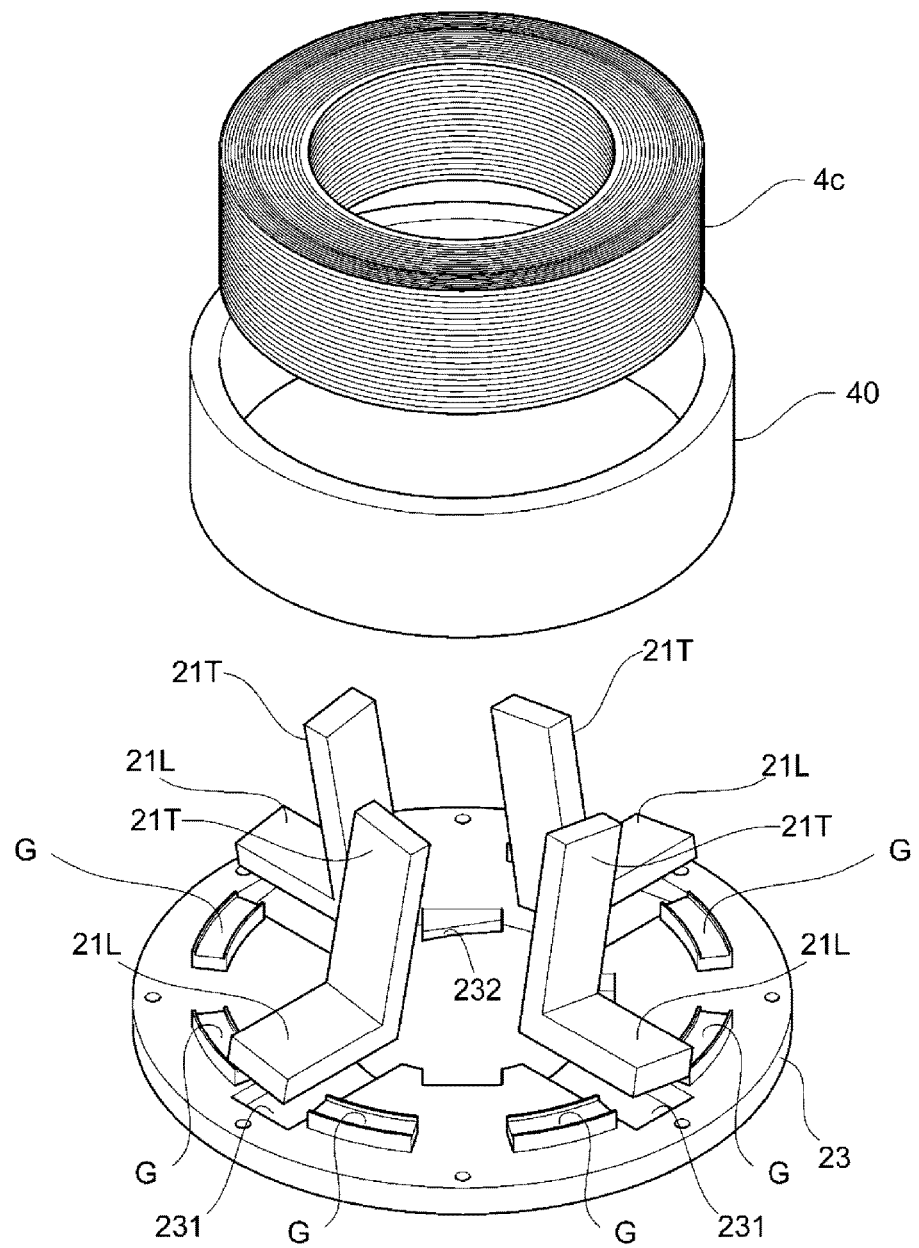
FIG. 39 is a perspective view of a claw pole motor in accordance with the modified example of the fourth embodiment.
Figure 40:
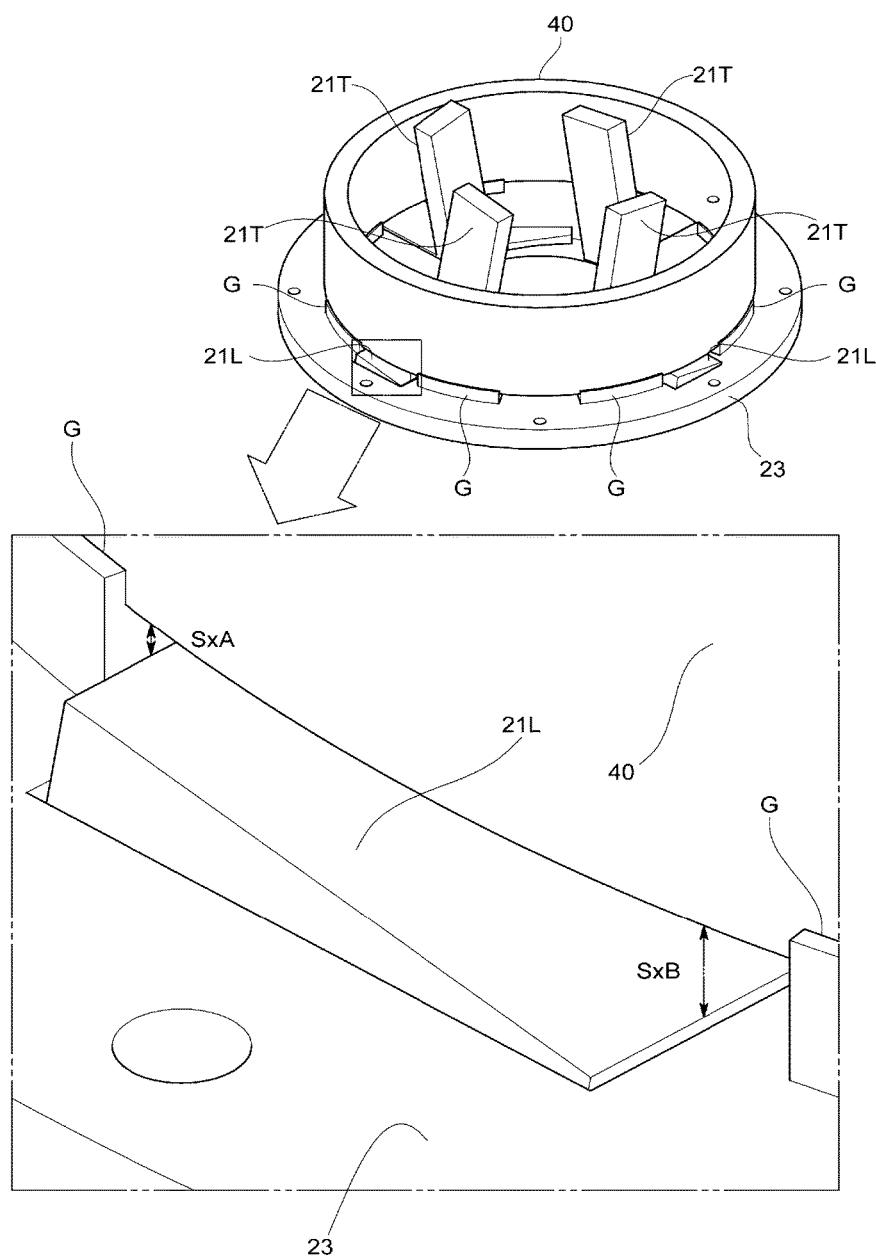
FIG. 40 is a partial enlarged view illustrating the gap of the claw pole motor in accordance with the modified example of the fourth embodiment.

Also, as shown in FIGS. 39 and 40, the downward claw poles 43a and the upward claw poles 43b may be formed to be inclined such that the gaps Sx increase along a rotation direction of the rotor (herein, counterclockwise when viewed from above).

In detail, the claw poles 43a and 43b disposed at the first position determining portions 231 and the second position determining portions 232 are inclined by inclining bottom surfaces of the first position determining portions 231 and the second position determining portions 232 formed at the lower supporting member 23 and the upper supporting member 24. Accordingly, a gap SxB in the rotation direction of the rotor increases to be larger than a gap SxA in a reverse rotation direction of the rotor between the horizontal magnetic pole elements 21L and the magnetic body 40.

Figure 41:
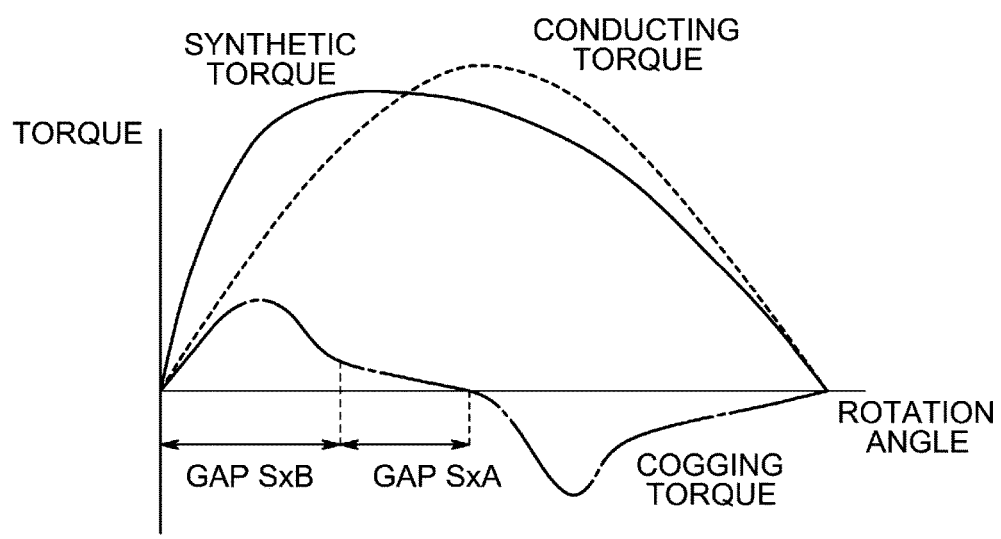
FIG. 41 is a graph illustrating the torque with respect to the rotation angle of a claw pole motor in accordance with the modified example of the fourth embodiment.

In this configuration, as shown in FIG. 41, it is possible to provide greater cogging torque when the motor is maneuvered.

Next, a motor control circuit in accordance with one embodiment of the disclosure will be described with reference to the drawings.

Figure 42:
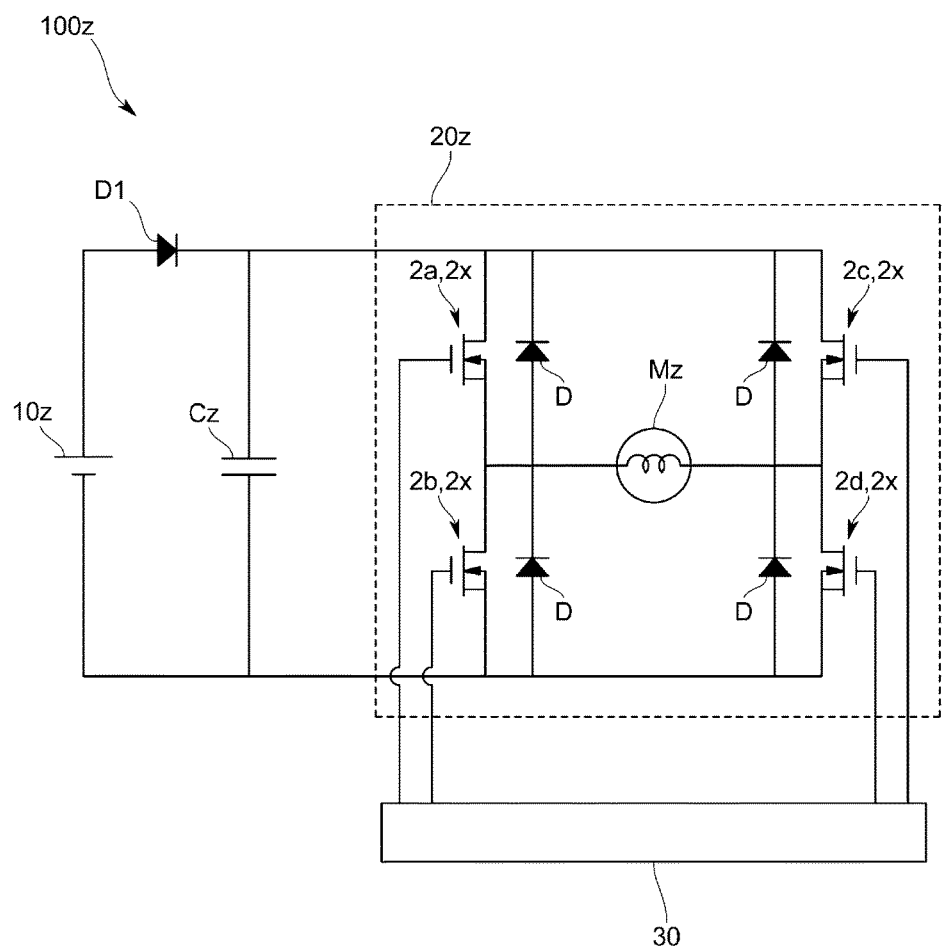
FIG. 42 is a view illustrating a configuration of a motor control circuit in accordance with an embodiment of the disclosure.

A motor control circuit 100z in accordance with one embodiment of the disclosure, for example, is for driving a single-phase motor Mz as shown in FIG. 42 and, for example, converts direct current (DC) power supplied from a DC power source 10z into alternating current (AC) power to be applied to the motor Mz.

Also, the DC power source 10z may be an AC/DC converter.

In detail, the motor control circuit 100z may include a backdraft preventing diode D1 which is installed at a high pressure side of the DC power source 10z, a smoothing condenser Cz installed together with the DC power source 10z in parallel, an H bridge circuit 20z which converts DC power supplied from the DC power source 10z into AC power and applies the AC power to the motor Mz, and a driving circuit 30 which outputs a driving signal to a metal-oxide semiconductor field-effect-transistor (MOSFET) which forms the H bridge circuit 20z.

The H bridge circuit 20z may include four MOSFETs each having a parasitic diode D. Here, all four of the MOSFETs are N-channel type MOSFETs.

In more detail, the H bridge circuit 20z may include a first MOSFET 2a and a second MOSFET 2b connected to the DC power source 10z in series and a third MOSFET 2c and a fourth MOSFET 2d connected to the DC power source 10z in series. The first MOSFET 2a and the second MOSFET 2b are connected to the third MOSFET 2c and the fourth MOSFET 2d in parallel. A coil of the motor Mz is connected between a contact point of the first MOSFET 2a and the second MOSFET 2b and a contact point of the third MOSFET 2c and the fourth MOSFET 2d.

Hereinafter, for convenience of description, the first MOSFET 2a and the third MOSFET 2c are referred to as power source side MOSFETs 2x and the second MOSFET 2b and the fourth MOSFET 2d are referred to as ground side MOSFETs 2y.

The driving circuit 30 turns on/off each of the MOSFETs by outputting a driving signal to each of the MOSFETs and controlling a gate voltage of each of the MOSFETs.

In more detail, the driving circuit 30 alternately turns on or off one pair of two pairs of diagonally arranged MOSFETs. In other words, as shown in FIG. 43, the driving circuit 30 converts between a first conducting state in which the first MOSFET 2a and the fourth MOSFET 2d are turned on (ON) and the second MOSFET 2b and the third MOSFET 2c are turned off (OFF) and a second conducting state in which the first MOSFET 2a and the fourth MOSFET 2d are turned off (OFF) and the second MOSFET 2b and the third MOSFET 2c are turned on (ON).

The driving circuit 30 of the motor control circuit in accordance with one embodiment of the disclosure is configured to form a non-conducting state (a so-called dead time) in which all four of the MOSFETs are turned off, for example, for several micro seconds μs between the first conducting state and the second conducting state.

Figure 43:
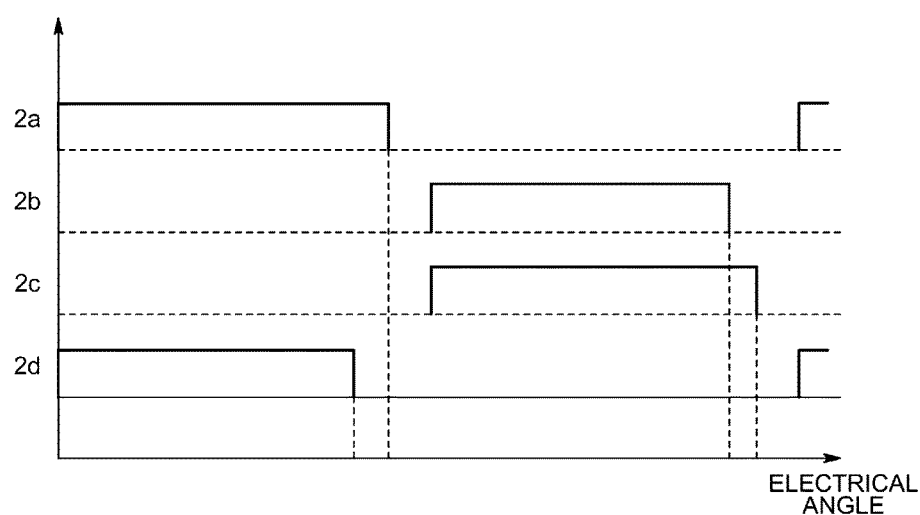
FIG. 43 is a timing diagram illustrating current carrying time of each metal-oxide semiconductor field-effect-transistor (MOSFET) of the motor control circuit in accordance with an embodiment of the disclosure.

Also, as shown in FIG. 43, when one pair of the MOSFETs are turned off from an on state, the driving circuit 30 turns off the ground side MOSFET 2y, and after a preset certain time, turns off the power source side MOSFET 2x.

That is, before the non-conducting state, the driving circuit 30 turns off the ground side MOSFET 2y of the one pair of the MOSFETs which are turned on, and the power source side MOSFETs 2x are maintained as on (ON).

Due to the configuration described above, in one embodiment, the ground side MOSFETs 2y are conducted, for example, at 160° to 170° and the power source side MOSFETs 2x are conducted, for example, at 178°.

Figure 44:
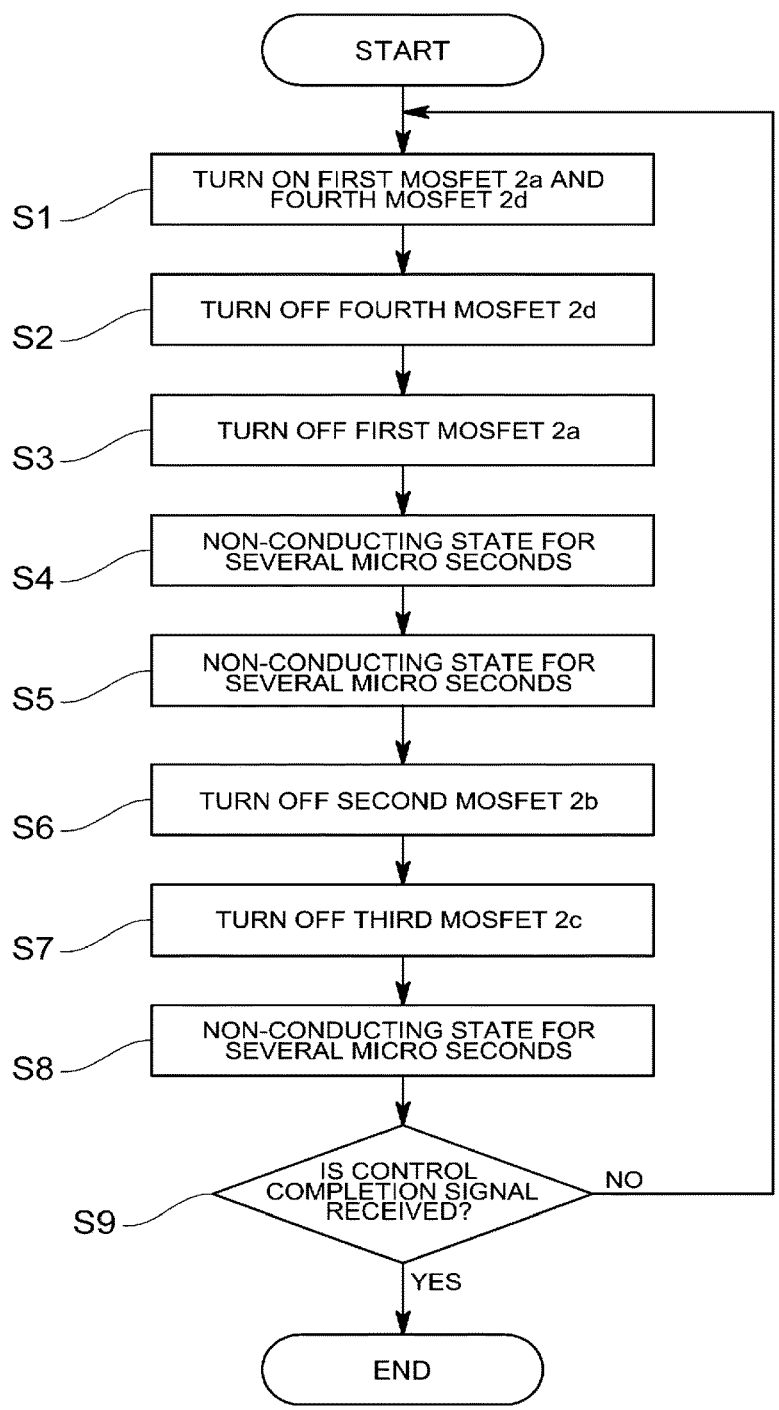
FIG. 44 is a flowchart illustrating an operation of the motor control circuit in accordance with an embodiment of the disclosure.

Hereinafter, an operation of the driving circuit 30 of the motor control circuit in accordance with one embodiment of the disclosure will be described with reference to a flowchart of FIG. 44.

When a control signal for rotating the motor Mz is input from the outside, the driving circuit 30 receives the control signal and simultaneously turns on the first MOSFET 2a and the fourth MOSFET 2d (S1).

Figure 45:
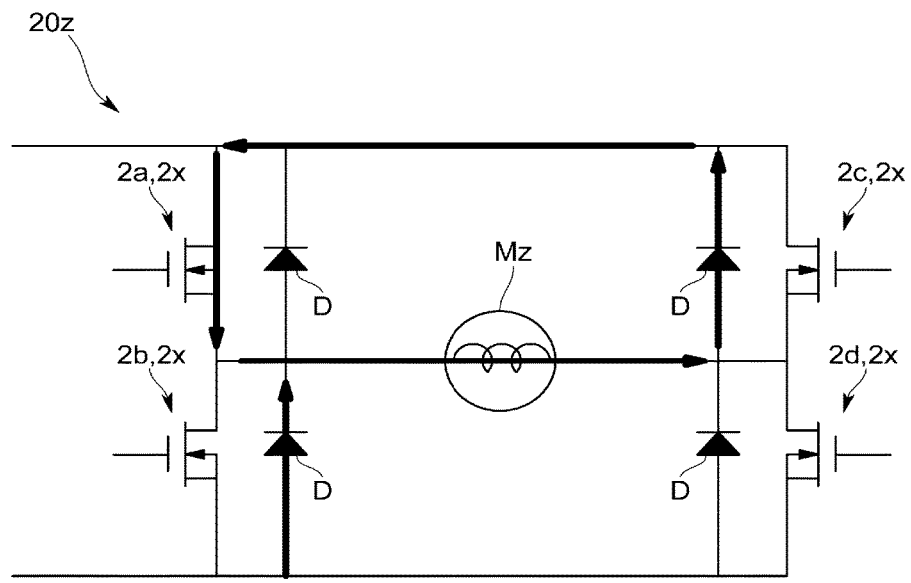
FIG. 45 is a circuit diagram illustrating a flow of a regenerative electric current of the motor control circuit in accordance with an embodiment of the disclosure.
Figure 45:
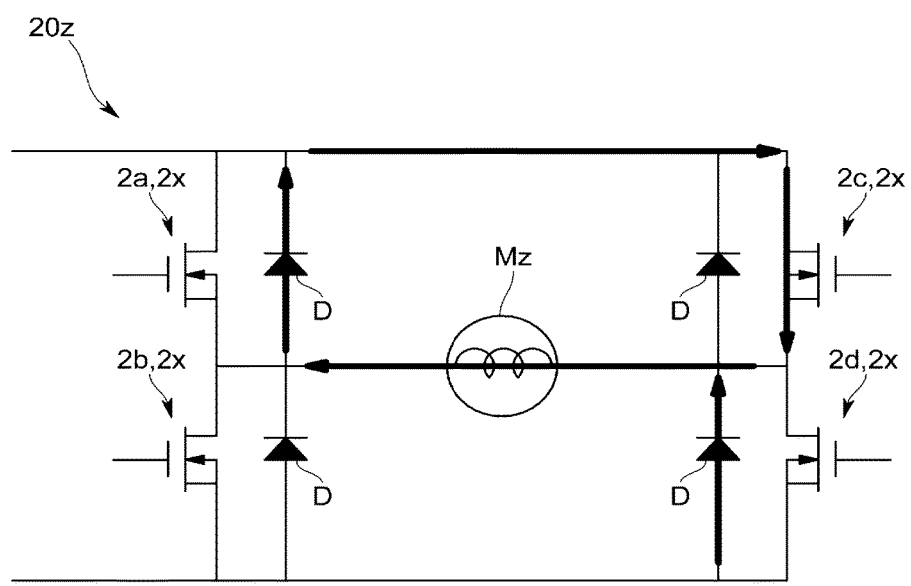

Next, the fourth MOSFET 2d which is the ground side MOSFET 2y among the MOSFETs which are turned on is turned off (S2). Accordingly, as shown in an upper portion of FIG. 45, regenerative currents indicated as thick arrows flow through a loop formed by the parasitic diode D of the third MOSFET 2c and the first MOSFET 2a, and a part thereof flows through the smoothing condenser Cz.

Also, after the fourth MOSFET 2d is turned off and a preset certain time passes, the first MOSFET 2a which is the power source side MOSFET 2x is turned off (S3) to be in the non-conducting state in which all four of the MOSFETs are turned off, for example, for several micro seconds μs (S4).

Sequentially, the second MOSFET 2b and the third MOSFET 2c are simultaneously turned on (S5).

After that, like S2 to S4, the second MOSFET 2b which is the ground side MOSFET 2y among the MOSFETs which are turned on is turned off (S6). As shown in a lower portion of FIG. 45, regenerative currents indicated as thick arrows flow through a loop formed by the parasitic diode D of the first MOSFET 2a and the third MOSFET 2c, and a part thereof flows through the smoothing condenser Cz.

Also, after the second MOSFET 2b is turned off and a preset certain time passes, the third MOSFET 2c which is the power source side MOSFET 2x is turned off (S7) to be in the non-conducting state in which all four of the MOSFETs are turned off, for example, for several micro seconds μs (S8).

After that, S1 to S8 are repeated. However, when a control completion signal for stopping the motor Mz is input from the outside (S9), the driving circuit 30 receives the control completion signal and turns off each of the MOSFETs to complete the control of the motor Mz.

According to the motor control circuit 100z in accordance with one embodiment of the disclosure configured as described above, when one pair of MOSFETs are turned off, since the ground side MOSFET 2y is turned off, a preset certain time passes, and the power source side MOSFET 2x is turned off, regenerative currents condensed at the coil of the motor Mz may be looped and consumed at the power source 10z.

Figure 46:
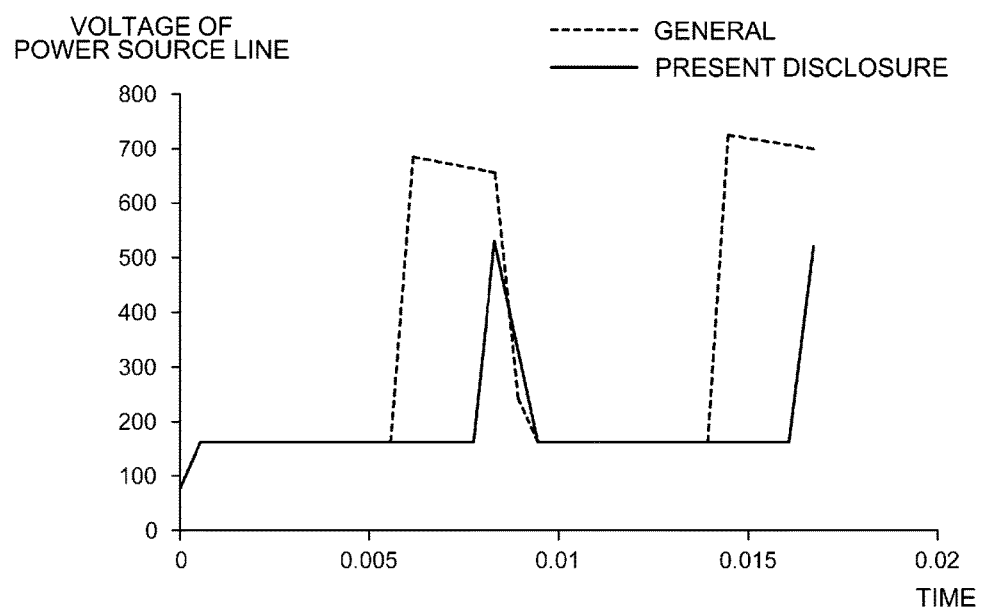
FIG. 46 is a graph illustrating an effect of the motor control circuit in accordance with an embodiment of the disclosure.

Accordingly, the regenerative currents may flow through several circuit devices such as the smoothing condenser Cz installed at the power source 10z in addition to the parasitic diode D of the power source side MOSFET 2x, and regenerative power may be efficiently consumed. Additionally, as shown in FIG. 46, a voltage increase of a power line caused by kick back may be more accurately suppressed than general ways.

Also, since all four of the MOSFETs which form the H bridge circuit 20z are N-channel type MOSFETs, heat generated while regenerative currents flow through the parasitic diode D may be suppressed when compared with an H bridge circuit using P-channel type MOSFETs.

Meanwhile, the disclosure is not limited to the embodiment described above.

Figure 47:
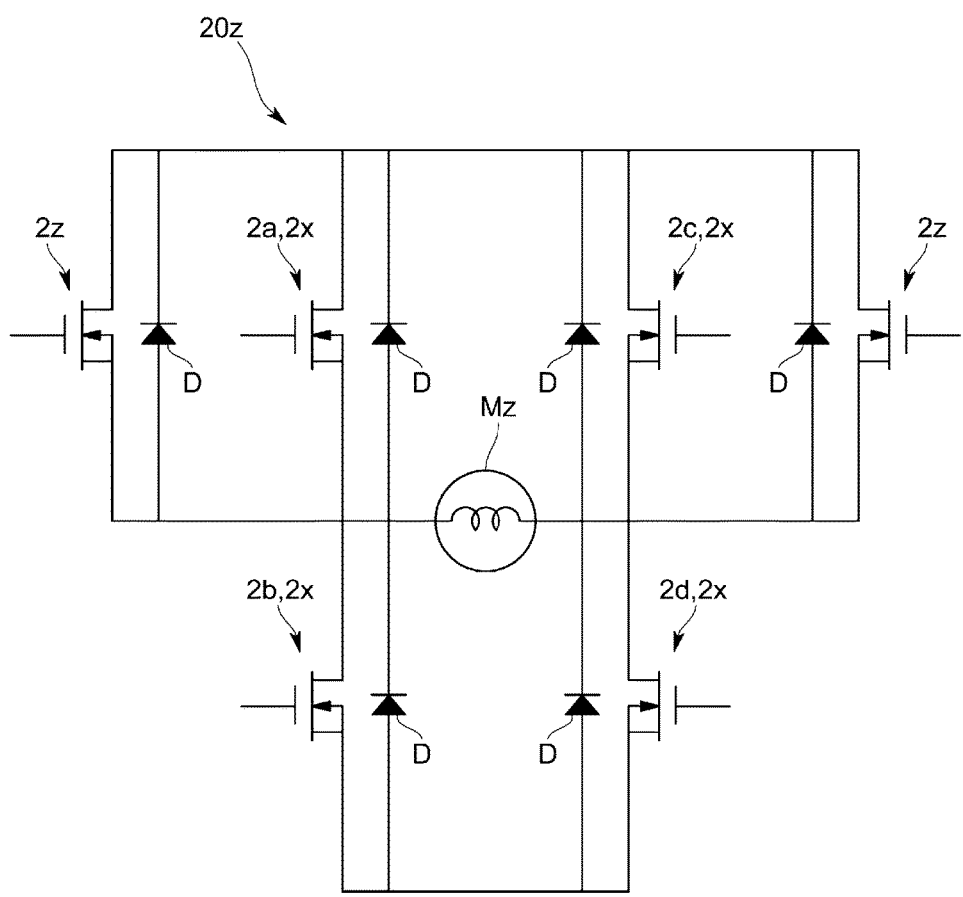
FIG. 47 is a configuration diagram illustrating a motor control circuit in accordance with an embodiment of the disclosure.

For example, as shown in FIG. 47, the motor control circuit 100z may further include one pair of regenerative current consuming MOSFETs 2z corresponding to the two power source side MOSFETs 2x and connected in parallel with the corresponding power source side MOSFETs 2x.

In this configuration, as shown in FIG. 47, the driving circuit 30 may be configured to turn off one pair of diagonally arranged MOSFETs and to turn off the regenerative current consuming MOSFET 2z corresponding to the power source side MOSFET 2x which is turned off.

Figure 48:
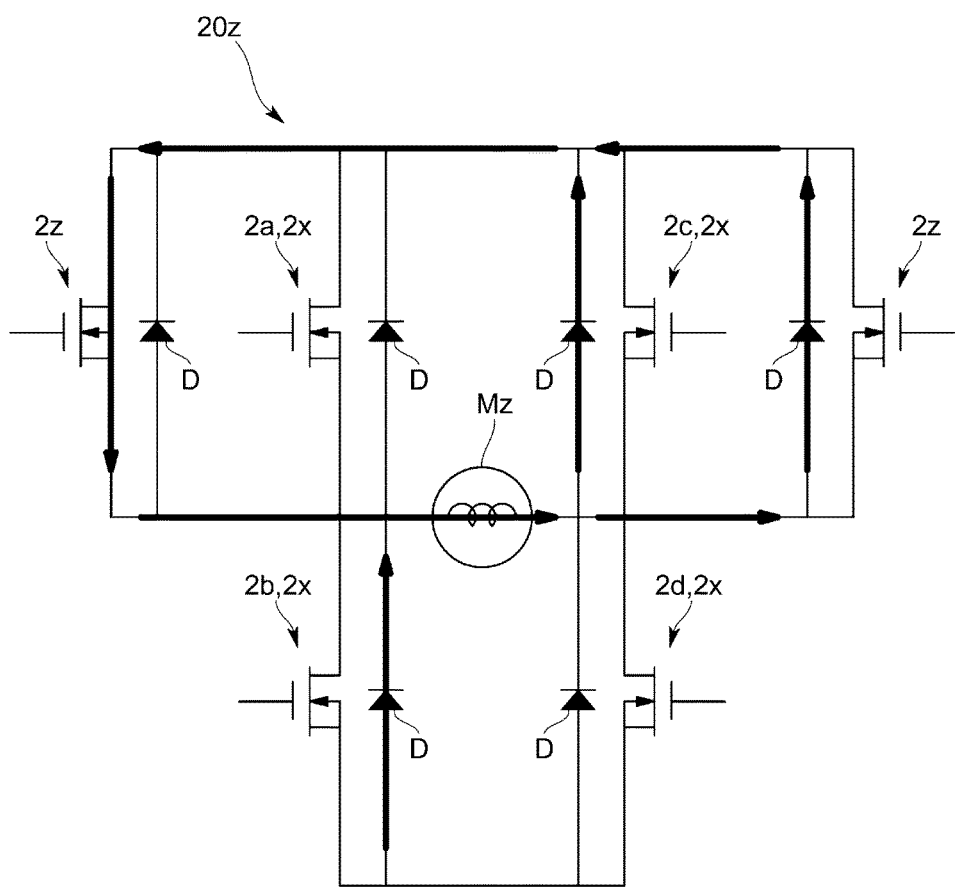
FIG. 48 is a circuit diagram illustrating a flow of a regenerative electric current of the motor control circuit in accordance with an embodiment of the disclosure.

According to the motor control circuit 100z configured as described above, a loop which consumes the regenerative currents indicated as thick arrows may be formed at the power source 10z, regenerative power may be more accurately consumed than in a general motor control circuit, and a voltage increase of a power line caused by kick back may be accurately suppressed, like the embodiment, as shown in FIG. 48, by turning on the regenerative current consuming MOSFET 2z corresponding to the power source side MOSFET 2x which is turned off.

The driving circuit may be configured to, for example, control pulse width modulations (PWM) of the power source side MOSFETs.

Also, in the embodiment, one pair of the diagonally arranged MOSFETs are simultaneously turned on. However, the one pair of MOSFETs may be turned on with a time difference.

Also, the motor control circuit in accordance with the embodiment is used to control an AC motor, but may be used to control a DC motor.

In addition, the disclosure is not limited to the embodiment and may be modified into various forms without departing from the concept thereof.

As is apparent from the above description, since an insulator is unnecessary, for example, even in a case in which a skew angle is formed at a stator, a motor may be miniaturized in an axial direction thereof and an increase of manufacturing costs may be prevented in comparison to a general motor.

Also, in accordance with embodiments of the disclosure, heat which occurs at a coil may be discharged without installing a heat dissipation member, a fan, or the like.

Also, in accordance with embodiments of the disclosure, high efficiency of a motor may be provided by configuring a claw pole in a shape which concentrates magnetic flux.

Also, in accordance with embodiments of the disclosure, efficiency of consuming regenerative power may be improved and a voltage increase of a power line caused by a kick back may be more accurately suppressed in comparison to a general motor.

Although example embodiments of the disclosure have been shown and described, it should be appreciated by those skilled in the art that changes may be made to these embodiments without departing from the principles and spirit of the disclosure, the scope of which is defined in the claims and their equivalents.

What is claimed is:

1. A motor, comprising:
a stator which includes a plurality of stator elements, each of the stator elements including:
a plurality of claw poles disposed along a circumferential direction of the stator element; and
a coil wound in the circumferential direction of the stator element,
wherein
winding directions of respective coils of mutually adjacent stator elements among the plurality of stator elements are opposite to each other, and
claw poles of the mutually adjacent stator elements are opposite to each other and mutually opposite claw poles have the same polarity,
wherein for each of the stator elements:
each claw pole among the plurality of claw poles includes a first magnetic pole element and a second magnetic pole element, and
at least one of the first magnetic pole element and the second magnetic pole element is configured to comprise a resistor portion configured to change a flow of magnetic flux;
wherein the second magnetic pole element of the claw pole is configured such that a top end portion has a thickness in a radial direction of the stator which is thinner than that of a bottom end portion.

2. The motor of claim 1, wherein the claw poles of the mutually adjacent stator elements are arranged to have a predetermined skew angle between the mutually opposite claw poles of the mutually adjacent stator elements.

3. The motor of claim 1, wherein
each of the stator elements further includes:
supporting members configured to support the plurality of claw poles and accommodate the coil, and
at least one connecting path provided in at least one of the supporting members.

4. The motor of claim 3, wherein the at least one connecting path includes a first portion that is disposed opposite to the coil and a second portion that is disposed not opposite to the coil.

5. The motor of claim 3, wherein the at least one connecting path has at least one shape of a concave groove, a slit, and a through hole.

6. The motor of claim 5, wherein the at least one connecting path includes the concave groove shape and the slit shape.

7. The motor of claim 5, wherein the at least one connecting path includes a plurality of through holes intermittently provided along a circumferential direction of the at least one supporting member and a reinforcing portion configured to reinforce a mechanical strength of the at least one supporting member and disposed between mutually adjacent through holes among the plurality of through holes.

8. The motor of claim 3, wherein the supporting members are nonmagnetic bodies.

9. The motor of claim 3, wherein for each of the stator elements:
the plurality of claw poles include upward claw poles and downward claw poles, and
the supporting members each include a first position determining portion into which a bottom end portion of any one of the upward claw pole and the downward claw pole is inserted and a second position determining portion into which a top end portion of any one of the upward claw pole and the downward claw pole is inserted.

10. The motor of claim 3, wherein for each of the stator elements:
the plurality of claw poles include upward claw poles and downward claw poles, and
the supporting members each include a plurality of position determining portions into which one or more of the upward and downward claw poles are inserted.

11. The motor of claim 1, further comprising a rotor, wherein
the first magnetic pole element of the claw pole is configured to be opposite to the rotor, and
the second magnetic pole element of the claw pole is configured to be magnetically connected to the first magnetic pole element and to accommodate the coil with the first magnetic pole element.

12. The motor of claim 1, wherein the second magnetic pole element of the claw pole is configured to allow magnetic flux to be concentrated more on a bottom end portion thereof than on a top end portion thereof.

13. The motor of claim 1, wherein the second magnetic pole element of the claw pole is configured such that a top end portion thereof has a stepped shape.

14. The motor of claim 1, wherein for each of the stator elements:
the plurality of claw poles include at least one upward claw pole and at least one downward claw pole,
the at least one upward claw pole includes steel plates stacked in the circumferential direction of the stator element and having a u shape when viewed in the circumferential direction of the stator element, and
the at least one downward claw pole includes steel plates stacked in the circumferential direction of the stator element and having an n shape when viewed in the circumferential direction of the stator element.

15. The motor of claim 1, wherein
the first magnetic pole element and the second magnetic pole element are configured as separate members,
the first magnetic pole element includes steel sheets stacked in the circumferential direction of the stator element and having a same shape, and
the second magnetic pole element includes steel sheets stacked in the circumferential direction of the stator element and having a same shape.

16. The motor of claim 1, wherein the claw pole further includes a third magnetic pole element interposed between a bottom end portion of the first magnetic pole element and a bottom end portion of the second magnetic pole element to magnetically connect the first magnetic pole element and the second magnetic pole element.

17. The motor of claim 1, wherein each of the stator elements further includes a magnetic body,
for each of the stator elements:

the plurality of claw poles include at least one outer claw pole disposed on an outer side of the coil and at least one inner claw pole disposed on an inner side of the coil, the magnetic body is configured to form a magnetic circuit between the at least one outer claw pole and the at least one inner claw pole to induce magnetic flux which passes through one of the at least one outer and at least one inner claw poles to the other of the at least one outer and the at least one inner claw poles.

18. A motor, comprising:

a rotor; and a stator which includes:
- a first stator element including:
  - a first plurality of claw poles disposed along a circumferential direction of the first stator element, and
  - a first coil wound in a first direction; and
- a second stator element, disposed below the first stator element, and including:
  - a second plurality of claw poles disposed along a circumferential direction of the second stator element such that each claw pole among the second plurality of claw poles is opposite to that of a respective claw pole among the first plurality of claw poles and has a same polarity as the respective claw pole among the first plurality of claw poles, and
  - a second coil wound in a second direction, opposite of the first direction, wherein for each of the first stator element and the second stator element:
- each claw pole among the plurality of claw poles includes a first magnetic pole element and a second magnetic pole element, and
- at least one of the first magnetic pole element and the second magnetic pole element is configured to comprise a resistor portion configured to change a flow of magnetic flux;

wherein the second magnetic pole element of the claw pole is configured such that a top end portion has a thickness in a radial direction of the stator which is thinner than that of a bottom end portion.

* * * * *